(12) United States Patent
Kawabata et al.

(10) Patent No.: US 10,521,660 B2
(45) Date of Patent: Dec. 31, 2019

(54) IMAGE PROCESSING METHOD AND IMAGE PROCESSING DEVICE

(71) Applicant: Sharp Kabushiki Kaisha, Sakai, Osaka (JP)

(72) Inventors: Suguru Kawabata, Sakai (JP); Takashi Nakano, Sakai (JP); Kazuhiro Natsuaki, Sakai (JP); Takahiro Takimoto, Sakai (JP); Shinobu Yamazaki, Sakai (JP); Daisuke Honda, Sakai (JP); Yukio Tamai, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 197 days.

(21) Appl. No.: 15/494,603

(22) Filed: Apr. 24, 2017

(65) Prior Publication Data
US 2017/0316266 A1 Nov. 2, 2017

(30) Foreign Application Priority Data

Apr. 28, 2016 (JP) ................................ 2016-091832
Apr. 4, 2017 (JP) ................................ 2017-074535

(51) Int. Cl.
*G06K 9/00* (2006.01)
*G02B 27/28* (2006.01)

(52) U.S. Cl.
CPC ..... *G06K 9/00617* (2013.01); *G06K 9/00604* (2013.01); *G02B 27/286* (2013.01)

(58) Field of Classification Search
CPC .................. G06K 9/00617; G06K 9/00604
See application file for complete search history.

(56) References Cited

U.S. PATENT DOCUMENTS

| 5,717,605 A * | 2/1998 | Komiya | G01J 3/02 250/578.1 |
| 6,046,811 A * | 4/2000 | Wolff | G01J 4/00 356/366 |
| 2006/0152586 A1* | 7/2006 | Komiya | A61B 5/0088 348/207.99 |
| 2007/0222781 A1* | 9/2007 | Kondo | G06T 15/506 345/426 |
| 2012/0206581 A1* | 8/2012 | Kanamori | G02B 27/286 348/68 |
| 2017/0316266 A1* | 11/2017 | Kawabata | G06K 9/00617 |

FOREIGN PATENT DOCUMENTS

JP 3955616 B2 8/2007

* cited by examiner

*Primary Examiner* — Chan S Park
*Assistant Examiner* — Mai H Tran
(74) *Attorney, Agent, or Firm* — Keating & Bennett, LLP

(57) ABSTRACT

The image processing method includes a luminance value information obtaining step of obtaining effective radiance values from a subject, and an image generating step of generating a picture image as a set of unit regions each of which has a luminance value obtained by at least partially removing a regular reflection light component on a surface of the subject from the effective radiance values.

11 Claims, 29 Drawing Sheets

IMAGE PROCESSING METHOD AND IMAGE PROCESSING DEVICE

TECHNICAL FIELD

The following disclosure relates to an image processing method, an image processing device, and an image processing program for carrying out a process with respect to a picture image that is used in iris authentication.

BACKGROUND ART

In recent years, a technique of separating, in a picture image of a subject, a diffuse reflection component from a specular reflection component in reflected light from the subject has been developed. This is because many of image processing algorithms are predicated on diffuse reflection, and specular reflection may cause decrease in performance of image processing algorithms. Patent Literature 1 discloses an example of a technique to separate the above two reflection components.

Patent Literature 1 discloses an image processing method including the following steps (1) through (5).

(1) Under arbitrary illumination, a plurality of picture images of a subject are taken with a camera through polarizing elements whose principal axis directions are different from each other.

(2) For each of pixels in a pixel group in which specular reflection occurs in the plurality of picture images, an incidence plane is identified based on a normal vector and an eye vector of the subject.

(3) For each of the pixels, an incident angle is identified based on the normal vector and the eye vector of the subject.

(4) A pixel set is formed by clustering pixels which have similar incidence planes and also similar incident angles.

(5) In the pixel set, stochastic independence between a diffuse reflection component and a specular reflection component is presumed, and those reflection components are separated from each other.

According to the image processing method disclosed in Patent Literature 1, the diffuse reflection component can be separated from the specular reflection component even under a general illumination environment.

CITATION LIST

Patent Literature

[Patent Literature 1]
Japanese Patent No. 3955616 (Registered on May 11, 2007)

SUMMARY OF INVENTION

Technical Problem

However, Patent Literature 1 does not disclose that iris authentication is carried out while reducing a regular reflection light component contained in reflected light from the subject.

An object of an aspect of the present disclosure is to provide an image processing method and the like which can reduce a regular reflection light component.

Solution to Problem

In order to attain the object, the image processing method in accordance with an aspect of the present disclosure includes: a luminance value information obtaining step of obtaining effective radiance values of a subject by an image pickup device in which pixel units are two-dimensionally arranged, each of the pixel units including a plurality of pixels which are associated with respective of a plurality of polarizing elements whose principal axis directions are different from each other, and each of the effective radiance values being an effective radiance value in the image pickup device; and an image generating step of generating a picture image including an image of the subject with use of the effective radiance values obtained from the subject, in the image generating step, a luminance value being obtained by at least partially removing a regular reflection light component on a surface of the subject from the effective radiance values of the plurality of pixels included in each of the pixel units corresponding to at least part of the subject, and the picture image being generated as a set of unit regions each of which has the luminance value.

Moreover, the image processing method in accordance with an aspect of the present disclosure includes the steps of: obtaining a picture image of a subject taken by an image pickup device in which pixel units are two-dimensionally arranged, each of the pixel units including a plurality of pixels which are associated with respective of a plurality of polarizing elements whose principal axis directions are different from each other; and calculating, with use of an output from the image pickup device, a luminance distribution of S-polarized light, the luminance distribution depending on an incident angle with respect to the subject, the incident angle being determined based on a position on the subject which position corresponds to a two-dimensional position of each of the pixel units in the image pickup device.

Moreover, the image processing device in accordance with an aspect of the present disclosure includes: an image pickup device in which pixel units are two-dimensionally arranged, each of the pixel units including a plurality of pixels which are associated with respective of a plurality of polarizing elements whose principal axis directions are different from each other; a luminance value information obtaining section which obtains effective radiance values of a subject by the image pickup device, each of the effective radiance values being an effective radiance value in the image pickup device; and an image generating section which generates a picture image including an image of the subject with use of the effective radiance values obtained from the subject, the image generating section obtaining a luminance value by at least partially removing a regular reflection light component on a surface of the subject from effective radiance values of the plurality of pixels included in each of the pixel units corresponding to at least part of the subject, and generates the picture image as a set of unit regions each of which has the luminance value.

Advantageous Effects of Invention

According to the image processing method and the image processing device in accordance with aspects of the present disclosure, it is possible to provide an image processing method and the like which can reduce a regular reflection light component.

Figure 5:
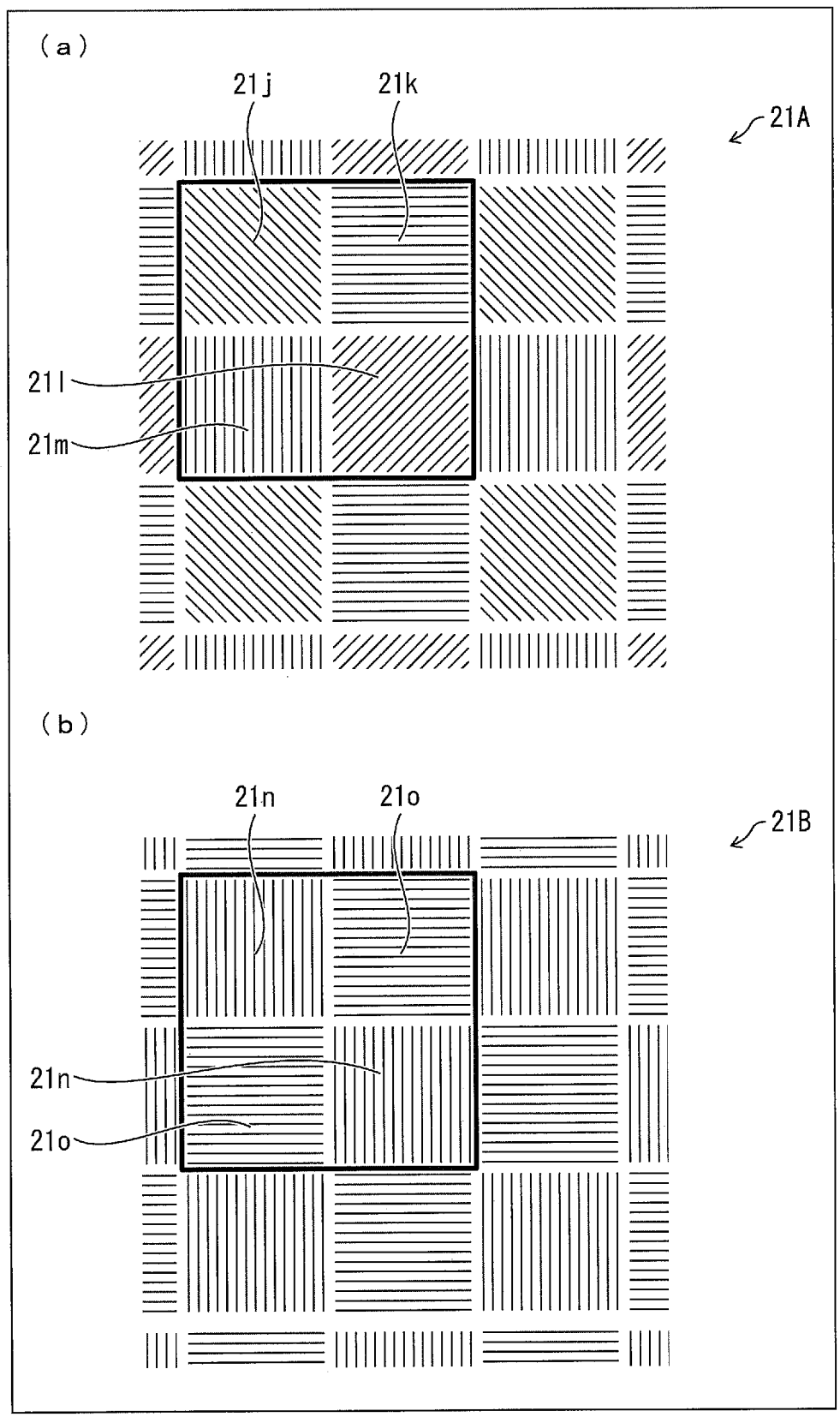

Each of (a) and (b) of FIG. 5 is a view illustrating another example of an integrated polarizer included in a camera.

Figure 6:
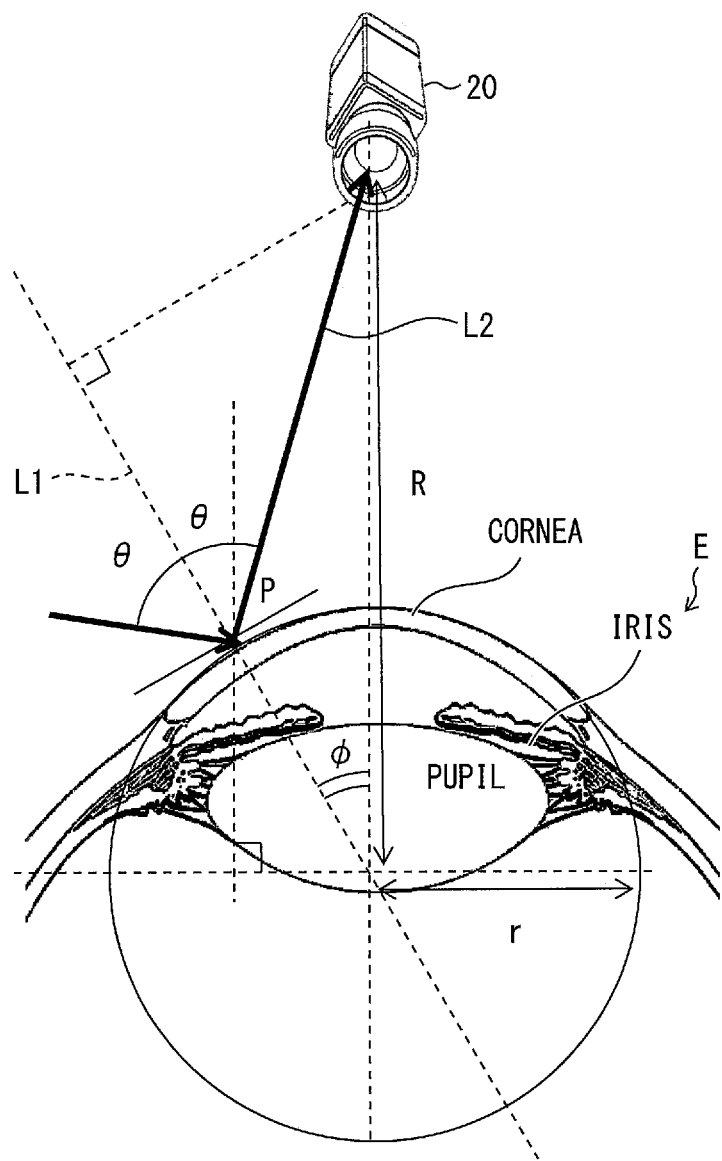

FIG. 6 is a view for explaining values for use in processes in the image processing device.

Figure 7:
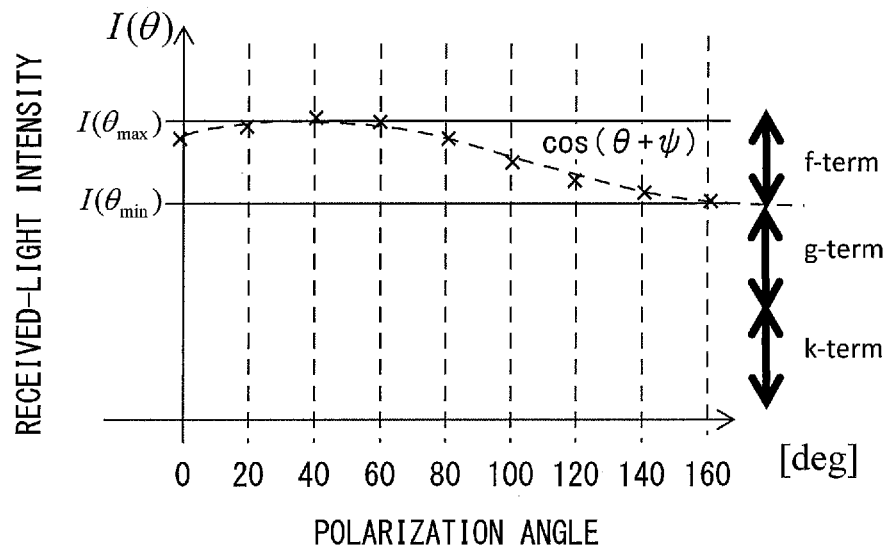

FIG. 7 is a graph showing a received-light intensity of light received by a pixel, with respect to a polarization angle.

Figure 8:
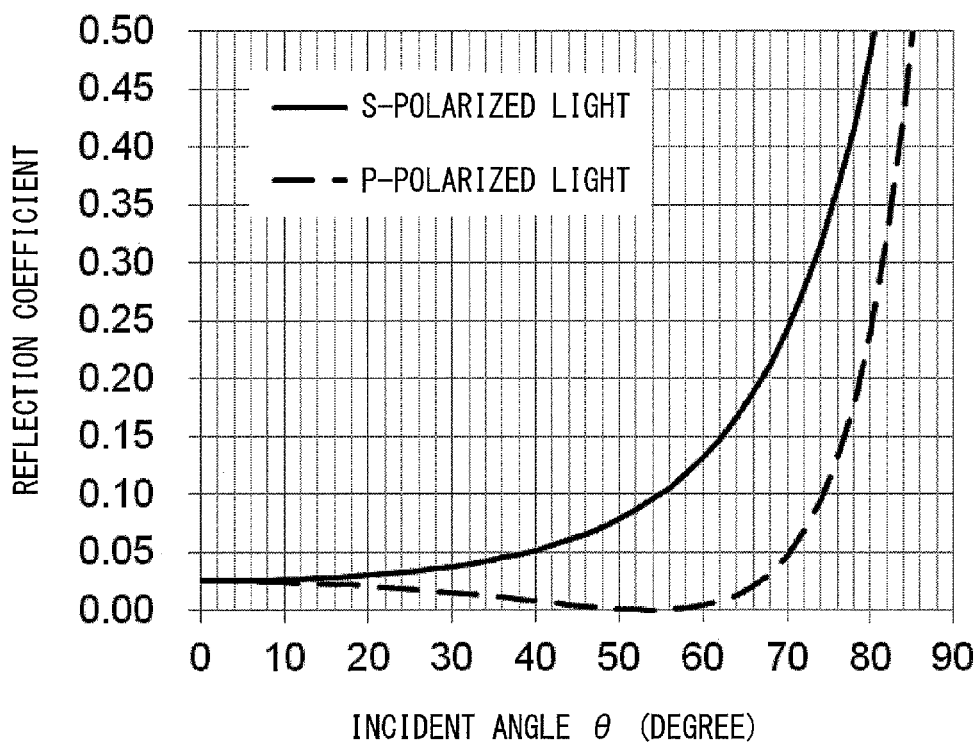

FIG. 8 is a graph showing reflection coefficients of S-polarized light and P-polarized light with respect to an incident angle.

Figure 9:
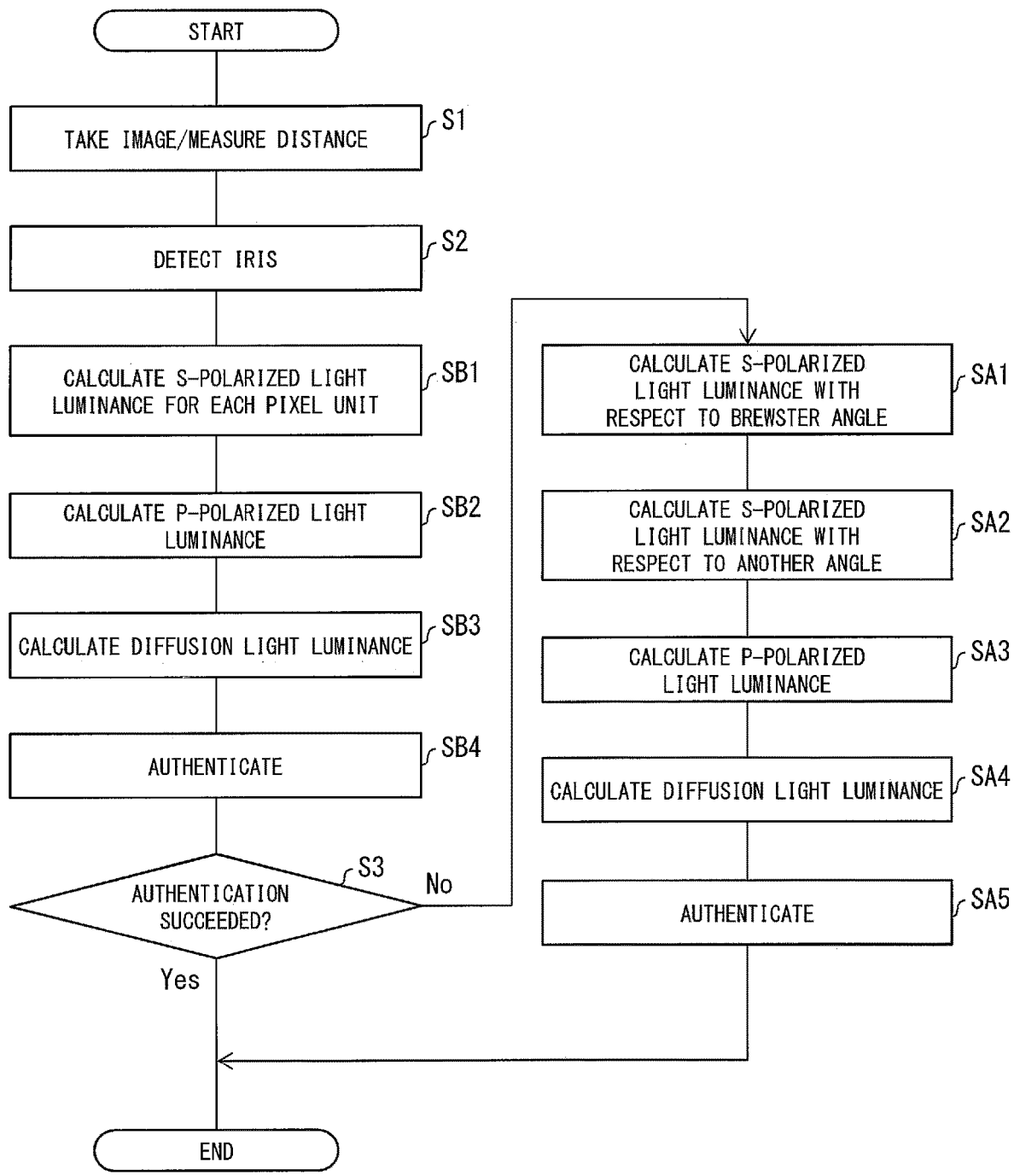

FIG. 9 is a flowchart showing another example of a flow of processes carried out in the image processing method in accordance with Embodiment 1.

Figure 10:
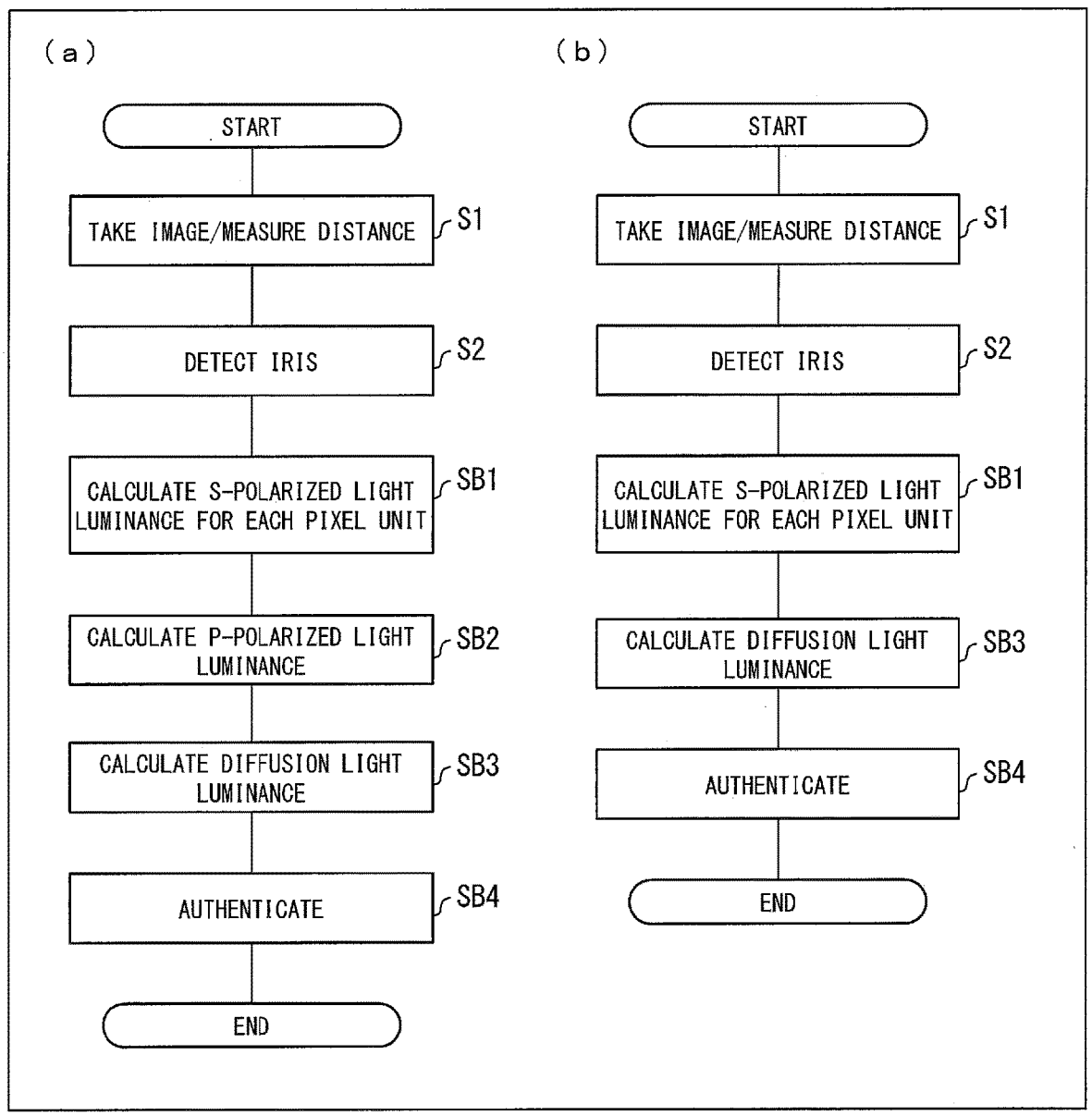

Each of (a) and (b) of FIG. 10 is a flowchart showing still another example of a flow of processes carried out in the image processing method in accordance with Embodiment 1.

Figure 11:
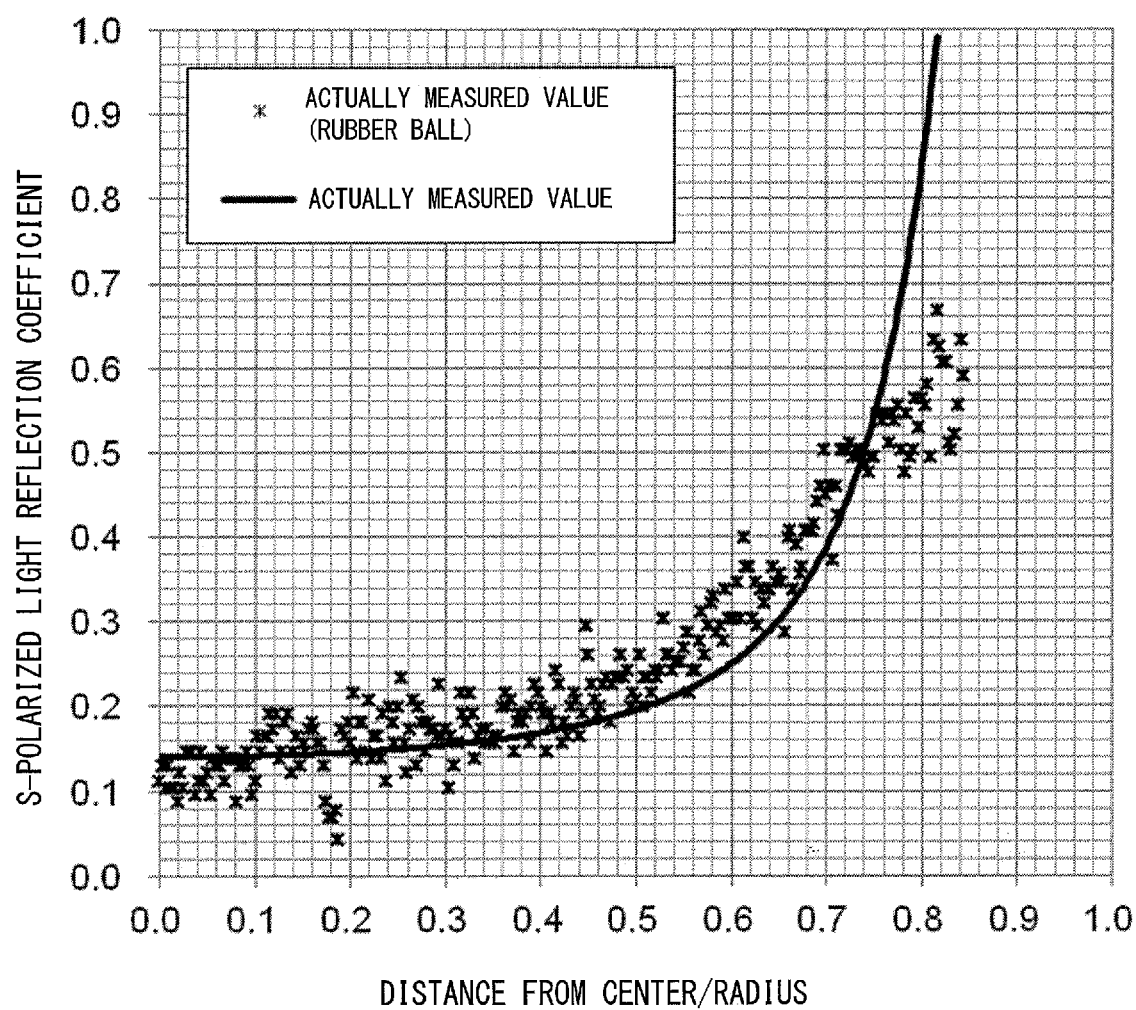

FIG. 11 is a graph showing a reflection coefficient of S-polarized light with respect to an incident angle of light to a rubber ball.

Figure 12:
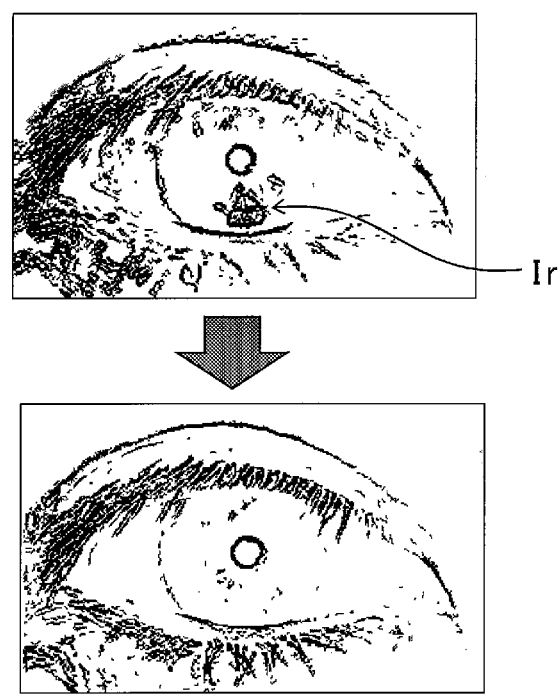

FIG. 12 is a view showing an overview of a picture image showing an experimental result of image processing carried out by the image processing device in accordance with Embodiment 1.

Figure 13:
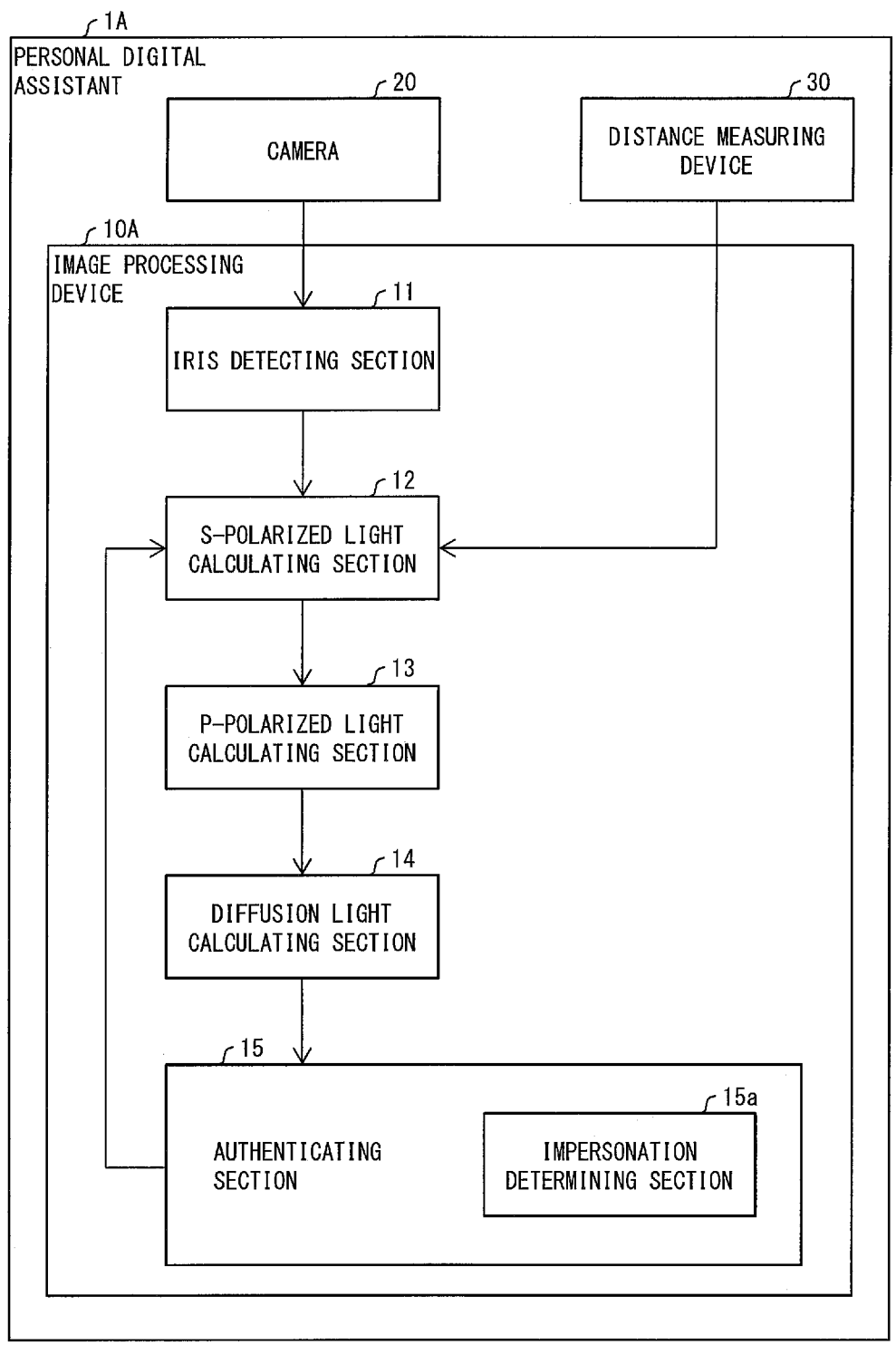

FIG. 13 is a block diagram illustrating a configuration of an image processing device in accordance with Embodiment 3.

Figure 14:
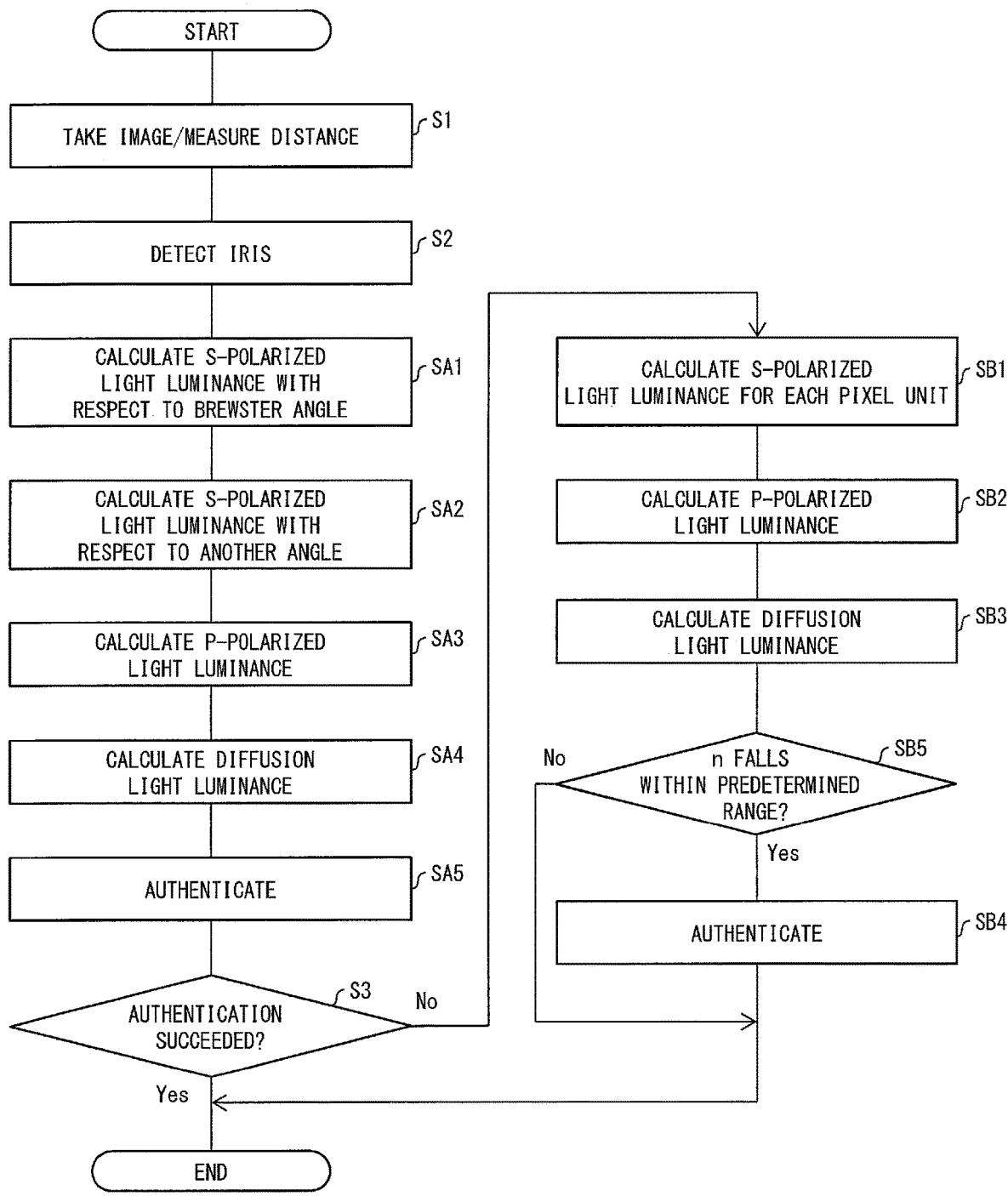

FIG. 14 is a flowchart showing a flow of processes carried out by the image processing device in accordance with Embodiment 3.

Figure 15:
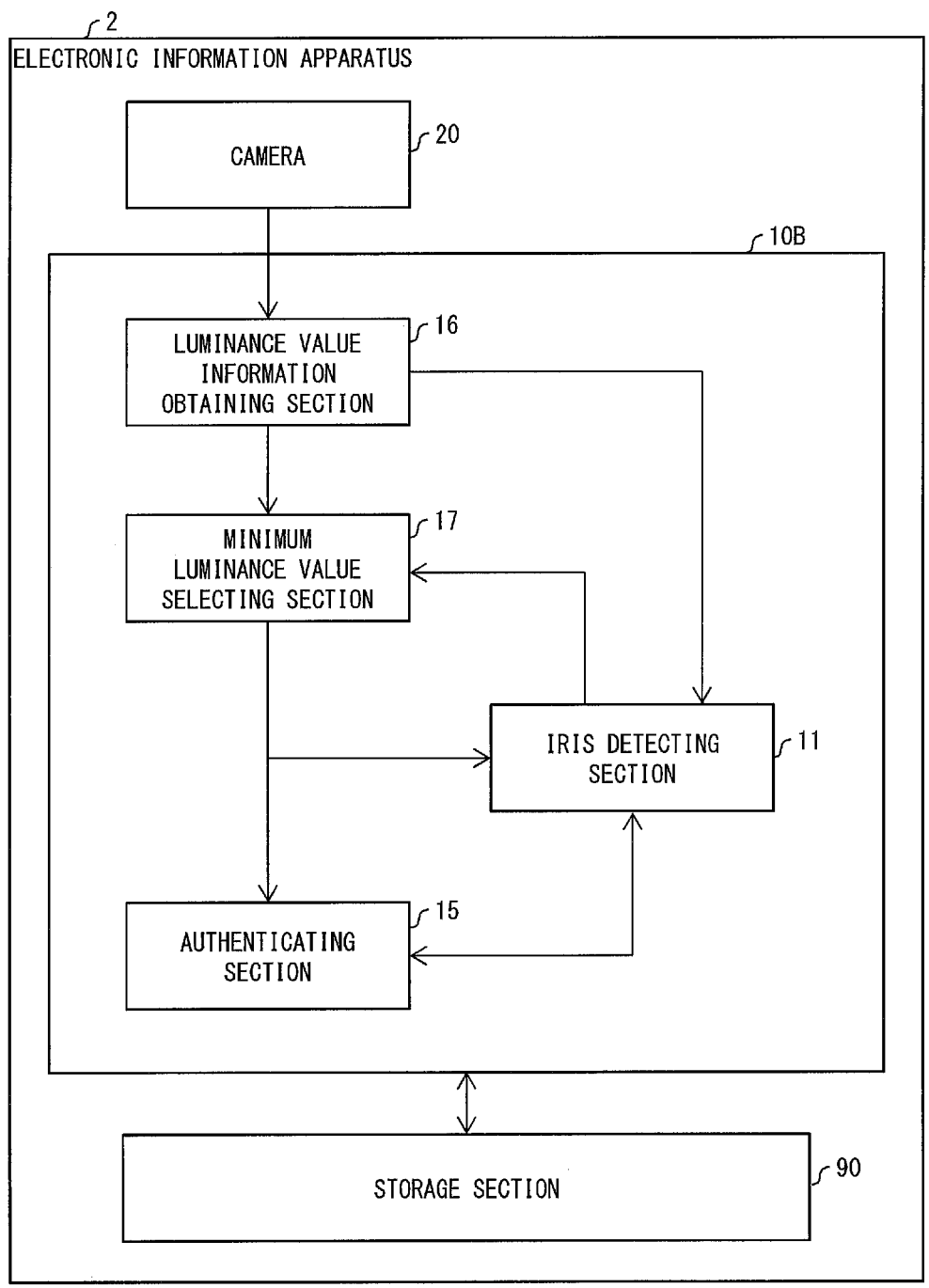

FIG. 15 is a block diagram illustrating a configuration of an electronic information apparatus including an image processing device in accordance with Embodiment 4.

Figure 16:
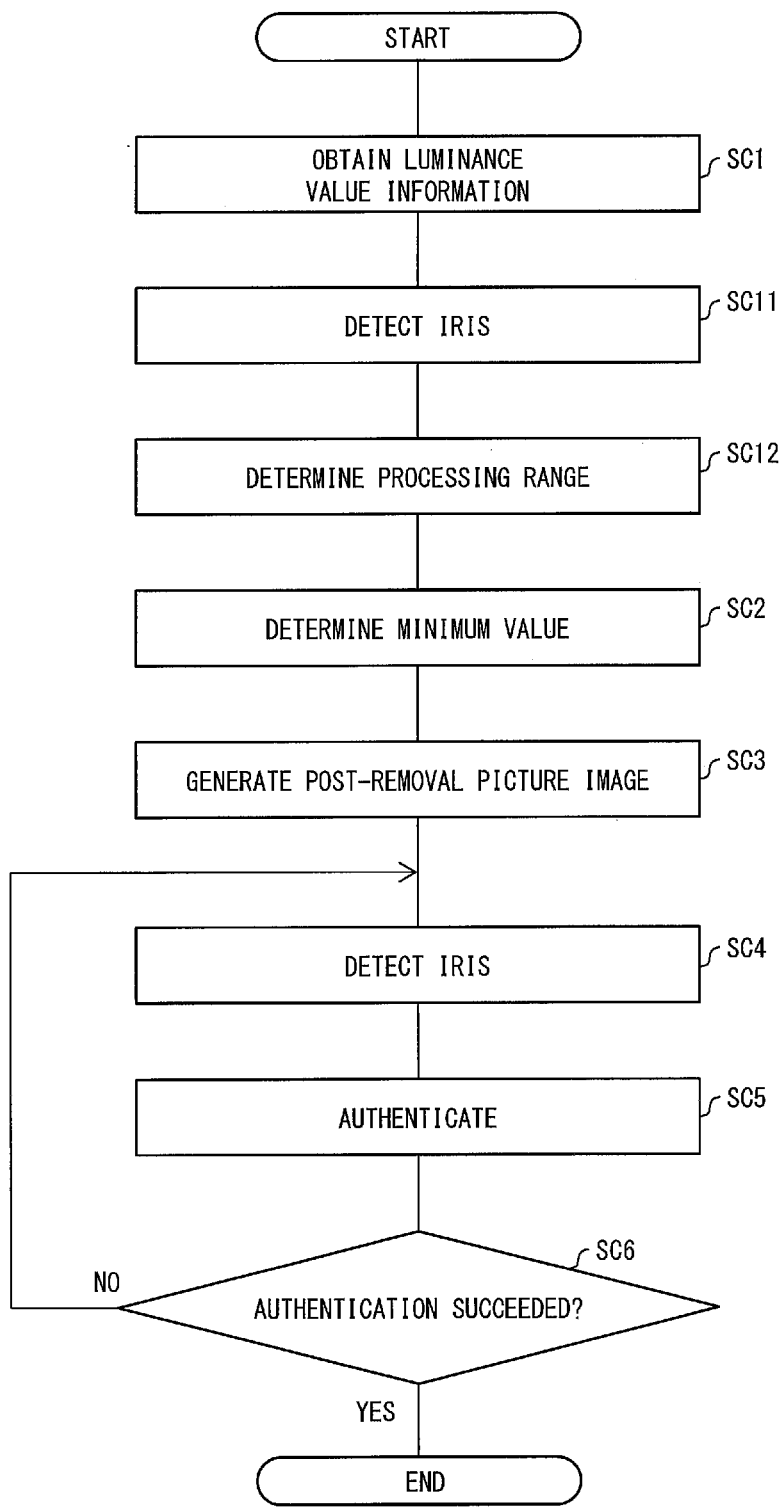

FIG. 16 is a flowchart showing a flow of processes in the image processing device in accordance with Embodiment 4.

Figure 17:
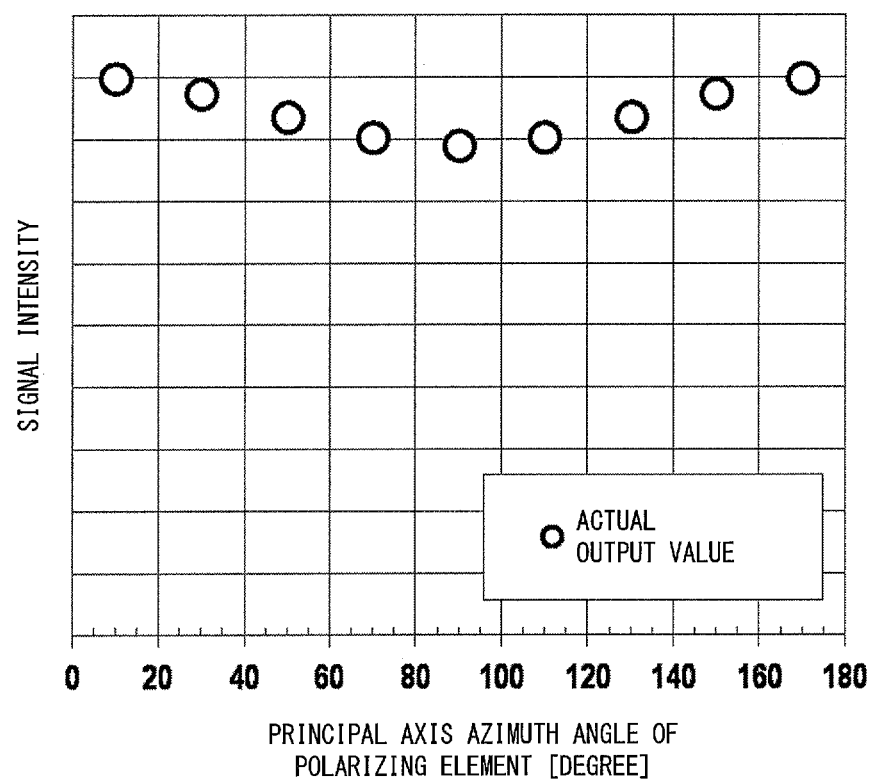

FIG. 17 is a graph showing an example of luminance values of pixels in a unit region.

Figure 18:
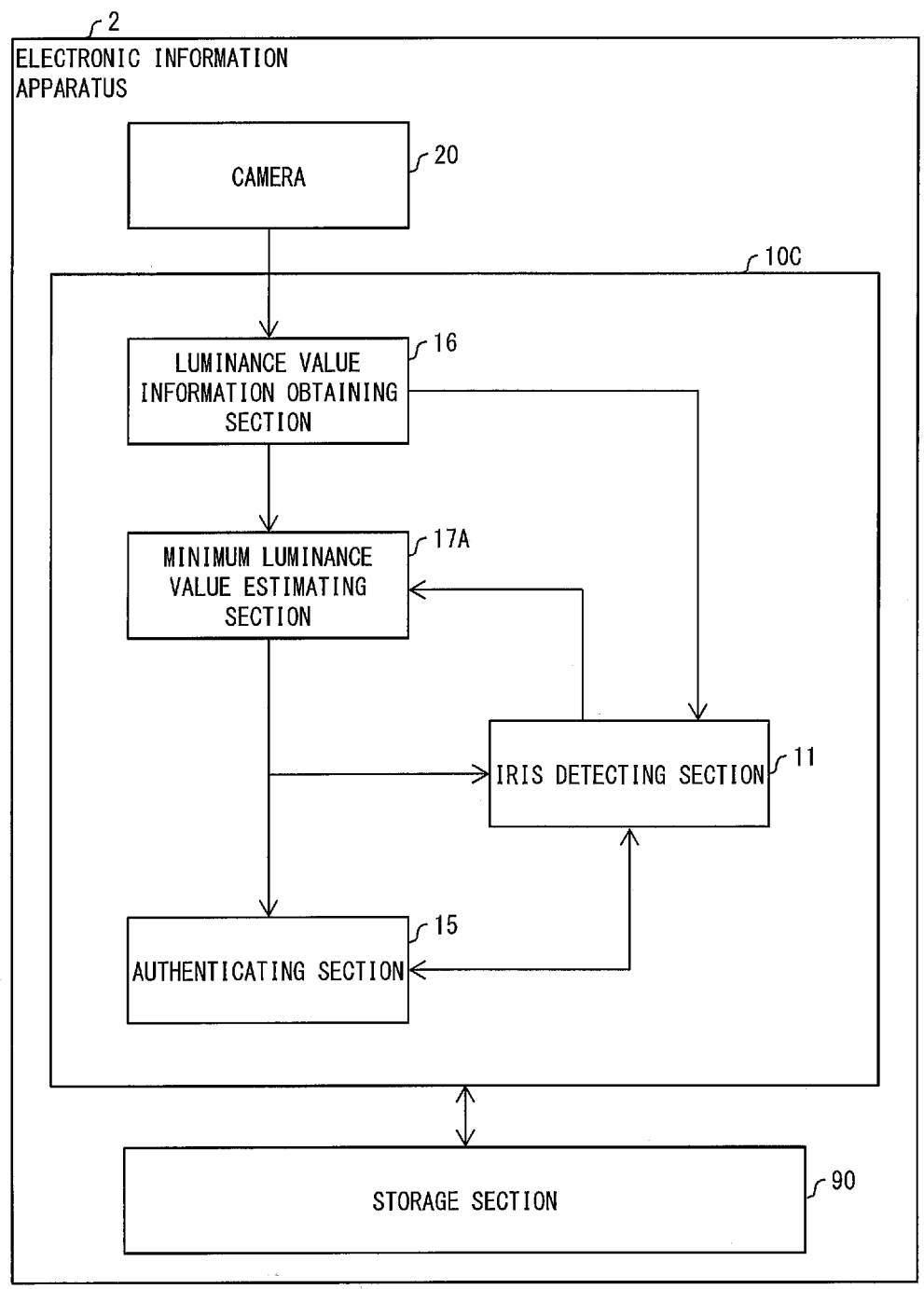

FIG. 18 is a block diagram illustrating a configuration of an electronic information apparatus including an image processing device in accordance with Embodiment 5.

Figure 19:
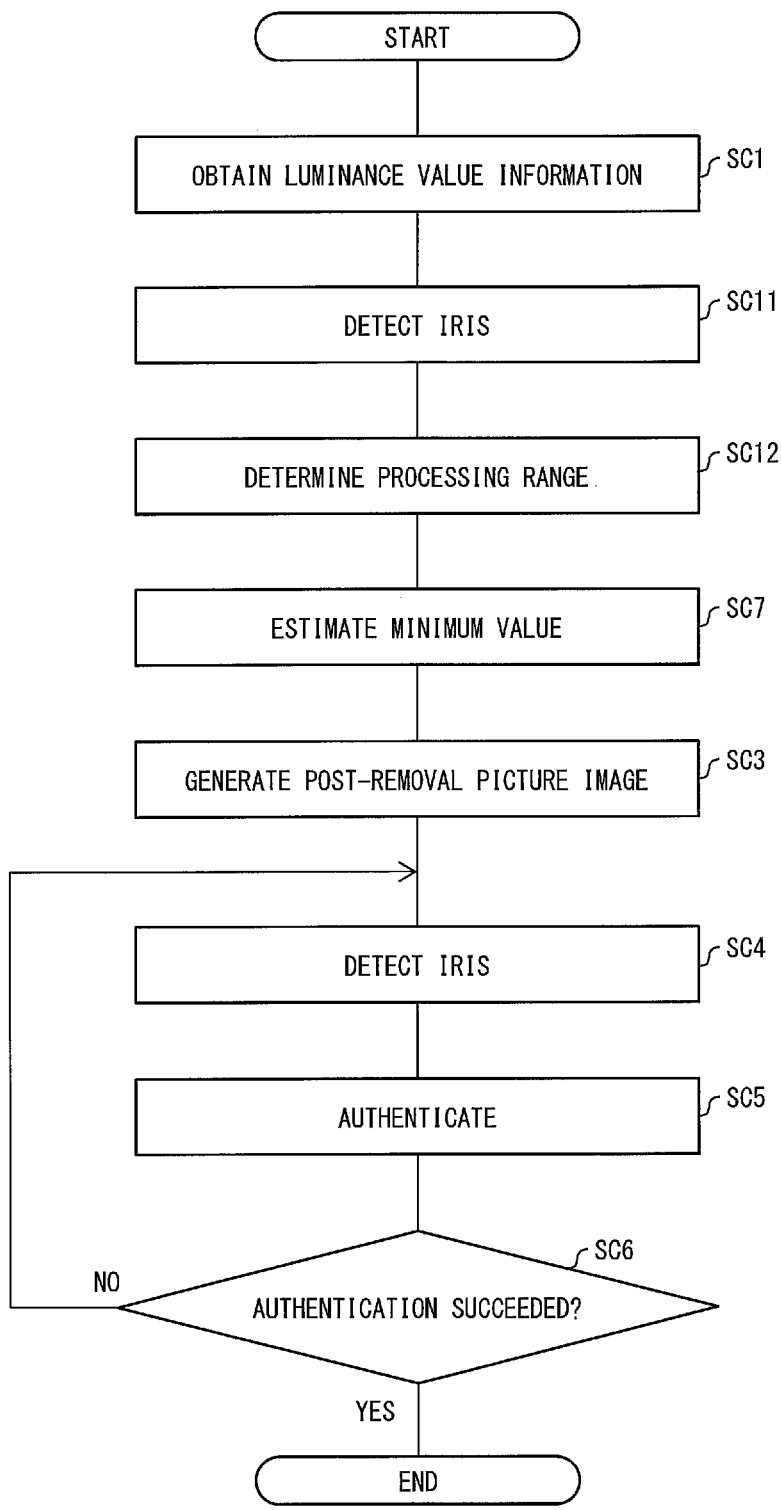

FIG. 19 is a flowchart showing a flow of processes in the image processing device in accordance with Embodiment 5.

Figure 20:
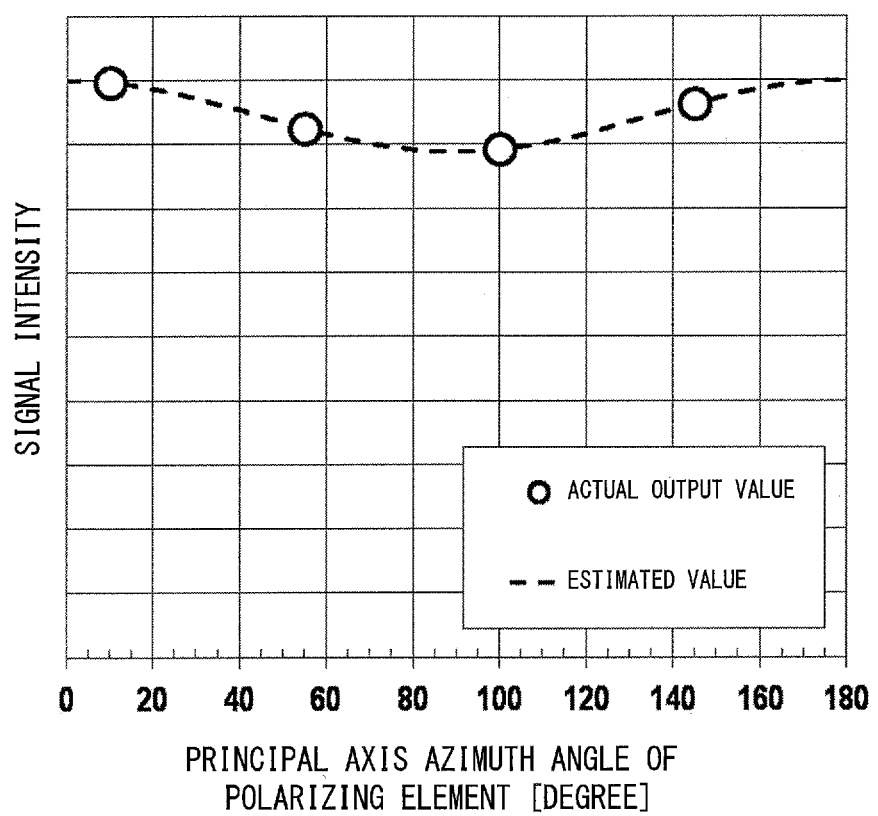

FIG. 20 is a graph showing an example of luminance values of pixels in a unit region.

Figure 21:
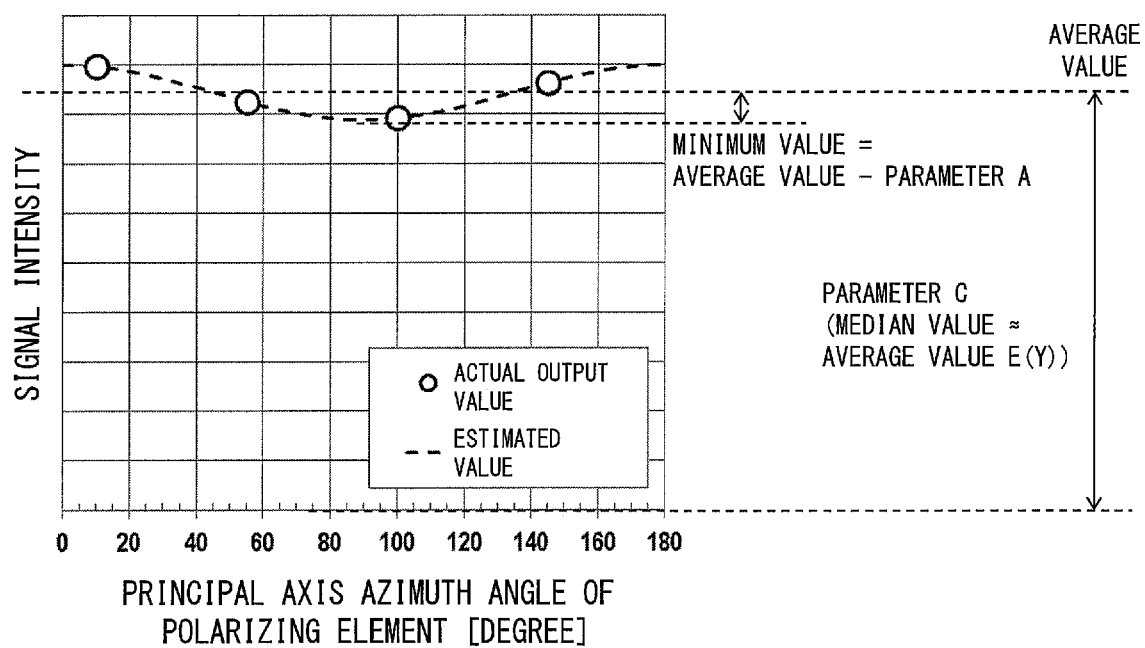

FIG. 21 is a graph showing parameters included in a formula (5-1).

Figure 22:
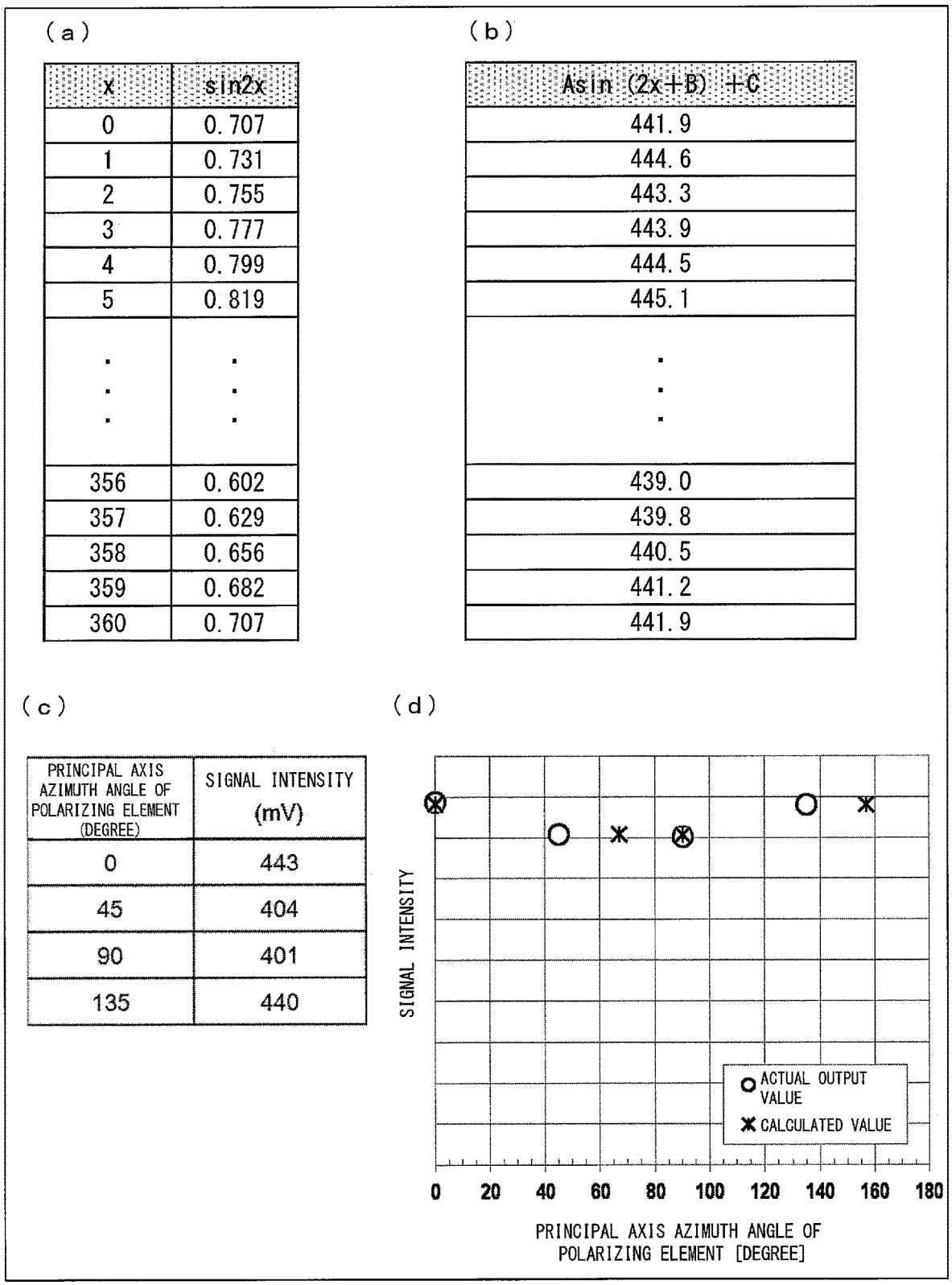

(a) of FIG. 22 is a view showing an example of a look-up table, (b) of FIG. 22 is a view showing an example of a table prepared by a minimum luminance value estimating section, (c) of FIG. 22 is a view showing an example of signal intensities of luminance values, and (d) of FIG. 22 is a graph showing an example of the signal intensities shown in (c) of FIG. 22 and an example of signal intensities indicating luminance values estimated by the minimum luminance value estimating section.

Figure 23:
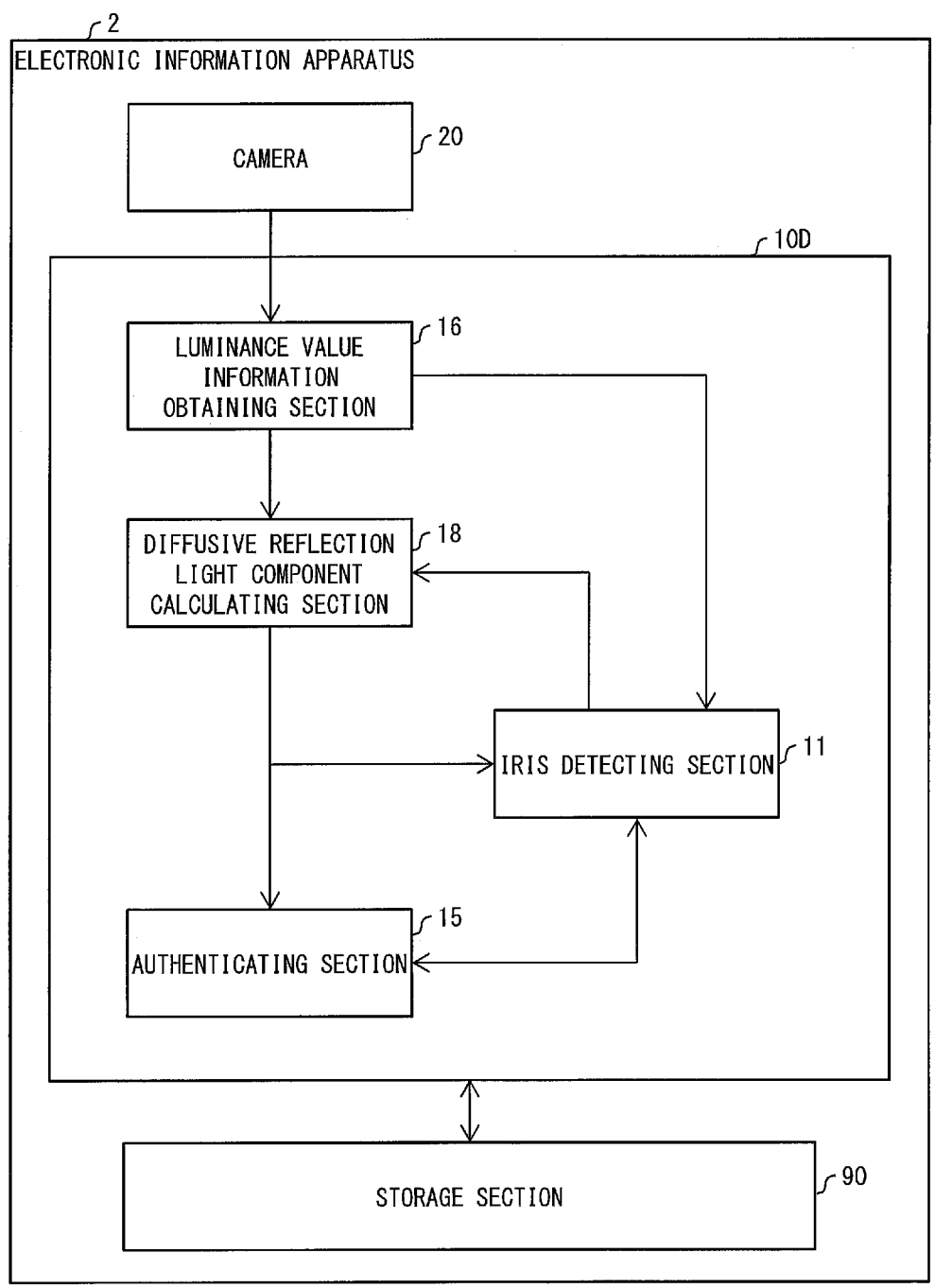

FIG. 23 is a block diagram illustrating a configuration of an electronic information apparatus including an image processing device in accordance with Embodiment 6.

Figure 24:
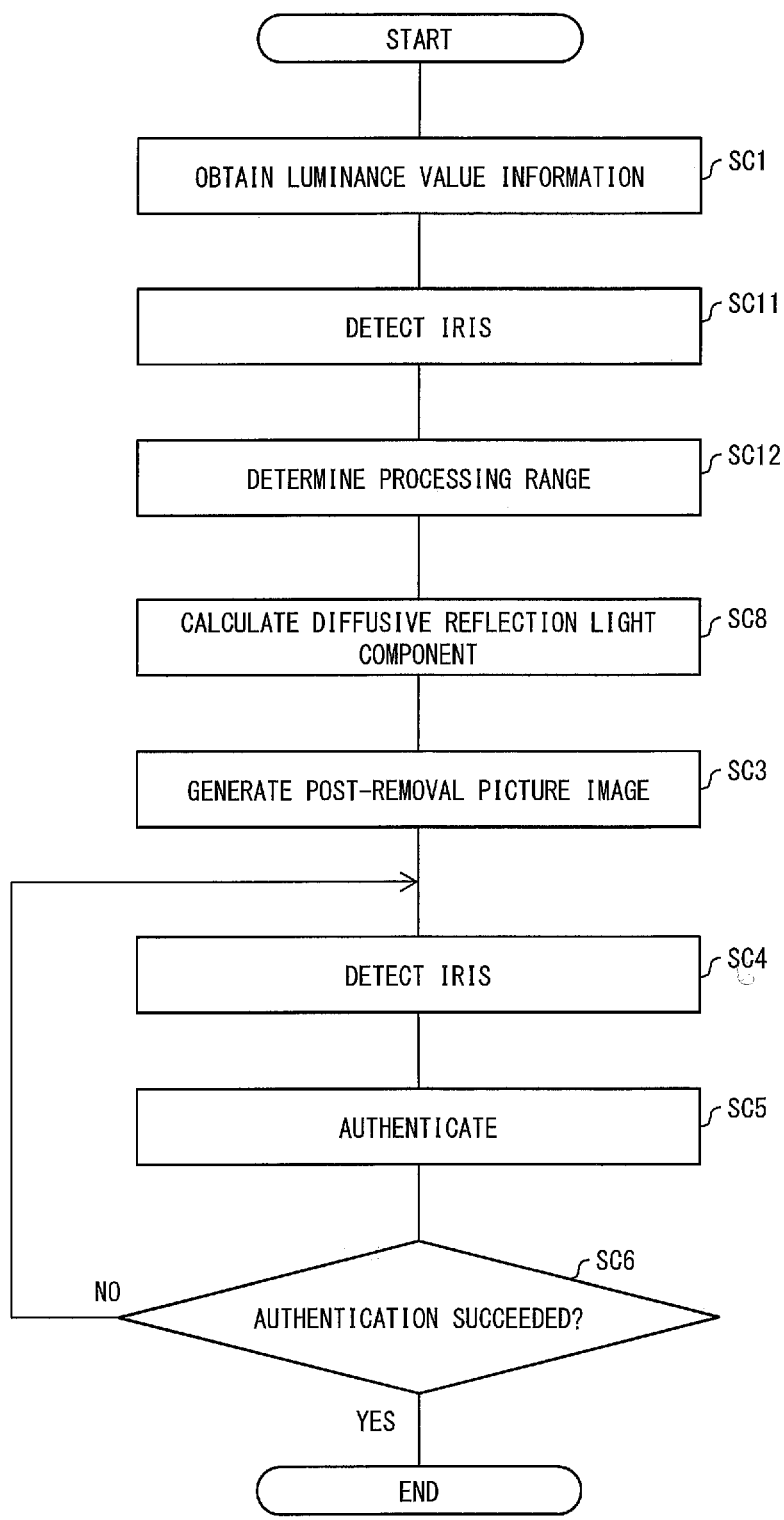

FIG. 24 is a flowchart showing a flow of processes in the image processing device in accordance with Embodiment 6.

Figure 25:
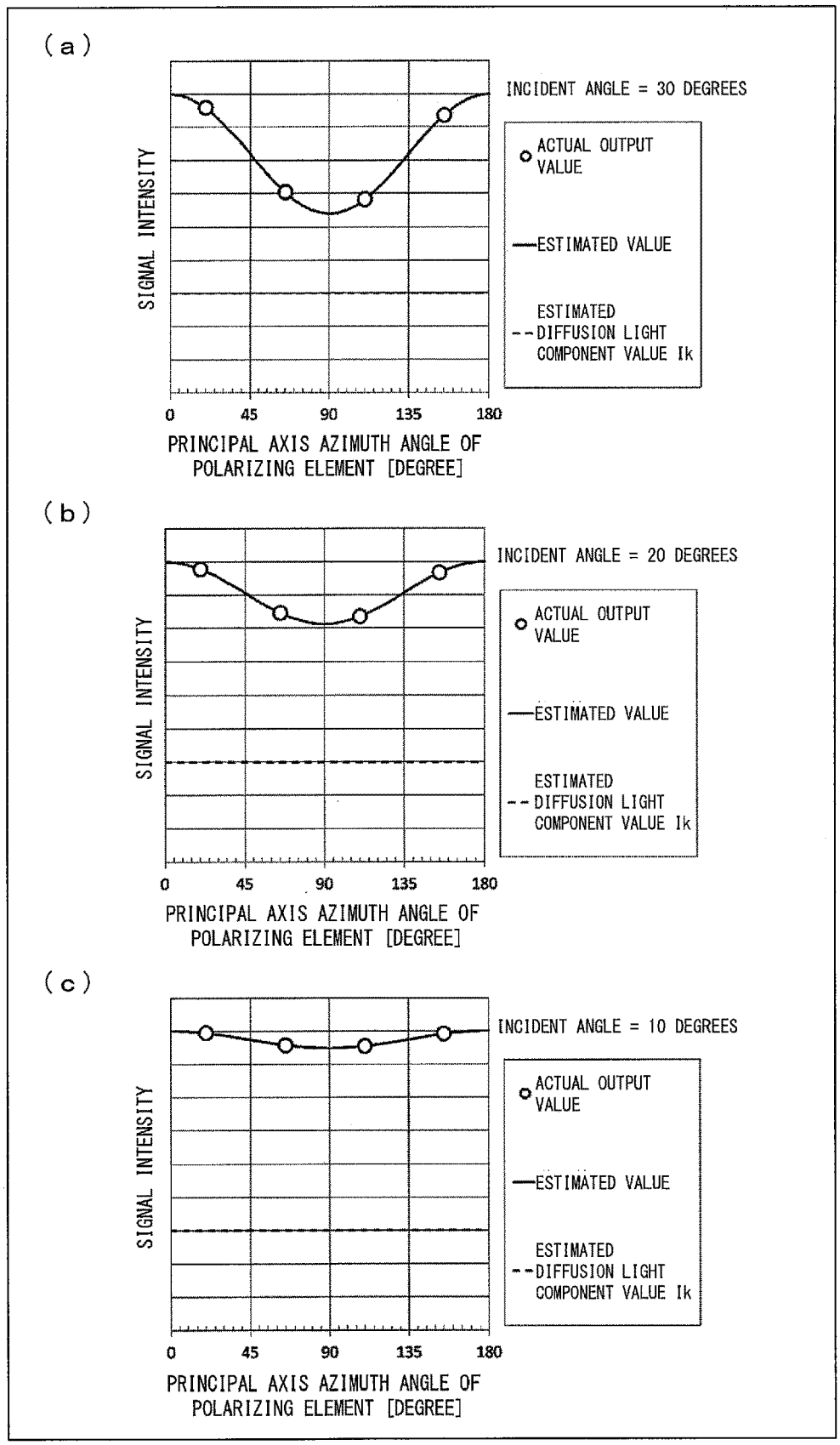

FIG. 25 is graphs showing examples of effective radiance values of pixels included in a pixel unit, estimated values of possible effective radiance values of the pixels included in the pixel unit, and estimated values of a diffusion light component. (a) of FIG. 25 is a graph of a pixel unit which reflected light enters in a case where light has reached an eyeball at an incident angle of 30° and has been reflected by the eyeball, (b) of FIG. 25 is a graph of a pixel unit which reflected light enters in a case where light has reached an eyeball at an incident angle of 20° and has been reflected by the eyeball, and (c) of FIG. 25 is a graph of a pixel unit which reflected light enters in a case where light has reached an eyeball at an incident angle of 10° and has been reflected by the eyeball.

Figure 26:
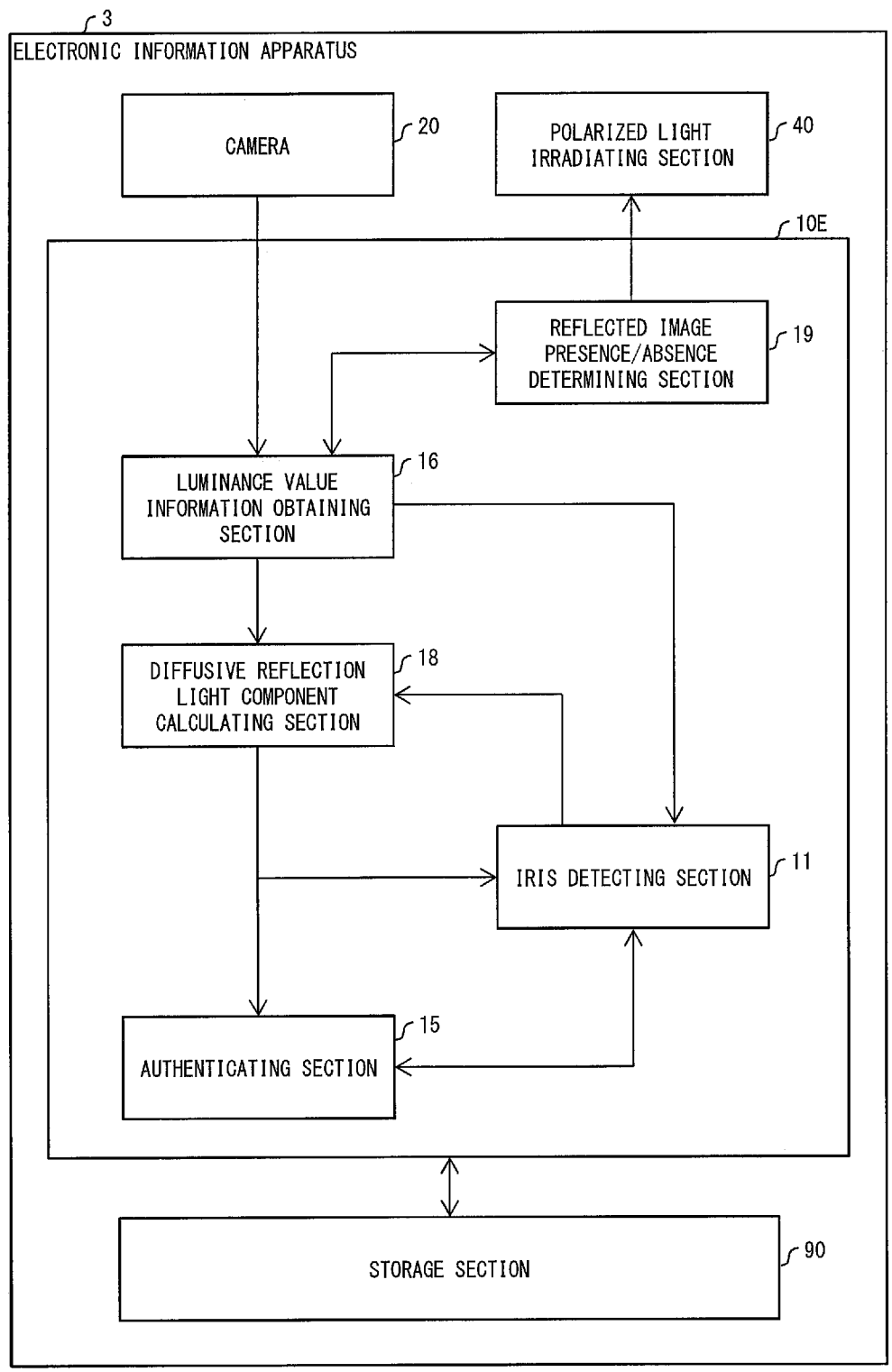

FIG. 26 is a block diagram illustrating a configuration of an electronic information apparatus including an image processing device in accordance with Embodiment 8.

Figure 27:
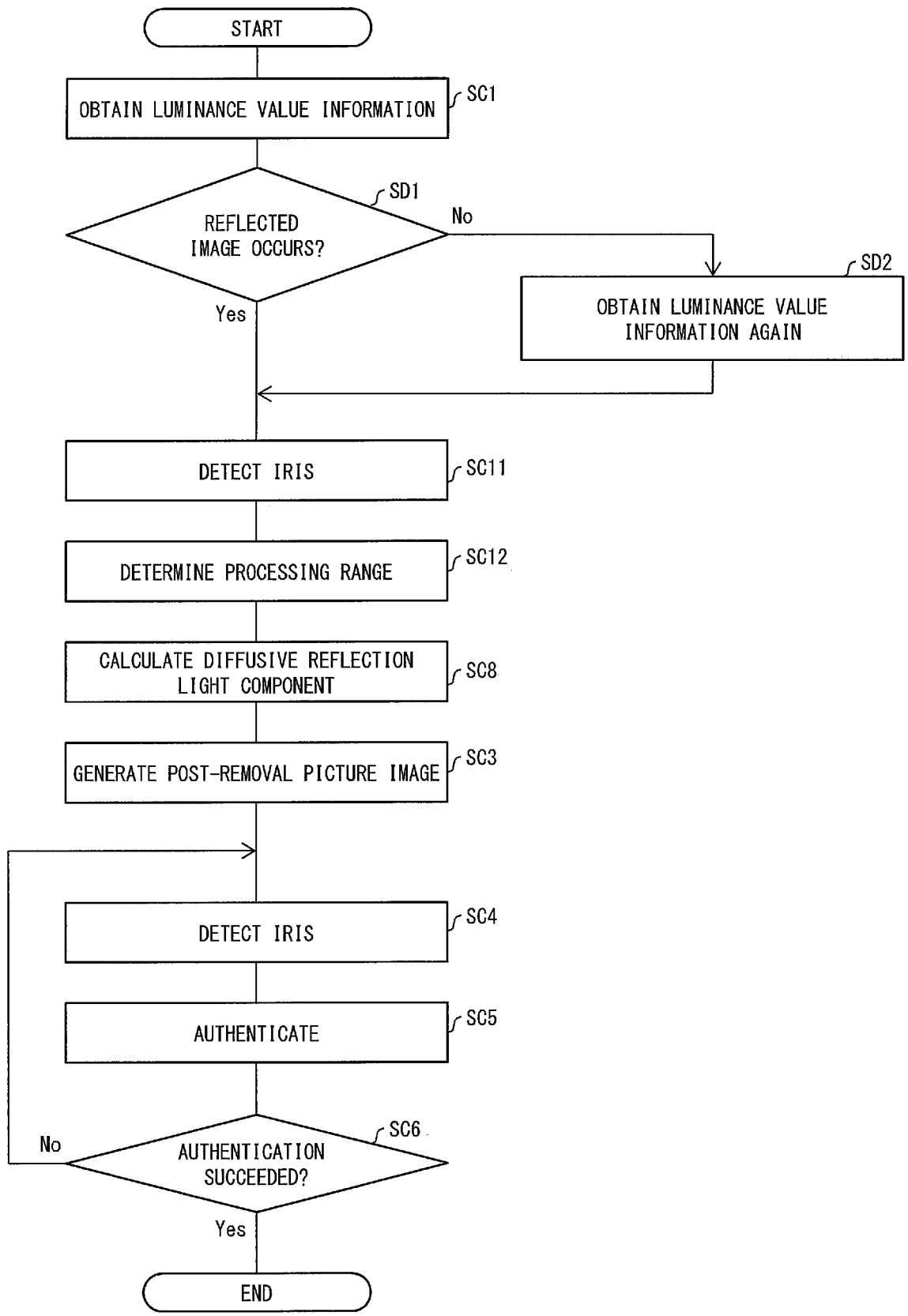

FIG. 27 is a flowchart showing a flow of processes in the image processing device in accordance with Embodiment 8.

Figure 28:
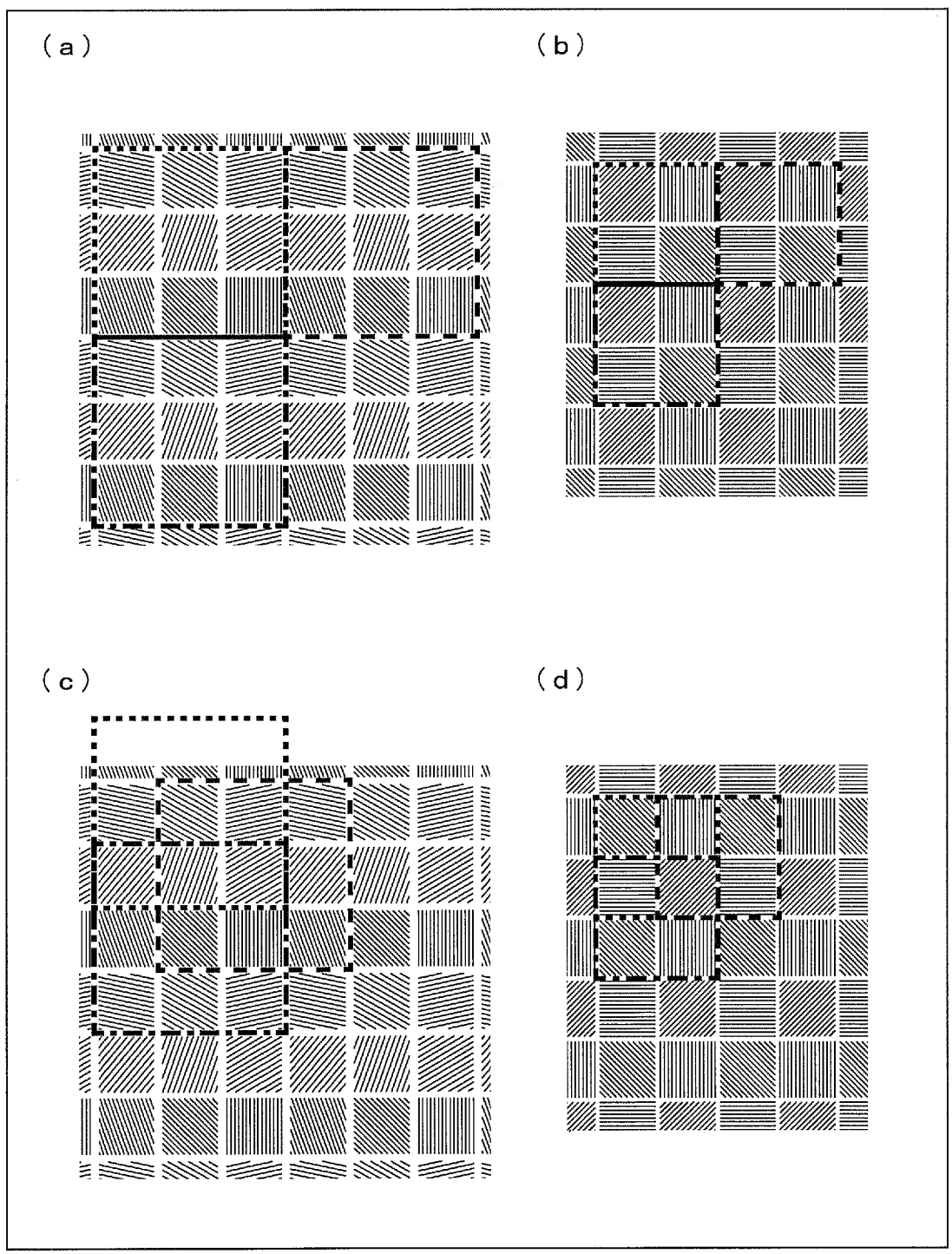

FIG. 28 is a view showing an arrangement of pixel units. (a) of FIG. 28 is a view illustrating a state in which pixel units each of which is made up of nine pixels are arranged so as not to overlap with each other, (b) of FIG. 28 is a view illustrating a state in which pixel units each of which is made up of four pixels are arranged so as not to overlap with each other, (c) of FIG. 28 is a view illustrating a state in which pixel units each of which is made up of nine pixels are arranged so as to partially overlap with each other, and (d) of FIG. 28 is a view illustrating a state in which pixel units each of which is made up of four pixels are arranged so as to partially overlap with each other.

Figure 29:
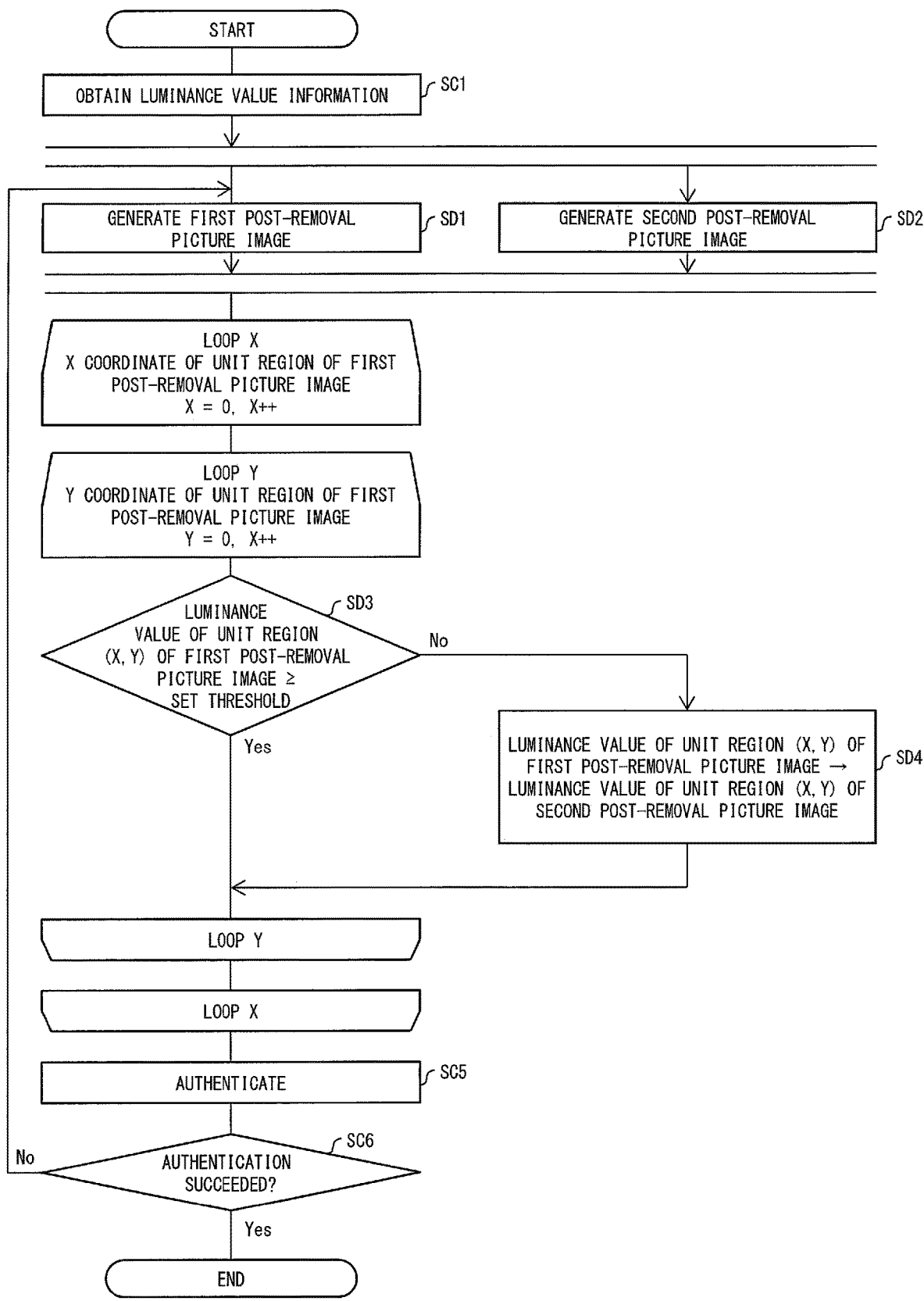

FIG. 29 is a flowchart showing a flow of processes in an image processing device which simultaneously executes an image processing of Embodiment 6 and another image processing.

Figure 30:
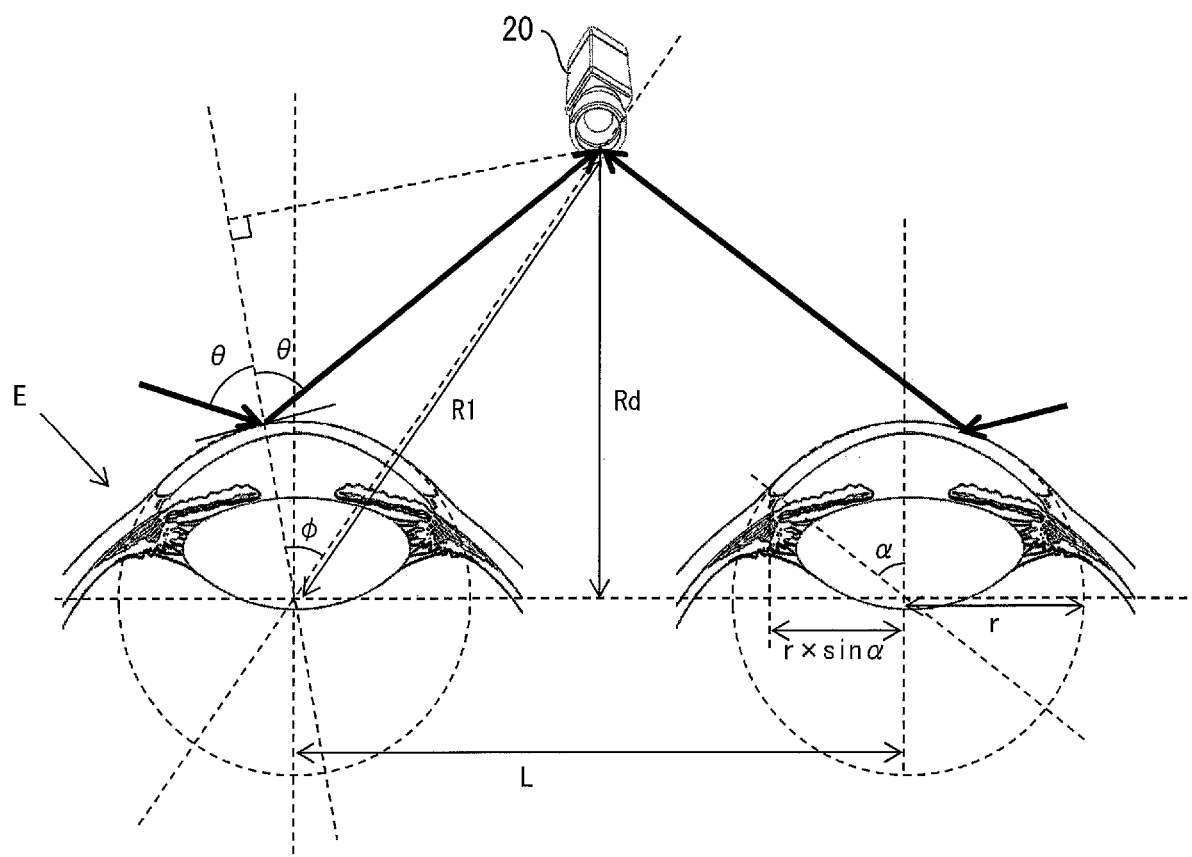

FIG. 30 is a view for explaining a case where a subject includes eyeballs of both eyes.

DESCRIPTION OF EMBODIMENTS

[Embodiment 1]

The following description will discuss details of Embodiment 1 of the present invention. An image processing device in accordance with Embodiment 1 is a device which carries out authentication based on a picture image of an iris of an eyeball of a human.

(Overview of Image Processing Device 10)

Figure 2:
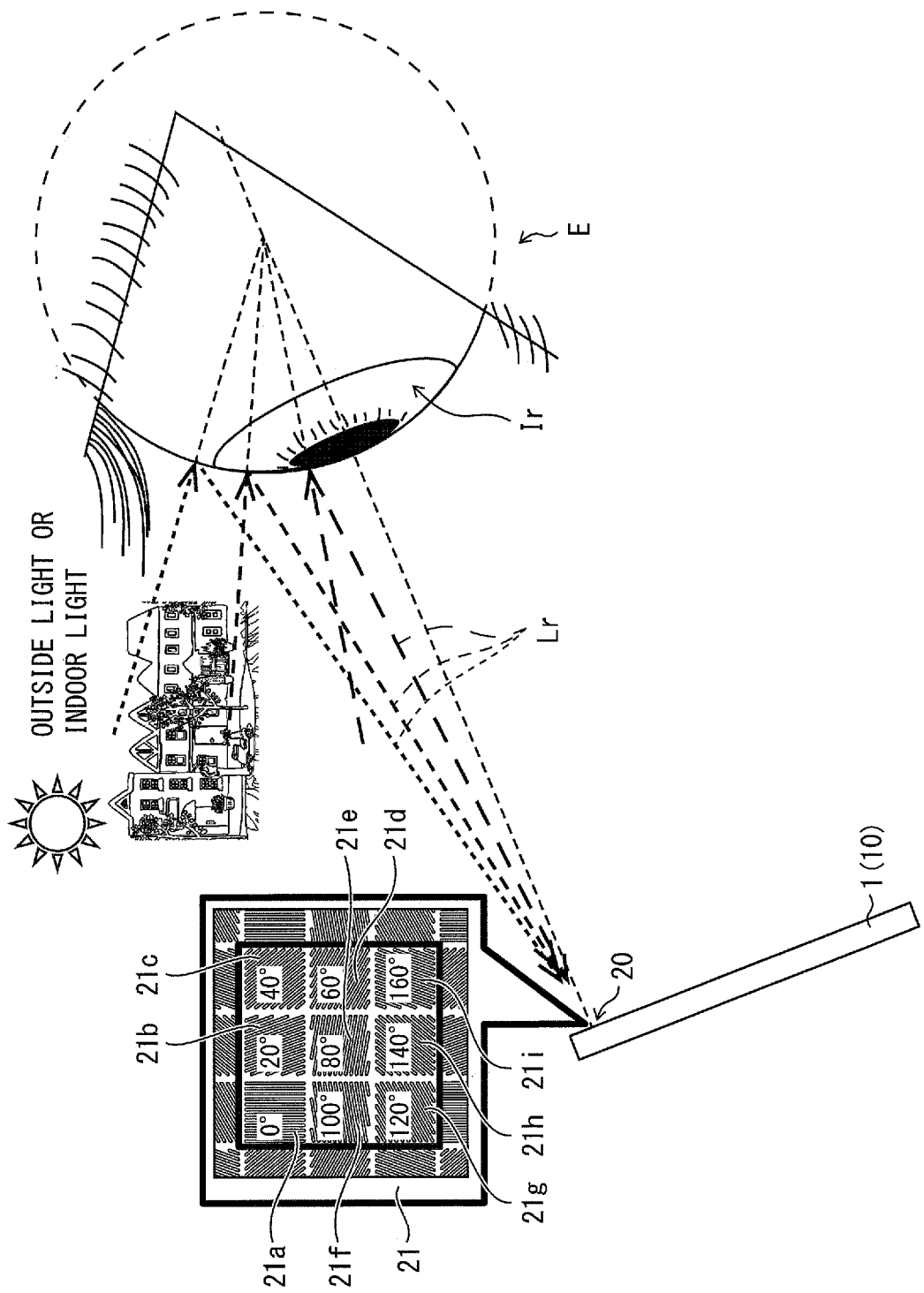
FIG. 2 is a view for explaining an overview of an image processing device.

First, the following description will discuss an overview of an image processing device 10. FIG. 2 is a view for explaining an overview of the image processing device 10. The image processing device 10 carries out image processing with respect to a picture image of a subject. Specifically, the image processing device 10 carries out a process of separating a diffuse reflection component from a specular reflection component which are contained in reflected light from the subject. In Embodiment 1, the image processing device 10 is mounted on a personal digital assistant 1.

The personal digital assistant 1 is, for example, a terminal which can separate the above two reflection components from each other in a picture image of an eyeball E (subject) of a user and carry out iris authentication of the user with use of the picture image in which one of the two reflection components are removed. The personal digital assistant 1 includes the image processing device 10 and a camera 20 as illustrated in FIG. 2. Details of the image processing device 10 will be described later. Note that the subject in accordance with an aspect of the present invention is not limited to an eyeball, provided that an image may be reflected on the subject.

The camera 20 takes a picture image of the subject in accordance with a user operation. In Embodiment 1, as illustrated in FIG. 2, the camera 20 takes a picture image of an eyeball E of the user. Moreover, the camera 20 mainly includes an integrated polarizer 21 and a light-receiving element 22 (image pickup device) (see FIG. 3). The integrated polarizer 21 and the light-receiving element 22 are laminated in this order in a direction in which light enters the camera 20.

The integrated polarizer 21 is made up of a plurality of polarizing elements whose principal axis directions are different from each other. In the integrated polarizer 21 of Embodiment 1, the plurality of polarizing elements correspond to respective pixels. In Embodiment 1, the integrated polarizer 21 includes nine polarizing elements, i.e., polarizing elements 21*a* through 21*i* which correspond to respective nine pixels which are adjacent to each other (see FIG. 2). Specifically, the polarizing elements 21*a* through 21*i* have, in the respective pixels, polarization angles of 0°, 20°, 40°, 60°, 80°, 100°, 120°, 140°, and 160°, respectively.

The light-receiving element 22 has a configuration in which pixel units, each of which is made up of the plurality of pixels associated with the respective polarizing elements 21*a* through 21*i*, are two-dimensionally arranged.

In a case where iris authentication of the user is carried out with the personal digital assistant 1, a picture image of the eyeball E of the user is taken by the camera 20. As illustrated in FIG. 2, in a case where the eyeball E of the user is irradiated with outside light or indoor light, the light is reflected on a surface of the eyeball E, and thus reflected light Lr is to enter the camera 20.

In the case where the eyeball E of the user is irradiated with outside light (sunlight) or indoor light and the camera 20 obtains the reflected light Lr which is the outside light or indoor light reflected on the iris, the camera 20 obtains a picture image including an image of the iris of the user, and the personal digital assistant 1 carries out user authentication by analyzing the image of the iris. Meanwhile, in a case where an object O exists in sight of the user, an image of the object O is reflected on the eyeball E due to influence of outside light or indoor light, and a reflected image Ir is formed on the eyeball E (see FIG. 2). That is, in a case where the object O reflects outside light or indoor light and the eyeball E is irradiated with the light thus reflected by the object O, the reflected image Ir is formed on the eyeball E. Then, the camera 20 obtains, as the reflected image Ir, the reflected light Lr (i.e., outside light or indoor light which has been reflected), and thus obtains a picture image including the reflected image Ir. Unless the personal digital assistant 1 carries out a process of removing the reflected image Ir from the obtained picture image that includes the image of the iris and the reflected image Ir, there is a possibility that the image analysis on the iris is influenced by the reflected image Ir, and accurate iris authentication cannot be carried out.

In particular, under irradiation with sunlight, an image is clearly reflected on the eyeball E of the user, and it is therefore difficult to carry out accurate iris authentication outdoors. Although it is possible to reduce influence of sunlight in iris authentication by irradiating the eyeball E of the user with light having an intensity higher than that of sunlight, such irradiation of the eyeball E or skin with the highly intense light may cause deterioration in state of the eyeball E or the skin.

The personal digital assistant 1 in accordance with Embodiment 1 includes the integrated polarizer 21 and the image processing device 10, and is therefore possible to carry out accurate iris authentication while reducing influence of the reflected image Ir in iris image analysis, without irradiating the eyeball E with the highly intense light as above described.

Figure 3:
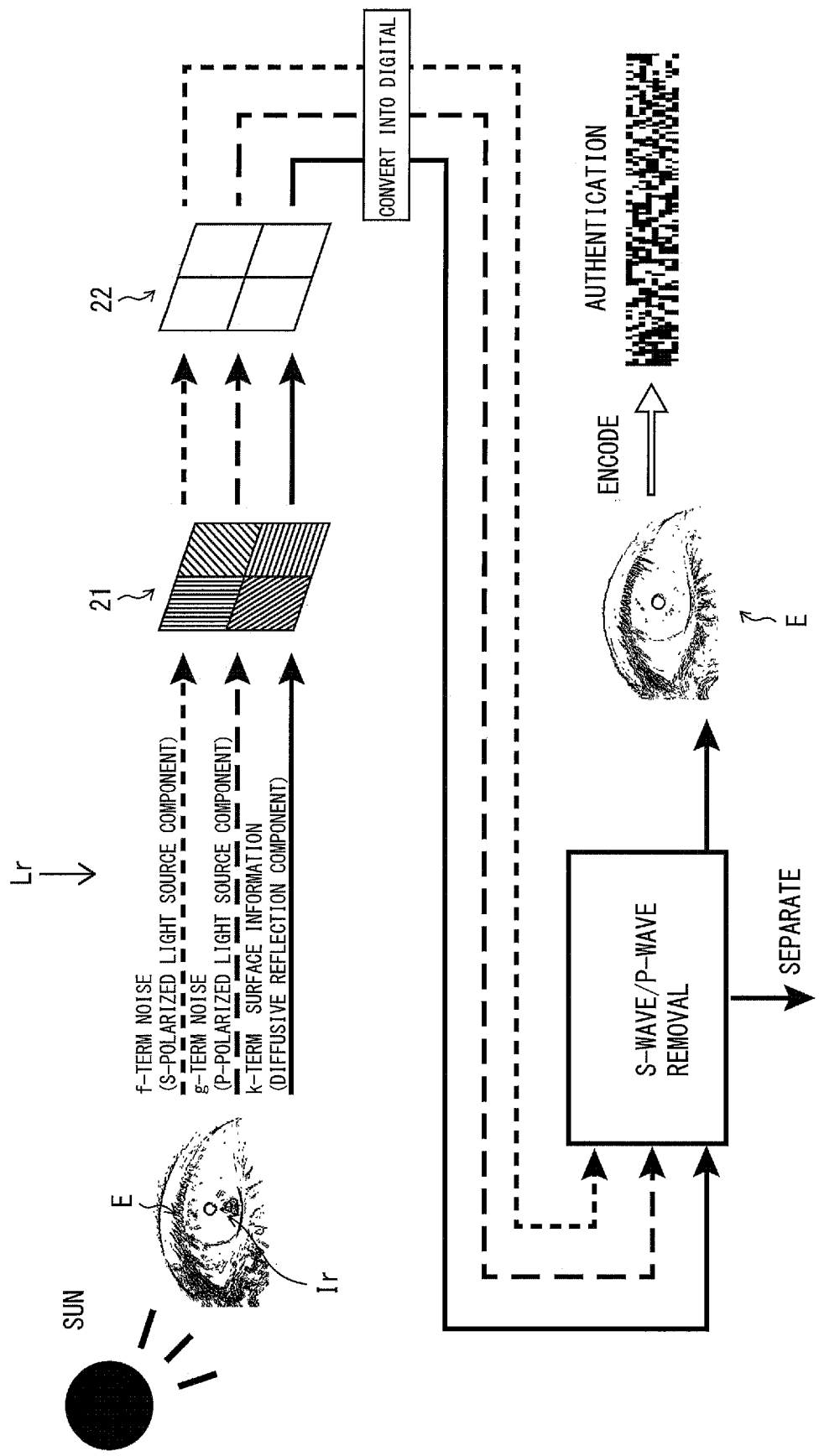
FIG. 3 is a view for explaining an overview of image processing carried out by an image processing device.

Next, the following description will discuss an overview of a process that is carried out by the image processing device 10 for reducing the above described influence, with reference to FIG. 3. FIG. 3 is a view for explaining an overview of an image processing that is carried out by the image processing device 10. Note that, in FIG. 3, the integrated polarizer 21 is illustrated in a simplified manner.

In an example shown in FIG. 3, a picture image of the eyeball E of the user is taken for iris authentication under irradiation with sunlight. Moreover, a reflected image Ir of an object O is formed on the eyeball E of the user.

In a case where a picture image of the eyeball E of the user is taken with the camera 20 for iris authentication, reflected light Lr from the eyeball E of the user is received by the light-receiving element 22 via the integrated polarizer 21.

Here, in general, an intensity of light (in this case, reflected light Lr showing the iris used in an authentication process) forming an image used in an image processing is mostly based on a diffuse reflection component. In Embodiment 1, the light is processed as light showing surface information which is indicative of a surface of the eyeball E (specifically, iris) and is necessary for the authentication process. On the other hand, an intensity of light (in this case, reflected light Lr showing the object O that causes adverse influence on the authentication process) forming an image that is a noise to be removed in the image processing is mostly based on a specular reflection component. The specular reflection component includes an S-polarized light source component (S-polarized light component) and a P-polarized light source component (P-polarized light component).

In FIG. 3, a picture image of the eyeball E including the reflected image Ir and the iris is taken, and therefore reflected light Lr containing the above three types of reflection components is received by the light-receiving element 22 via the integrated polarizer 21. In this case, it is necessary to remove the S-polarized light component and the P-polarized light component from the reflected light Lr which has been received by the light-receiving element 22.

In Embodiment 1, a digital conversion process is carried out with respect to the reflected light Lr which has been received by the light-receiving element 22, and a process (S-wave/P-wave removal) of removing the S-polarized light component and the P-polarized light component is carried out with respect to the reflected light Lr which has been converted into a digital signal. Thus, the reflected image Ir is removed from the picture image of the eyeball E which is necessary for the authentication process (see FIG. 3). The personal digital assistant 1 encodes the picture image from which the reflected image Ir has been removed (i.e., the picture image including only the image of the iris of the eyeball E), and thus generates data of the eyeball E for authentication. As such, the personal digital assistant 1 can carry out accurate iris authentication.

Note that, in order to carry out iris authentication more accurately, it is possible to carry out a known independent component analysis (ICA) process after the process of removing the S-polarized light component and the P-polarized light component.

(Configuration of Personal Digital Assistant 1)

Figure 4:
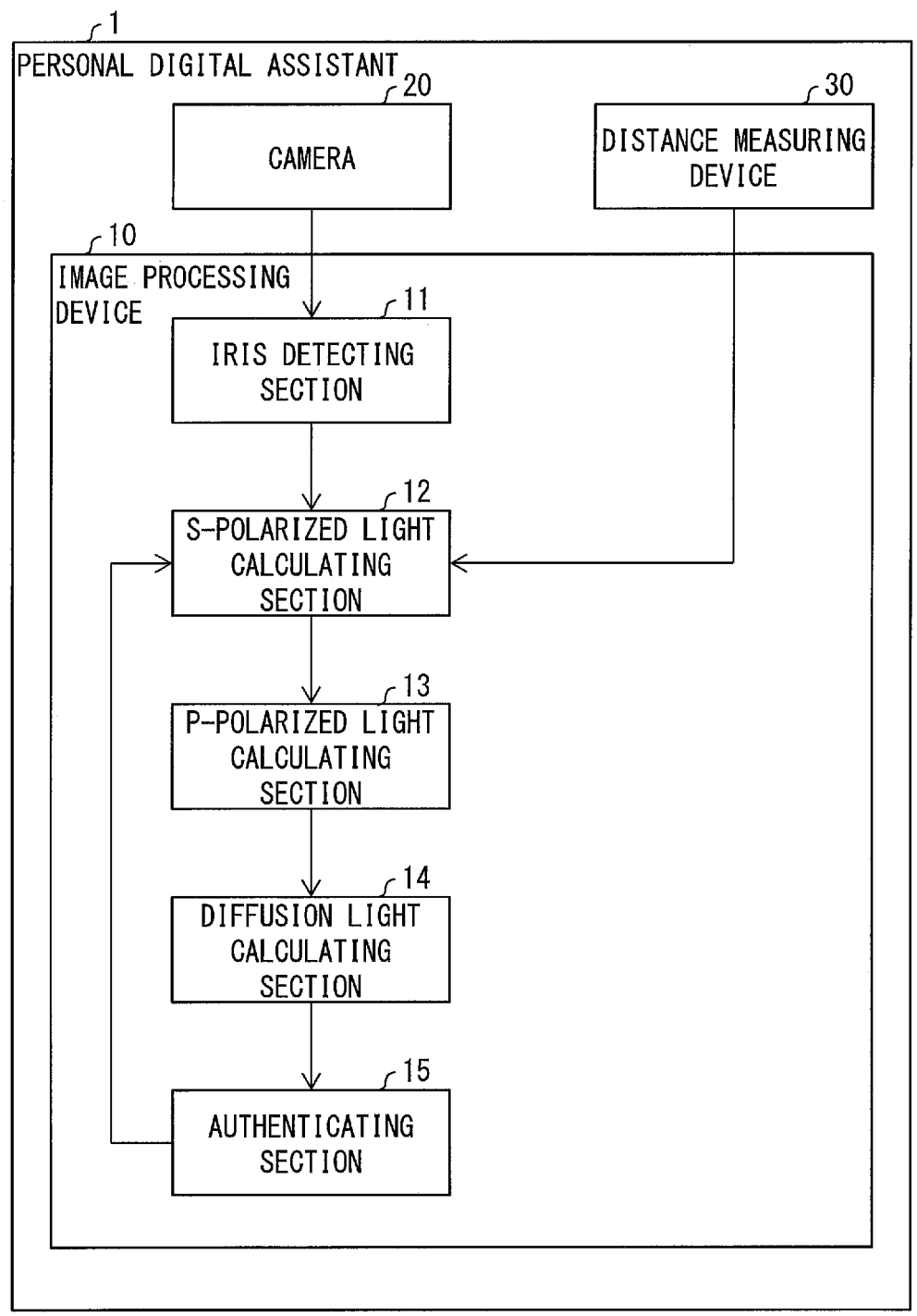
FIG. 4 is a block diagram illustrating a configuration of a personal digital assistant which includes the image processing device in accordance with Embodiment 1.

FIG. 4 is a block diagram illustrating a configuration of the personal digital assistant 1 which includes the image processing device 10 for carrying out the image processing method of Embodiment 1. As illustrated in FIG. 4, the personal digital assistant 1 includes the image processing device 10, the camera 20, and a distance measuring device 30 which (i) measures a distance from the camera 20 to each point on the surface of the eyeball E of the user and (ii) transmits the distance to an S-polarized light calculating section 12 (described later).

In Embodiment 1, an example is described in which the personal digital assistant 1 integrally includes the image processing device 10, the camera 20, and the distance measuring device 30. Note, however, that those constituent members do not need to be integrally provided. That is, it is only necessary that the image processing device 10 can obtain a picture image taken with use of the camera 20 which is separated from the image processing device 10 and can obtain the distance measured by the distance measuring device 30 which is separated from the image processing device 10.

In Embodiment 1, pixels of the camera 20 are constituted by charge coupled devices (CCD). Alternatively, pixels of the camera 20 can be constituted by complementary metal oxide semiconductors (CMOS).

Each of (a) and (b) of FIG. 5 is a view illustrating another example of the integrated polarizer included in the camera 20. As described with reference to FIG. 2, the camera 20 in accordance with Embodiment 1 includes the integrated polarizer 21 which have the nine polarizing elements, i.e., the polarizing elements 21a through 21i. Note, however, that a camera used in an aspect of the present invention can include, for example, an integrated polarizer 21A which has four polarizing elements, i.e., polarizing elements 21j, 21k, 21l, and 21m as illustrated in (a) of FIG. 5. Alternatively, a camera used in an aspect of the present invention can include, for example, an integrated polarizer 21B which has two types of polarizing elements, i.e., polarizing elements 21n and 21o as illustrated in (b) of FIG. 5.

(Image Processing Device 10)

The image processing device 10 includes an iris detecting section 11, an S-polarized light calculating section 12, a P-polarized light calculating section 13, a diffusion light calculating section 14, and an authenticating section 15.

The iris detecting section 11 obtains a picture image taken by the camera 20, and identifies a region corresponding to an iris of the user in the picture image. A process that is carried out by the iris detecting section 11 is known in the field of, for example, authentication using a picture image of iris, and is therefore not described in this specification.

The S-polarized light calculating section 12 calculates luminance distribution of S-polarized light contained in the picture image. A process carried out by the S-polarized light calculating section 12 will be described later.

The P-polarized light calculating section 13 calculates luminance distribution of P-polarized light contained in the picture image. The P-polarized light calculating section 13 calculates the luminance distribution of the P-polarized light based on the luminance distribution of the S-polarized light and Fresnel's law.

The diffusion light calculating section 14 calculates luminance distribution of diffusion light contained in the picture image. Specifically, the diffusion light calculating section 14 subtracts, from a luminance value of each pixel, luminance values of the S-polarized light and the P-polarized light in that pixel. By the subtraction process, it is possible to obtain a picture image from which the S-polarized light component and the P-polarized light component have been removed and which contains only a diffusion light component.

The authenticating section 15 carries out user authentication with use of an iris image included in the picture image containing only the diffusion light component. The iris authentication carried out by the authenticating section 15 is a known technique, and is therefore not described in this specification.

(Process of S-Polarized Light Calculating Section 12)

FIG. 6 is a view for explaining values used in a process carried out by the image processing device. In the descriptions below, numerical values are defined as follows.

R: Distance from lens of camera 20 to center of eyeball E
r: Radius of eyeball E
θ: Incident angle of light to eyeball E (angle formed by (i) straight line L1 (first virtual line) connecting position P on eyeball at which position P light enters with center of eyeball and (ii) straight line L2 (second virtual line) connecting that position P with center of lens of camera 20)
φ: Angle formed by (i) straight line connecting center of lens of camera 20 with center of eyeball E and (ii) the straight line L1

The S-polarized light calculating section 12 calculates, with use of luminance values (outputs) of pixels of the light-receiving element 22, a luminance distribution of S-polarized light which depends on an incident angle θ that is determined based on a position P on the eyeball E which position P corresponds to a two-dimensional position of a pixel unit. The following description will discuss a process carried out by the S-polarized light calculating section 12.

(First Process of S-Polarized Light Calculating Section 12)

First, the S-polarized light calculating section 12 identifies a pixel in the light-receiving element 22 which pixel corresponds to a point (hereinafter, referred to as "Brewster point" according to need) on the eyeball at which point an incident angle θ becomes a Brewster angle. Specifically, the S-polarized light calculating section 12 calculates an angle φ based on a formula (1-1) below. A formula (1-2) is obtained by modifying the formula (1-1).

[Math. 1]
$$R\sin\phi(R\cos\phi - r)\tan\theta \qquad (1\text{-}1)$$

[Math. 2]
$$\therefore \tan\theta = \frac{R\sin\phi}{R\cos\phi - r} \qquad (1\text{-}2)$$

In the formulae (1-1) and (1-2), R is measured by the distance measuring device 30. More accurately, the distance measuring device 30 measures a distance from the lens of the camera 20 to the surface of the eyeball E, that is, a distance obtained by subtracting r from R. In a case of an eyeball of a human, a value of r is substantially constant, i.e., 7.4 mm. Therefore, it is possible to calculate R from measurement data obtained by the distance measuring device 30. Further, a refractive index n of a cornea of an eyeball is 1.376, and accordingly the Brewster angle (=θ) is assumed to be 53.1° in Embodiment 1. Based on those numerical values, the S-polarized light calculating section 12 can calculate the angle φ by using the formula (1-1) or (1-2).

Here, a pixel which exists on the straight line connecting the camera 20 with the center of the eyeball E and corresponds to the surface of the eyeball E is a pixel which is nearest to the camera 20 in a region of the eyeball E. Based on the position of the pixel and the distance, it is possible to identify a pixel which corresponds to the Brewster point in the picture image of the eyeball E. Note that a plurality of pixels are identified in the picture image as pixels each corresponding to the Brewster point.

Next, the S-polarized light calculating section 12 identifies a pixel unit which is included in the light-receiving element 22 of the camera 20 and includes identified pixels. The pixel unit is a group of pixels which are associated with the respective plurality of polarizing elements. In Embodiment 1, the pixel unit is associated with nine polarizing elements whose principal axis directions are different from each other. The pixel units are two-dimensionally arranged in the light-receiving element 22 of the camera 20. In FIG. 6, light which has entered the position P is received at a two-dimensional position of a pixel unit of the light-receiving element 22 which pixel unit is on the straight line L2 connecting the position P on the eyeball with the center of the lens of the camera 20.

Next, the S-polarized light calculating section 12 subtracts a minimum luminance value from a maximum luminance value of pixels included in the identified pixel unit, and thus calculates a luminance value of S-polarized light at the Brewster point. In this case, for example, the luminance value of the S-polarized light at the Brewster point can be an average value of differences obtained by subtracting minimum luminance values from respective maximum luminance values of pixels in all of identified pixel units. Alternatively, the luminance value of the S-polarized light at the Brewster point can be a difference calculated by subtracting a minimum luminance value from a maximum luminance value of pixels in only an arbitrary pixel unit.

FIG. 7 is a graph showing a received-light intensity of light received by a pixel, with respect to a polarization angle (i.e., an angle in of the principal axis direction). In the graph shown in FIG. 7, a horizontal axis represents the polarization angle, and a vertical axis represents the received-light intensity. The received-light intensity contains a diffuse reflection component (k-term) indicative of an iris image necessary for the authentication process and a specular reflection component indicative of a reflected image Ir which is obtained by outside light and is a noise in the authentication process. As above described, the specular reflection component contains an S-polarized light component (f-term) and a P-polarized light component (g-term). The S-polarized light component forms a substantially cosine function (cos(θ+Ψ) (Ψ is an arbitrary constant)) or a substantially sine function.

The diffuse reflection component is constant, regardless of the polarization angle. Therefore, in the graph shown in FIG. 7, variation in received-light intensity with respect to the polarization angle is variation in the specular reflection component, in particular, in the S-polarized light component.

FIG. 8 is a graph showing reflection coefficients (Fresnel's law) of S-polarized light and P-polarized light with respect to the incident angle θ. In the graph shown in FIG. 8, a horizontal axis represents an incident angle θ (see FIG. 6) of light to the eyeball E, and a vertical axis represents a reflection coefficient. The reflection coefficient is a relative value indicating the reflection intensity. The reflection intensity of the S-polarized light in the eyeball E corresponds to a received-light intensity in a pixel, and the reflection intensity of the P-polarized light in the eyeball E corresponds to the received-light intensity in the pixel. Formulae (2-1) and (2-2) below show relations between an incident angle θ of light to the eyeball E and reflection coefficients of S-polarized light and P-polarized light contained in reflected light. In the formulae (2-1) and (2-2), n=1.376 as above described.

[Math. 3]

$$f(r) = \left( \frac{\cos\theta(r) - \sqrt{n^2 - \sin^2\theta(r)}}{\cos\theta(r) + \sqrt{n^2 - \sin^2\theta(r)}} \right)^2 \quad (2\text{-}1)$$

[Math. 4]

$$g(r) = \left( \frac{n^2\cos\theta(r) - \sqrt{n^2 - \sin^2\theta(r)}}{n^2\cos\theta(r) + \sqrt{n^2 - \sin^2\theta(r)}} \right)^2 \quad (2\text{-}2)$$

As shown in FIG. 8, the reflection coefficient of the P-polarized light is substantially zero in a case where the incident angle θ is in the vicinity of the Brewster angle. That is, in pixels included in a pixel unit which includes a pixel corresponding to the Brewster point, variation in received-light intensity with respect to the polarization angle can be considered as variation in S-polarized light.

The intensity of S-polarized light is known to sine-functionally vary with respect to variation in polarization angle. Therefore, by subtracting a minimum luminance value from a maximum luminance value of pixels included in the identified pixel unit, it is possible to obtain a reflection intensity (amplitude) of S-polarized light in the pixel unit.

Subsequently, the S-polarized light calculating section 12 calculates a reflection intensity of S-polarized light in pixel units other than the identified pixel unit based on (i) the reflection coefficient and the reflection intensity of the S-polarized light with respect to the Brewster angle and (ii) a reflection coefficient of S-polarized light in the pixel units other than the pixel unit corresponding to the Brewster point. Specifically, the S-polarized light calculating section 12 calculates a ratio between the reflection coefficient and the reflection intensity of the S-polarized light with respect to the Brewster angle, and calculates, with use of the ratio, a reflection intensity corresponding to a reflection coefficient with respect to an incident angle θ other than the Brewster angle. That is, the S-polarized light calculating section 12 calculates a luminance value of S-polarized light with respect to an incident angle θ other than the Brewster angle, on the basis of the luminance value of S-polarized light in the pixel in which the incident angle θ is the Brewster angle.

Note that, in a case where no outside light is reflected in the region of the eyeball E in the picture image, the luminance value of each pixel does not contain a specular reflection component. In this case, each of luminance values of the respective pixels in the pixel unit does not contain an S-polarized light component, and does therefore not sine-functionally vary with respect to the polarization angle.

In view of this, the image processing device in accordance with an aspect of the present invention can further include a reflected image determining section for determining, before the process of the S-polarized light calculating section 12, whether or not luminance values of respective pixels in a pixel unit sine-functionally vary with respect to the polarization angle. A pixel unit to be determined by the reflected image determining section can be arbitrarily set by a manufacturer of the image processing device.

In a case where luminance values of respective pixels in the pixel unit do not sine-functionally vary with respect to the polarization angle, it is possible to determine that no outside light is reflected on the eyeball E. In this case, it is possible that the image processing device 10 does not calculate S-polarized light and P-polarized light, and carries out authentication by the authenticating section 15 while regarding a minimum luminance value in pixels included in each of pixel units as a luminance value of a diffuse reflection component.

(Second Process of S-Polarized Light Calculating Section 12)

The above described pixel corresponding to the Brewster point is mostly positioned in a circumference of the iris region in the picture image. Therefore, the pixel corresponding to the Brewster point is sometimes not included in the iris region depending on a degree to which an eye of the user opens or on an angle at which the picture image is taken.

In such a case, the first process cannot be normally carried out, and therefore the authentication by the iris fails. In a case where the authentication based on the iris picture image generated by the first process has failed, the S-polarized light calculating section 12 carries out a second process (described below) while determining that the pixel corresponding to the Brewster angle is not included in the eyeball E region in the light-receiving element 22.

In the second process, a luminance value of S-polarized light is calculated by subtracting a minimum luminance value from a maximum luminance value of pixels included in a pixel unit, and this calculation is repeated for each of a plurality of pixel units included in the light-receiving element 22. Thus, a luminance value of S-polarized light in each of identified pixel units is calculated by subtracting a minimum luminance value from a maximum luminance value of pixels included in that pixel unit. Subsequently, the S-polarized light calculating section 12 carries out fitting, with use of the formula (2-1), on a relation between an incident angle θ corresponding to each pixel unit and a luminance value of S-polarized light, and thus calculates a value of n.

Note that, in the image processing device in accordance with Embodiment 1, the S-polarized light calculating section 12 can carry out either one of the first process and the second process first. Alternatively, the S-polarized light calculating section 12 may carry out only one of the first process and the second process.

(Process of P-Polarized Light Calculating Section 13)

As seen in FIG. 8 and the formulae (2-1) and (2-2), an intensity ratio between S-polarized light and P-polarized light in accordance with incident angles θ is determined based on Fresnel's law. Therefore, in a case where the S-polarized light calculating section 12 has carried out the above described first process, the P-polarized light calculating section 13 can calculate a luminance distribution of P-polarized light based on, as above described, a luminance distribution of S-polarized light and Fresnel's law.

Moreover, in a case where the S-polarized light calculating section 12 has carried out the above described second process, the value of n has been calculated. Therefore, the P-polarized light calculating section 13 can calculate an intensity of P-polarized light based on the above described formula (2-2).

(First Process of Image Processing Device 10)

Figure 1:
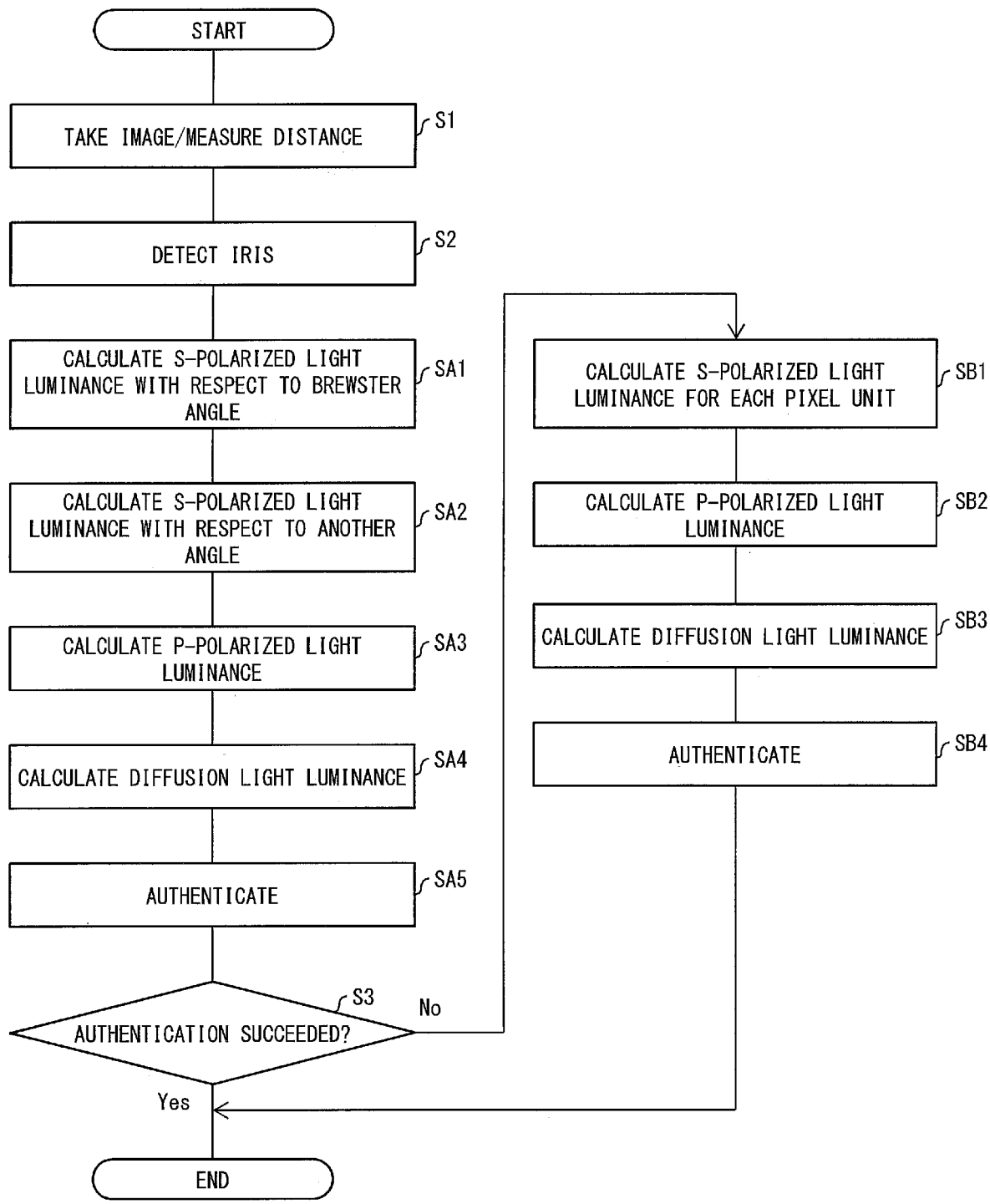
FIG. 1 is a flowchart showing an example of a flow of processes in an image processing method in accordance with Embodiment 1.

FIG. 1 is a flowchart showing an example of a flow of processes in the image processing method in accordance with Embodiment 1.

First, the camera 20 takes a picture image including the eyeball E of the user, and the distance measuring device 30 measures a distance from the camera 20 to the eyeball E (S1). The image processing device 10 obtains data indicating the picture image and the distance. Then, the iris detecting section 11 executes, with respect to the picture image thus taken, a process of detecting an iris region (S2).

Next, the S-polarized light calculating section 12 calculates a luminance value of S-polarized light at a point at which an incident angle θ of light reflected toward the camera 20 is the Brewster angle in the detected iris region (SA1). Further, the S-polarized light calculating section 12 calculates, based on the luminance value of S-polarized light calculated in the step SA1 and Fresnel's law, a luminance value (luminance distribution) of S-polarized light at a point at which an incident angle θ of light reflected toward the camera 20 is not the Brewster angle (SA2).

Subsequently, the P-polarized light calculating section 13 calculates a luminance value (luminance distribution) of P-polarized light based on the luminance distribution of S-polarized light calculated in the steps SA1 and SA2 and on Fresnel's law (SA3). Further, the diffusion light calculating section 14 calculates luminance distribution of diffusion light based on the luminance distribution of S-polarized light and the luminance distribution of P-polarized light (SA4).

The authenticating section 15 carries out authentication with use of a picture image (sometimes referred to as a picture image of diffusion light) which shows the luminance distribution of diffusion light which luminance distribution has been obtained in the step SA4 (SA5). After that, the authenticating section 15 determines whether or not the user can be authenticated based on the picture image of diffusion light (S3). In a case where the user has been authenticated (Y in S3), the image processing device 10 ends the image processing.

On the other hand, in a case where the user has not been authenticated (N in S3), the image processing device 10 attempts authentication of the user again through processes different from the steps SA1 through SA5, in order to improve accuracy in authentication. Specifically, first, the S-polarized light calculating section 12 calculates a luminance value of S-polarized light for each of pixel units in the detected iris region (SB1). Next, the P-polarized light calculating section 13 calculates a luminance value of P-polarized light based on the luminance value of S-polarized light calculated in the step SB1 (SB2). Then, the diffusion light calculating section 14 calculates a luminance value of diffusion light based on the luminance value of S-polarized light and the luminance value of P-polarized light (SB3). The authenticating section 15 carries out authentication with use of a picture image of diffusion light obtained in the step SB3 (SB4). Note that, in a case where the authentication has failed in the step SB4, the authenticating section 15 notifies the user of the failure of authentication via, for example, a display part (not illustrated) or the like included in the personal digital assistant 1.

Note that, among the processes in the flowchart shown in FIG. 1, the processes of the steps SA1 through SA4 correspond to the above described first process carried out by the S-polarized light calculating section 12. Moreover, the processes of the steps SB1 through SB3 correspond to the above described second process carried out by the S-polarized light calculating section 12.

(Second Process of Image Processing Device 10)

FIG. 9 is a flowchart showing another example of a flow of processes carried out in an image processing method in accordance with Embodiment 1. According to the processes shown in FIG. 9, it is possible to expect that authentication of the user can be carried out more quickly than the processes shown in FIG. 1.

In the processes shown in FIG. 9, first, the steps S1 and S2 are executed, as with the example shown in FIG. 1. Next, the image processing device 10 executes authentication through the steps SB1 through SB4, before the step SA1. Subsequently, the authenticating section 15 determines whether or not the user has been authenticated (S3). In a case where the user has not been authenticated (N in S3), the image processing device 10 executes authentication by the steps SA1 through SA5.

The authentication by the steps SB1 through SB4 can be carried out in a shorter time than the authentication by the steps SA1 through SA5. Therefore, according to the processes shown in FIG. 9, in a case where the authentication of the user can be carried out by the steps SB1 through SB4, it is possible to authenticate the user more quickly than the processes shown in FIG. 1.

(Third Process of Image Processing Device 10)

(a) of FIG. 10 is a flowchart showing still another example of a flow of processes carried out in the image processing method in accordance with Embodiment 1. According to the processes shown in (a) of FIG. 10, it is possible to carry out authentication of the user further quickly than the processes shown in FIGS. 1 and 9, although reliability is lower than the processes shown in FIGS. 1 and 9.

In the processes shown in (a) of FIG. 10, the image processing device 10 executes authentication by the steps SB1 through SB4 after the steps S1 and S2, as with the processes shown in FIG. 9. After that, the authenticating section 15 does not carry out determination of the step S3.

According to the processes shown in (a) of FIG. 10, authentication itself is determined to fail when the authentication by the steps SB1 through SB4 fails, even in a case where authentication would succeed if authentication by the steps SA1 through SA5 is carried out. Therefore, reliability of authentication is lower. Instead, the user can quickly know success or failure of authentication executed based on a taken picture image.

(Forth Process of Image Processing Device 10)

(b) of FIG. 10 is a flowchart showing still another example of a flow of processes carried out in the image processing method in accordance with Embodiment 1. The processes shown in (b) of FIG. 10 are different from the processes shown in (a) of FIG. 10 in that the step SB2 is omitted in the processes shown in (b) of FIG. 10. That is, according to the processes shown in (b) of FIG. 10, the image processing device 10 removes only S-polarized light and does not remove P-polarized light. Therefore, according to the processes shown in (b) of FIG. 10, the authenticating section 15 carries out, in the step SB4, authentication with use of a picture image from which a P-polarized light component of a reflected image Ir has not been removed. Therefore, it is possible to further increase a processing speed as compared with the processes shown in (a) of FIG. 10, although reliability of authentication is further lowered.

[Experimental Example 1]

The following description will discuss, with reference to an experimental example using a rubber ball, a reason why an image (reflected image) which is a noise included in a picture image can be removed by the image processing device 10 through the above described second process carried out by the S-polarized light calculating section 12. The camera 20 used in the experiment is a camera having a CCD sensor and the number of pixels is 1900×900 (i.e., approximately 1.3 million pixels). The integrated polarizer included in the camera 20 has four polarizing elements whose polarization angles are different from each other. In the descriptions below, the polarization angles of the four polarizing elements are 0°, 45°, 90°, and 135°, respectively.

The polarizing element is manufactured as follows. First, a film of AlCu having a film thickness of 40 nm is formed, via an $SiO_2$ interlayer film, on a photodiode which constitutes the CCD sensor, and slits (i.e., belt-like regions in which AlCu does not exist) each having a width of 150 nm are formed by dry etching at a pitch of 300 nm. After that, a film of $SiO_2$ having a film thickness of 50 nm and a film of AlCu having a film thickness of 40 nm are formed in this order, and slits are formed in the new AlCu film such that the slits in the new AlCu film are arranged alternately with the slits of the firstly formed AlCu film.

A diameter of the rubber ball is 10 cm, and a character "G" is written on a surface of the rubber ball as a pattern image. In photographs from which the respective picture images below are prepared, a reflected image overlaps with the pattern image. A distance between the rubber ball and the lens of the camera 20 is 30 cm to 50 cm.

In a picture image formed by polarized light having a polarization angle of 45°, the pattern image is relatively clear. On the other hand, in picture images formed by polarized light having a polarization angle of 0° and polarized light having a polarization angle of 90°, the pattern image is obscure. In a picture image formed by polarized light having a polarization angle of 135°, the pattern image is further obscure. That is, among lights which have passed through the respective four polarizing elements in the integrated polarizer, luminance is highest in the light which has passed through the polarizing element having the polarization angle of 45°, and luminance is lowest in the light which has passed through the polarizing element having the polarization angle of 135°. Therefore, in actually measured values below, a result obtained by calculating a difference between those two luminances of light is used.

FIG. 11 is a graph showing a reflection coefficient of S-polarized light with respect to an incident angle of light to the rubber ball. In FIG. 11, a horizontal axis represents a ratio, to a radius of the rubber ball, of a distance from a pixel which light from a center of the rubber ball enters to each of pixels which light from the rubber ball enters. This ratio is a value corresponding to an incident angle of light to the rubber ball. Moreover, a vertical axis represents a reflection coefficient of S-polarized light.

In FIG. 11, each of data points is an actually measured value. Meanwhile, a solid line constitutes a graph indicating theoretical values of reflection coefficient with respect to a refractive index (n=2.2) of the rubber ball based on the formula (2-1). The actually measured values obtained by the S-polarized light calculating section 12 are consistent with the theoretical values. Further, based on the above formula (2-2) and the value of n calculated by fitting, it is possible to obtain a luminance distribution of P-polarized light with respect to the incident angle θ.

As above described, in Experimental Example 1, it is possible to calculate the S-polarized light component and the P-polarized light component contained in the picture image, based on the picture image which has been taken through the four polarizing elements whose principal axis directions are different from each other. By subtracting the S-polarized light component from the original picture image, it is possible to obtain a picture image in which the pattern image is seen more clearly than in the original picture image. Moreover, by subtracting both the S-polarized light component and the P-polarized light component from the original picture image, it is possible to obtain a picture image in which the pattern image is seen further more clearly.

Note that, in a case where the user actually takes a picture image of an eye with use of the personal digital assistant 1, the eyeball E may be off-centered in the picture image. In a case where the eyeball E is off-centered in the picture image, the simple relation as represented in the formulae (1-1) and (1-2) does not hold true.

In such a case, it is possible to determine the off-centering by identifying a position of a pixel at which the incident angle is the Brewster angle.

Specifically, dependence of luminances of pixels in each pixel unit on the polarization angle is calculated. As above described, in the pixel unit corresponding to the Brewster angle, the P-polarized light component is zero, and accordingly a ratio of the S-polarized light component in luminance of the pixel unit becomes high. As a result, luminances of pixels included in the pixel unit largely vary depending on the polarization angle.

Therefore, it is possible to regard a pixel unit, whose dependence on the polarization angle is particularly large, as a pixel unit corresponding to the Brewster angle. Further, based on a position of the pixel unit corresponding to the Brewster angle, it is possible to determine displacement in position of the camera 20.

[Experimental Example 2]

FIG. 12 is a view showing an overview of a picture image showing experimental results of image processing carried out by the image processing device in accordance with Embodiment 1. In Experimental Example 2, an integrated polarizer including seven polarizing elements whose polarization angles are different from each other is used. Moreover, in Experimental Example 2, image processing is carried out by the steps SB1 through SB3 in the above described flowchart.

Before image processing, a picture image used in Experimental Example 2 includes a reflected image Ir of outside light in the iris region, as illustrated in a part from which the arrow extends in FIG. 12. On the other hand, after the image processing, the reflected image Ir of outside light in the iris region has been removed, as illustrated in a part which is pointed out by the arrow in FIG. 12.

(Effect of Image Processing Device 10)

The inventor carried out experiment of authentication by a conventional iris authentication system under various conditions, before accomplishing the present invention. In the experiment, a picture image was taken with use of a camera of a smart phone. Positions of the smart phone with respect to an eyeball were "front" and "below". In a case where the position of the smart phone is "front", an opening degree of eye was "large", "medium", or "small". In a case where the position of smart phone is "below", the opening degree of eye was "medium".

Image taking environments were "indoor" and "outdoor". The condition "indoor" was further divided into "no window", "with window (shade)", "with window (direct sunlight)", and "darkroom". Moreover, the condition "outdoor" was further divided into "clear sky (back light)", "clear sky (front light)", and "clear sky (side light)". Note that "back light" means that the subject is irradiated with sunlight on a side opposite to the camera. Moreover, "front light" means that the subject is irradiated with sunlight on a side on which the camera is located. Moreover, "side light" means that the subject is irradiated with sunlight on a lateral side when seen from the camera.

The following description will discuss results of authentication experiment which was carried out 10 times under each of the conditions. In a case where the position of the smart phone was "front", authentication did not fail, provided that the opening degree of eye was "medium" or larger in "indoor" except for "with window (direct sunlight)". Meanwhile, "with window (direct sunlight)", authentication hardly succeeded. Moreover, in a case where the opening degree of eye was "small", authentication hardly succeeded in any of the environments.

In a case where the position of the smart phone was "below", authentication did not fail under the condition of "indoor" except for "with window (direct sunlight)". Further, even "with window (direct sunlight)", authentication hardly failed.

As such, in the indoor environment, authentication hardly failed unless the opening degree of eye was small and the subject was irradiated with direct sunlight through the window.

However, in a case where the environment was "outdoor" and the position of the smart phone was "front", authentication did not succeed at all. In a case where the position of the smart phone was "below", authentication could be carried out without problem under "clear sky (side light)", but the number of succeeded authentication under each of "clear sky (back light)" and "clear sky (front light)" was not more than a half of the total.

As above described, the authentication carried out with the conventional iris authentication system has a problem that authentication hardly succeeds in the outdoor environment. This is because, as early described, outside light or the like is reflected on the eyeball.

Patent Literature 1 does not disclose that the reflection component is separated by obtaining a luminance distribution of a specular reflection component and, furthermore, that iris authentication is carried out by removing an image of another object reflected on an eyeball which is a subject. Moreover, Patent Literature 1 does not disclose that a process, which is different from the process of removing the image of the object, is carried out for iris authentication.

According to the image processing device in accordance with Embodiment 1, the S-polarized light calculating section 12 obtains a luminance distribution of an S-polarized light component which luminance distribution depends on the incident angle θ, and this makes it possible to calculate and remove an S-polarized light component that is caused by a reflected image Ir included in the picture image of the eyeball. Moreover, according to the image processing device of Embodiment 1, it is possible to calculate and remove, based on the S-polarized light component, a P-polarized light component that is caused by the reflected image Ir.

That is, according to the image processing device in accordance with Embodiment 1, it is possible to remove a reflected image caused by outside light on the eyeball. By carrying out iris authentication based on the picture image from which the reflected image caused by outside light has been removed, it is possible to carry out authentication with high accuracy, regardless of environments.

Moreover, in the image processing method of Patent Literature 1, it is necessary to carry out the processes (1) through (4) in order to separate a diffuse reflection component from a specular reflection component in the process (5). Therefore, in the image processing method of Patent Literature 1, an algorithm for separating those two reflection components becomes complicated, and consequently an arithmetical operation speed in the image processing may decrease. In the image processing device 10 in accordance with Embodiment 1, as above described, it is possible to separate the two reflection components from each other, without carrying out the processes (1) through (4). It is therefore possible to improve an arithmetical operation speed in the image processing, as compared with the image processing method of Patent Literature 1.

[Embodiment 2]

The following description will discuss Embodiment 2 of the present invention, with reference to FIG. 4 and FIG. 5. Note that, for convenience of explanation, the same reference numerals are given to constituent members which have functions identical with those described in Embodiment 1, and descriptions regarding such constituent members are omitted.

The camera 20 in accordance with Embodiment 1 has nine polarizing elements, i.e., the polarizing elements 21a through 21i which constitute the integrated polarizer 21. Meanwhile, as illustrated in (a) of FIG. 5, the camera 20 in accordance with Embodiment 2 includes the integrated polarizer 21A which has four polarizing elements, i.e., the polarizing elements 21j through 21m corresponding to respective four pixels that are adjacent to each other. The polarizing elements 21j, 21k, 21l, and 21m respectively have polarization angles of 135°, 90°, 45°, and 0° in the respective pixels. As such, in Embodiment 2, the integrated polarizer 21A is used instead of the integrated polarizer 21. In this case also, as with Embodiment 1, it is possible to calculate a luminance value of S-polarized light in the steps SA1 and SB1 shown in FIGS. 1, 9, and 10. That is, as with Embodiment 1, it is possible to remove a specular reflection component from reflected light Lr.

However, the number of the polarizing elements in the integrated polarizer 21A of Embodiment 2 is four (i.e., the polarizing elements 21j through 21m), which is smaller than that in Embodiment 1.

In general, in characteristics between a polarization angle of an integrated polarizer and a received-light intensity of reflected light Lr received by a pixel, the received-light intensity forms a substantially sine function or a substantially cosine function. In Embodiment 1, in one (1) pixel unit, received-light intensities of reflected light Lr in the nine polarizing elements, i.e., the polarizing elements 21a through 21i are obtained. Therefore, as illustrated in FIG. 7, it is possible to fit a waveform exhibited by received-light intensities in the characteristics into the substantially sine function or the substantially cosine function. Therefore, for example, a maximum value (maximum luminance value) and minimum value (minimum luminance value) of received-light intensities in one (1) pixel unit used in the step SA1 shown in FIG. 1 are highly likely to substantially conform to respective of a maximum luminance value and a minimum luminance value in the pixel unit.

Meanwhile, in Embodiment 2, fitting into the substantially sine function or the substantially cosine function is carried out by interpolation, and there is a possibility that accuracy in fitting is lowered and a maximum value and a minimum value of the substantially sine function or the substantially cosine function which has been subjected to fitting become different from the maximum luminance value and the minimum luminance value, as compared with Embodiment 1.

However, in Embodiment 2, one (1) pixel unit which corresponds to the integrated polarizer 21A is made up of four pixels. That is, the number of integrated polarizers 21A is larger than that in Embodiment 1. Therefore, for example, it is possible to obtain a pixel corresponding to the Brewster angle in a more segmentalized manner than Embodiment 1. That is, it is possible to identify the pixel more accurately.

As such, in Embodiment 2, accuracy in fitting may be lowered but it is possible to identify the pixel corresponding to the Brewster angle more accurately, as compared with Embodiment 1. Therefore, it is possible to determine, by analyzing accuracy in iris authentication, which one of the integrated polarizer 21 of Embodiment 1 and the integrated polarizer 21A of Embodiment 2 is to be used.

Note that, by carrying out the analysis, it is possible to employ an integrated polarizer 21B (including two polarizing elements 21n having a polarization angle of 90° and two polarizing elements 21O having a polarization angle of 0°) illustrated in (b) of FIG. 5, instead of the integrated polarizer 21A. Moreover, the polarization angle, and the number of polarizing elements corresponding to one (1) pixel unit can be changed as appropriate, in accordance with the analysis.

[Embodiment 3]

The following description will discuss Embodiment 3 of the present invention, with reference to FIGS. 13 and 14. In authentication carried out with use of an iris picture image, there may be a case where authentication is carried out by impersonating the user by using an imitation of the eyeball E. Therefore, it is necessary to take into consideration prevention of such impersonation.

FIG. 13 is a block diagram illustrating a configuration of a personal digital assistant 1A including an image processing device 10A of Embodiment 3. As illustrated in FIG. 13, the image processing device 10A is different from the image processing device 10 in that the authenticating section 15 includes an impersonation determining section 15a in the image processing device 10A.

In general, a refractive index of a cornea of an eye of a living body is n=1.376. On the other hand, in a case of an imitation of an eye, a refractive index is different from that of an eye of a living body because a component and a material of the imitation are different from those of the eye of the living body. The impersonation determining section 15a determines whether or not an eye is a living body or is an imitation, based on that difference.

Specifically, the impersonation determining section 15a refers to a value of n which has been calculated by the S-polarized light calculating section 12 in the step SB1. In a case where the value of n is equal or near to 1.376 (i.e., a value falling within a predetermined range, e.g., within ±5%), the impersonation determining section 15a determines that a taken picture image is of an eyeball E of a living body. On the other hand, in a case where the calculated value of n is away from 1.376 (i.e., out of the predetermined range, e.g., a value different by more than ±5%), the impersonation determining section 15a determines that a taken picture image is of an imitation of an eyeball E.

FIG. 14 is a flowchart showing processes in the image processing device 10A. As shown in FIG. 14, processes in the image processing device 10A are different from those shown in FIG. 1 only in that a step SB5 is executed between the step SB3 and the step SB4.

In the step SB5, the impersonation determining section 15a determines whether or not a value of n calculated by the S-polarized light calculating section 12 in the step SB1 falls within a predetermined range. In a case where the value of n falls within the predetermined range (Y in SB5), the impersonation determining section 15a determines that a taken picture image is of an eyeball E of a living body, and carries out the process of SB4. On the other hand, in a case where the value of n does not fall within the predetermined range (N in SB5), the impersonation determining section 15a determines that a taken picture image is of an imitation of an eyeball E, and ends authentication without carrying out the process of SB4.

As above described, according to the image processing method in accordance with Embodiment 3, luminance distribution of an S-polarized light component depending on the incident angle θ is obtained by the S-polarized light calculating section 12, and the luminance distribution of S-polarized light can be used to determine whether the subject is an eyeball or an imitation.

Note that the impersonation determining section 15a can regard, as the Brewster angle, an angle at which a luminance value becomes a minimum value in a luminance distribution of a P-polarized light component calculated by the P-polarized light calculating section 13 in the step SB2. Then, the impersonation determining section 15a can determine whether the subject is an eyeball E of a living body or an imitation of an eyeball E depending on whether or not the angle is near to 53.1°. That is, the impersonation determining section 15a can carry out the determination based on whether or not the angle falls within a predetermined range within which the subject is assumed to be an eyeball E of a living body and which includes the Brewster angle of the eyeball E of the living body.

Moreover, in the processes of FIGS. 9 and 10 also, the determination can be carried out by executing the step SB5 between the step SB3 and the step SB4.

[Modification Example]

The following description will discuss another method for preventing impersonation by an imitation.

In a case where removal of a reflected image is carried out with respect to an imitation whose refractive index is different from that of an eyeball E of a living body while assuming that the Brewster angle is 53.1°, a reflected image due to outside light or the like to the imitation is not properly removed. Therefore, in a case where a reflected image due to outside light or the like exists, it is highly possible without calculating a refractive index that authentication fails because an iris pattern changes due to the reflected image.

However, in a case where authentication is carried out in an environment (e.g., a darkroom) in which a reflected image does not occur, there is a possibility that an iris pattern does not change and authentication succeeds.

In view of this, the image processing device can include a light source for purposely causing a reflected image on an eyeball E, as a method for preventing impersonation by an imitation. A reflected image thus caused (i.e., an image formed by the light source) is properly removed by the image processing device if the subject is an eyeball E of a living body, and therefore authentication is not influenced. On the other hand, in a case of an imitation of an eyeball E, the image processing device cannot remove the reflected image, and therefore authentication fails. Note that an intensity of light emitted by the light source is not limited, provided that a reflected image is caused by the light. Therefore, for example, the intensity does not need to be a high intensity that causes an adverse influence on a human body.

[Embodiment 4]

The following description will discuss Embodiment 4 of the present invention with reference to FIGS. 15 through 17.

FIG. 15 is a block diagram illustrating a configuration of an electronic information apparatus 2 which includes an image processing device 10B in accordance with Embodiment 4. As illustrated in FIG. 15, the electronic information apparatus 2 includes an image processing device 10B, a camera 20, and a storage section 90. Moreover, the image processing device 10B includes a luminance value information obtaining section 16, a minimum luminance value selecting section 17 (image generating section), an iris detecting section 11, and an authenticating section 15.

The luminance value information obtaining section 16 obtains effective radiance values of a subject by an image pickup device included in the camera 20. Each of the effective radiance values is an effective radiance value of the subject in the image pickup device. Specifically, the luminance value information obtaining section 16 obtains, as effective radiance values of respective pixels of the image pickup device included in the camera 20, intensities of light which has been reflected by the subject and then received in the pixels. Note that, in Embodiment 4 and subsequent embodiments, the "subject" can be either an eyeball E of one eye or eyeballs E of both eyes or can include an eyeball E and a surrounding object(s).

The minimum luminance value selecting section 17 generates a picture image including an image of an iris, with use of effective radiance values obtained from the iris of the subject. Specifically, the minimum luminance value selecting section 17 obtains, for each of pixel units corresponding to the iris of the subject, a luminance value by at least partially removing a regular reflection light component on a surface of the iris from effective radiance values of a plurality of pixels included in that pixel unit, and generates a picture image as a set of unit regions having obtained luminance values. Moreover, the same applies to the above described diffusion light calculating section 14, and a minimum luminance value estimating section 17A and a diffusive reflection light component calculating section 18 which will be described later.

Specifically, the minimum luminance value selecting section 17 of Embodiment 4 determines, as a luminance value of a unit region corresponding to a pixel unit, a minimum value of effective radiance values of a plurality of pixels included in the pixel unit. Pixel units corresponding to the iris of the subject are identified by the iris detecting section 11 in advance. The unit regions are in the picture image of the subject and correspond to the respective pixel units in the camera 20.

In Embodiment 4 and the subsequent embodiments, a component of reflected light forming a reflected image is referred to as "regular reflection light component". The regular reflection light component includes a component which depends on a principal axis direction of a polarizing element that is provided so as to correspond to a pixel. A minimum value of effective radiance values in a pixel unit can be considered as an effective radiance value from which a component depending on the principal axis direction of the polarizing element has been mostly removed in the pixel unit. Therefore, the minimum luminance value selecting section determines the minimum value of effective radiance values in the pixel unit as a luminance value of the unit region, and thus generates a picture image as a set of unit regions having luminance values obtained by at least partially removing a regular reflection light component on the surface of the cornea of the subject.

The storage section 90 is a storage device for storing information necessary for the image processing device 10B to execute a process. Note that it is possible to employ a configuration in which the electronic information apparatus does not include the storage section 90 and can communicate with a storage device that is provided outside the electronic information apparatus 2.

FIG. 16 is a flowchart showing processes in the image processing device 10B. In the image processing device 10B, first, the luminance value information obtaining section 16 obtains, from the camera 20, effective radiance values of the subject including the iris (SC1, luminance value information obtaining step). Next, the iris detecting section 11 detects an iris region based on the effective radiance values (SC11). The minimum luminance value selecting section 17 determines the iris region, which has been detected by the iris detecting section 11, as a range within which an image processing is to be executed (SC12). The minimum luminance value selecting section 17 determines a minimum value, among effective radiance values of a plurality of pixels in each of pixel units in the iris region, as a luminance value of a unit region corresponding to that pixel unit, and thus at least partially removes a regular reflection light component on the surface of the cornea (SC2, image generating step). Further, the minimum luminance value selecting section 17 generates a picture image as a set of unit regions having the luminance values determined in the step SC2 (SC3, image generating step).

The iris detecting section 11 executes a process of detecting an iris region, with respect to the picture image which has been generated by the minimum luminance value selecting section 17 (SC4). The iris detecting section 11 can use a detection result of the iris region in the step SC11 directly as a detection result in the step SC4. The authenticating section 15 carries out authentication of a user with use of the iris region which has been detected (SC5). After that, the authenticating section 15 determines whether or not the user has been authenticated (SC6). In a case where the user has been authenticated (Y in SC6), the image processing device 10B ends the process. In a case where the user has not been authenticated (N in SC6), the iris detecting section 11 detects an iris region again.

In the case of N in the step SC6, there is a possibility that the iris detecting section 11 has not properly detected an iris region of the user. In view of this, in the step SC4 after the step SC6 is N, it is preferable that an iris region to be detected by the iris detecting section 11 is different from the iris region which has been previously detected in the step SC4. A concrete example of a method for making iris regions different can be increasing or decreasing a diameter of the iris region. As such, it is preferable to apply feedback to the process of detecting an iris region by the iris detecting section 11 such that a humming distance between a registered code of an eyeball of the user and a code of an eyeball E in a taken image becomes shortest.

FIG. 17 is a graph showing an example of effective radiance values of pixels in a pixel unit. In the graph shown in FIG. 17, a horizontal axis represents an angle of a principal axis of a polarizing element which corresponds to a pixel included in a pixel unit of the camera 20, and a vertical axis represents an effective radiance value of the pixel in the pixel unit. In the example shown in FIG. 17, the pixel unit includes nine pixels which correspond to respective nine polarizing elements whose principal axis directions are different from each other by 20° starting from 10°.

In the example shown in FIG. 17, a minimum value of the effective radiance value is of a pixel in the pixel unit which pixel corresponds to a polarizing element whose principal axis direction is 90°, and a maximum value of the effective radiance value is of a pixel which corresponds to a polarizing element whose principal axis direction is 170°. In this case, the minimum luminance value selecting section 17 selects the effective radiance value of the pixel, which corresponds to the polarizing element whose principal axis direction is 90°, as a luminance value of a unit region corresponding to the pixel unit.

In the image processing device 10B, a minimum value of effective radiance values of pixels included in each of pixel units is determined as a luminance value of a unit region corresponding to that pixel unit. From this, it is possible to generate a picture image by simply determining a luminance value of a unit region without needing a complicated computation process.

Note that, in the image processing device 10B, the steps SC11 and SC12 can be omitted from the steps in the above described flowchart. In such a case, the minimum luminance value selecting section 17 may determine luminance values of respective unit regions corresponding to all pixel units. Moreover, in an image processing device 10C of Embodiment 5 which will be described later also, the steps SC11 and SC12 can be omitted. Note, however, that, in image processing devices 10D and 10E in Embodiments 6 through 8 which will be described later, the steps SC11 and SC12 cannot be omitted. Moreover, from the viewpoint of processing speed, it is preferable to determine luminance values of only unit regions corresponding to pixel units that correspond to the iris region. Therefore, it is preferable to execute the steps SC11 and SC12 in the image processing devices 10B and 10C.

Each of the image processing devices 10B and 10C in Embodiments 4 and 5 can carry out a process of identifying a region (e.g., a region larger than the iris by a predetermined range, a region corresponding to the entire eyeball E, or the like) that is different from the iris region before the step SC2. In such a case, the minimum luminance value selecting section 17 or a minimum luminance value estimating section 17A (see Embodiment 5) may execute an image processing with respect to the identified region. That is, each of the image processing devices 10B and 10C may determine luminance values in unit regions corresponding to pixel units corresponding to at least the iris (i.e., at least a part) of the subject based on effective radiance values of a plurality of pixels included in the pixel units.

[Embodiment 5]

The following description will discuss Embodiment 5 of the present invention with reference to FIGS. 18 through 20.

FIG. 18 is a block diagram illustrating a configuration of an electronic information apparatus 2 including an image processing device 10C in accordance with Embodiment 5. As illustrated in FIG. 18, the image processing device 10C is substantially identical with the image processing device 10B except that the image processing device 10C includes a minimum luminance value estimating section 17A (image generating section) instead of the minimum luminance value selecting section 17.

The minimum luminance value estimating section 17A estimates a minimum value of possible effective radiance values in each of pixel units based on effective radiance values of a plurality of pixels included in that pixel unit. A concrete example of a method for estimating the minimum value will be described later.

Further, the minimum luminance value estimating section 17A determines a luminance value of a unit region based on the estimated minimum value of effective radiance value. Here, the minimum luminance value estimating section 17A can set the estimated minimum value to be a luminance value of the unit region or can set a value, which is obtained by carrying out a predetermined calculation with respect to the estimated luminance value, to be a luminance value of the unit region. For example, the minimum luminance value estimating section 17A can set a value, which has been obtained by carrying out addition, subtraction, multiplication, or division with a predetermined value with respect to the estimated minimum value of effective radiance value, to be a luminance value of the unit region.

FIG. 19 is a flowchart showing processes in the image processing device 10C. The processes in the image processing device 10C are substantially identical with those in the image processing device 10B, except that a step SC7 (image generating step) is executed instead of the step SC2. In the step SC7, the minimum luminance value estimating section 17A estimates minimum values of possible effective radiance values in respective pixel units corresponding to the eyeball E.

FIG. 20 is a graph showing an example of effective radiance values of pixels in a pixel unit. In the graph shown in FIG. 20, a horizontal axis represents an angle of a principal axis of a polarizing element corresponding to each of pixels included in a pixel unit, and a vertical axis represents an effective radiance value. In the example shown in FIG. 20, the pixel unit includes four pixels corresponding to respective four polarizing elements whose principal axis directions are different from each other by 45° starting from 10°.

In the example shown in FIG. 20, effective radiance values obtained in the pixels included in the pixel unit become smallest in a pixel corresponding to a polarizing element whose principal axis direction is 100°. However, in a case where a relation between the principal axis direction and the effective radiance value corresponds to, for example, a function shown by a dashed line in FIG. 20, a smaller effective radiance value may be obtained in a pixel included in the pixel unit, depending on a principal axis direction of a polarizing element corresponding to the pixel. In a case where a minimum value of actual effective radiance values of the pixels in the pixel unit is determined as a luminance value of the unit region under the above condition, the luminance value still contains a regular reflection light component depending on the principal axis directions of the polarizing elements. In the image processing device 10C, the minimum luminance value estimating section 17A estimates a minimum value of possible effective radiance values in the pixel unit, and it is possible to generate a picture image containing less regular reflection light component, as compared with a picture image generated in the image processing device 10B.

In the example described below, the minimum luminance value estimating section 17A applies, to effective radiance values of a plurality of pixels included in each of pixel units, a trigonometric function in which an angle of a principal axis direction of a polarizing element corresponding to each of the pixels is a variable, and thereby estimates the minimum value. As such, the minimum luminance value estimating section 17A can estimate a minimum value of possible luminance values in the unit region, based on the minimum value of the trigonometric function.

(First Estimating Method)

The following description will discuss an example of a method for estimating a minimum luminance value in a unit region by the minimum luminance value estimating section 17A. It is assumed that, in a case where an effective radiance value of each of pixels in a certain pixel unit is Y, Y can be expressed by a formula (5-1) below.

$$Y=A\sin(2x+B)+C \quad (5\text{-}1)$$

Here, each of A and B is a constant unique to the pixel unit. x is an angle of a principal axis of a polarizing element corresponding to each of the pixels. In a case where principal axis directions of polarizing elements corresponding to respective pixels in the pixel unit are different from each other by a constant angle, C conforms to an average E(Y) of effective radiance values of the respective pixels in the pixel unit.

In a case where a mean square of Y is $E(Y^2)$, $E(Y^2)$ is expressed by a formula (5-2) below.

$$E(Y^2)=A^2 \times E(\sin^2(2x+B))+2A \times E(C) \times E(\sin(2x+B))+(E(C^2)) \quad (5\text{-}2)$$

Here, from Wallis formulas, formulae (5-3) and (5-4) below hold true.

$$E(\sin^2(2x+B))=1/2 \quad (5\text{-}3)$$

$$E(\sin(2x+B))=1/\pi \quad (5\text{-}4)$$

Therefore, the formula (5-2) can be modified into a formula (5-5) below.

$$E(Y^2)=A^2/2+2A \times E(C)/\pi+(E(C^2)) \quad (5\text{-}5)$$

$E(Y^2)$ is equal to a mean square of the effective radiance values of the respective pixels included in the pixel unit, and therefore it is possible to calculate a value of A by approximating E(C) to a minimum value of effective radiance values of the respective pixels, approximating $E(C^2)$ to a square value of the minimum value of effective radiance values of the respective pixels, and solving the formula (5-5) for A.

Based on the value of A calculated by solving the formula (5-5) and on the formula (5-1), it is possible to obtain a minimum value Ymin of possible values of Y by a formula (5-6) below.

$$Y\min=E(Y)-A \quad (5\text{-}6)$$

As such, the minimum luminance value estimating section 17A can estimate a minimum value of possible effective radiance values of the pixels included in the pixel unit, only by the calculations by the formulae (5-5) and (5-6).

FIG. 21 is a graph showing parameters included in the formula (5-1). In the graph shown in FIG. 21, a horizontal axis represents an angle of a principal axis of each of polarizing elements in a pixel unit of the camera 20, and a vertical axis represents an effective radiance value of a pixel in the pixel unit. In the example shown in FIG. 21, the pixel unit includes four pixels corresponding to respective four polarizing elements whose principal axis directions are different from each other by 45° starting from 10°.

As shown in FIG. 21, the value of C in the formula (5-1) is a median value of effective radiance values of the pixels in the pixel unit, and is substantially equal to an average value of the effective radiance values of the pixels in the pixel unit. Moreover, a value of A in the formula (5-1) is a difference between the average value and a possible minimum luminance value of the pixels in the unit region. Moreover, a value of B in the formula (5-1) is a value for determining a position of a graph in the horizontal-axis direction. That is, in a case where the value of B varies, the entire graph shifts in parallel to the horizontal axis. The value of B does not influence Ymin, and therefore the value of B is not calculated in the first estimating method.

(Second Estimating Method)

The following description will discuss a second method for estimating a minimum luminance value in a unit region by the minimum luminance value estimating section 17A. In the second estimating method also, it is assumed that an effective radiance value Y of each of pixels included in a certain pixel unit can be expressed by the formula (5-1).

In the second estimating method, a look-up table showing correspondence between values of x and values of sin 2x is stored in the storage section 90 in advance. The minimum luminance value estimating section 17A sets an initial value of A in the formula (5-1) to an average of (i) and (ii) below, and prepares a table of Y corresponding to values of x with reference to the look-up table.
(i) A difference between a maximum value and an average value of effective radiance values of respective pixels in a pixel unit
(ii) A difference between an average value and a minimum value of effective radiance values of respective pixels in a pixel unit
The correspondence between x and Y in the prepared table can be shifted by changing the value of B in the formula (5-1).

Next, the minimum luminance value estimating section 17A compares the prepared table with the effective radiance values of the respective pixels included in the pixel unit. The minimum luminance value estimating section 17A changes the value of B such that a total of differences between (i) effective radiance values of respective pixels included in the pixel unit and (ii) values in the table at angles of polarizing elements corresponding to the respective pixels becomes smallest. In a case where the total of differences between the values in the table and the effective radiance values is smallest and an average of ratios of (i) differences between values in the table and the effective radiance values of the respective pixels to (ii) the effective radiance values of the respective pixels is equal to or less than a predetermined ratio, the minimum luminance value estimating section 17A estimates that the value of A is appropriate. In this case, the minimum luminance value estimating section 17A estimates a minimum value by the formula (5-6). The predetermined ratio is preferably 10%, more preferably 5%, and further preferably 1%.

In a case where the difference between the values of the table and the effective radiance values is not equal to or less than the predetermined ratio, the minimum luminance value estimating section 17A changes the value of A in the formula (5-1) from the initial value, and carries out similar comparison.

(a) of FIG. 22 is a view showing an example of the look-up table. (b) of FIG. 22 is a view showing an example of the table prepared by the minimum luminance value estimating section 17A. (c) of FIG. 22 is a view showing an example of signal intensities indicative of effective radiance values. (d) of FIG. 22 is a graph showing an example of the signal intensities shown in (c) of FIG. 22 and an example of signal intensities indicative of effective radiance values estimated by the minimum luminance value estimating section 17A.

In the graph shown in (d) of FIG. 22, a horizontal axis represents an angle of a principal axis of each of polarizing elements in a pixel unit of the camera 20, and a vertical axis represents a signal intensity indicative of an effective radiance value of a pixel in the pixel unit. In the example shown in (d) of FIG. 22, the pixel unit includes four pixels corresponding to respective four polarizing elements whose principal axis directions are different from each other by 45° starting from 0°. The example of (d) of FIG. 22 shows a case where light enters an interface between air (refractive index n1=1.0) and a cornea (refractive index n2=1.376) at an incident angle of 15°.

The storage section 90 stores the look-up table as shown in (a) of FIG. 22 in advance. The minimum luminance value estimating section 17A sets the value of A in the formula (5-1) as above described, and prepares a table of Y as shown in (b) of FIG. 22. Further, the minimum luminance value estimating section 17A extracts, from the table of Y, values which are nearest to respective effective radiance values of the pixels included in the pixel unit as shown in (c) of FIG. 22. The extracted values and principal axis directions of polarizers corresponding to the values are indicated by "*" in (d) of FIG. 22. Meanwhile, actual effective radiance values of respective pixels included in the pixel unit and principal axis directions of polarizers corresponding to the respective pixels are indicated by "○" in (d) of FIG. 22.

In (d) of FIG. 22, positions of "*" in the vicinity of 0° and in the vicinity of 90° well conform to respective positions of "○", whereas positions of "*" in the vicinity of 65° and in the vicinity of 155° are far apart from positions of "○" at 45° and 135°. Therefore, the above described ratio is greater than 10%. In this case, the minimum luminance value estimating section 17A (i) prepares a table of Y again by changing the value of A in the formula (5-1), (ii) extracts, from the table of Y, values which are nearest to respective actual effective radiance values, and (iii) carries out similar comparison.

(Another Estimating Method)

The minimum luminance value estimating section 17A can estimate a minimum value of possible effective radiance values of pixels in a pixel unit by an estimating method other than the above described first and second estimating methods. For example, the minimum luminance value estimating section 17A can estimate the minimum value by applying a polynomial expression, in which an angle of a principal axis direction of a polarizing element corresponding to each of a plurality of pixels in each of pixel units is a variable, to effective radiance values of the plurality of pixels. In this case, the polynomial expression can be, for example, a polynomial expression obtained by subjecting a trigonometric function to Taylor expansion. According to Taylor expansion, sin x and cos x can be expressed as in respective formulae (5-7) and (5-8) below.

[Math. 5]

$$\sin x = \sum_{n=0}^{\infty} \frac{(-1)^n}{(2n+1)!} x^{2n+1} \qquad (5\text{-}7)$$

[Math. 6]

$$\cos x = \sum_{n=0}^{\infty} \frac{(-1)^n}{(2n)!} x^{2n} \qquad (5\text{-}8)$$

In the formulae (5-7) and (5-8), x is a principal axis direction of a polarizing element, and n is an arbitrary integer. n is preferably 3 or more.

Moreover, for example, it is possible that the minimum luminance value estimating section 17A estimates a function indicative of effective radiance values of pixels in a pixel unit by an arbitrary interpolating method, and estimates the minimum value by use of the function. Examples of the interpolating method encompass spline interpolation, polynomial interpolation, trigonometric function interpolation, cubic interpolation, and the like.

[Embodiment 6]

The following description will discuss Embodiment 6 of the present invention with reference to FIGS. 23 through 25.

FIG. 23 is a block diagram illustrating a configuration of an electronic information apparatus 2 including an image processing device 10D in accordance with Embodiment 6. As illustrated in FIG. 23, the image processing device 10D is different from the image processing device 10B in that the image processing device 10D includes a diffusive reflection light component calculating section 18 (image generating section) instead of the minimum luminance value selecting section 17.

The diffusive reflection light component calculating section 18 identifies a maximum value Ioutmax and a minimum value Ioutmin among effective radiance values in each of pixel units. Further, the diffusive reflection light component calculating section 18 calculates a diffusive reflection light component Ik in each of pixel units by a formula (6-1) below.

$$Ik=(Ioutmin-a\times Ioutmax)/(1-a) \quad (6-1)$$

Here, Ioutmin and Ioutmax are respectively a minimum value and a maximum value of effective radiance values of pixels included in a pixel unit. Ioutmin and Ioutmax can be values estimated in a manner similar to that of Embodiment 5, or can be actual effective radiance values of pixels.

Moreover, a in the formula (6-1) represents a ratio of a reflectance of a P-polarized light component to a reflectance of an S-polarized light component. As above described, a depends on an incident angle of light to the eyeball E. Based on a distance R from the lens of the camera 20 to a center of the eyeball E and a radius r of the eyeball E, it is possible to calculate the incident angle at each point in a picture image of the eyeball E. In Embodiment 6, a distance R measured while the eyeball E is in focus is stored in the storage section 90 in advance, and the diffusive reflection light component calculating section 18 calculates the incident angle and the value of a with use of the distance R.

The distance R is specifically obtained as follows. In a case where the camera 20 is a camera having a fixed focus lens, the camera 20 is designed such that a face of a user is focused when the user sees the screen while holding the electronic information apparatus 2 in the user's hand. With the configuration, in a case where the user takes a picture image of a region including the user's own eye such that a picture image of an eyeball E is included in a predetermined range of the picture image taken with the camera 20, a distance R between the lens of the camera 20 and the eyeball E becomes substantially equal to a focal distance of the lens of the camera 20. In a case where the camera 20 has an autofocus function, a distance R can be calculated with the Bessel method by obtaining two kinds of distances between lenses for image formation of the eyeball E. In a case where the camera 20 is a camera which includes two image pickup devices and can simultaneously take a plurality of picture images from different positions, it is possible to calculate a distance R by triangulation based on the picture images taken by the respective image pickup devices.

Here, in a case where an incident angle is small, a difference in reflectance between an S-polarized light component and a P-polarized light component is small, i.e., approximately several tens of percent. Therefore, a value of a cannot be accurately calculated due to influence of unevenness between pixels or shots, and sometimes a result of calculation with the formula (6-1) becomes as follows: Ik≤0 (i.e., a diffusive reflection light component disappears).

In this case, calculation by the formula (6-1) can be executed by changing the value of a into a value of a which corresponds to an angle greater than an actual incident angle. For example, calculation by the formula (6-1) can be sequentially executed again for values of a corresponding to angles which sequentially become greater than the actual incident angle by a predetermined angle (e.g., 10°). Note, however, that, in this case, accuracy in removing a reflected image decreases. Such recalculation by changing the value of a may be executed in a case where, for example, authentication by the authenticating section 15 has failed. Alternatively, in such recalculation, it is possible to change the value of a into a value corresponding to a radius smaller than an actual radius r or a distance shorter than an actual distance R, instead of changing the value of a into a value corresponding to an angle greater than an actual incident angle.

Alternatively, the incident angle and the value of a can be calculated based on a distance R which is assumed in advance. For example, in a case where the electronic information apparatus 2 is a smart phone, it is assumed that the user carries out authentication in a state where the user is holding the electronic information apparatus 2 in the user's hand. In such a case, the distance R would be approximately 20 cm to 30 cm. Therefore, it is possible to calculate the incident angle based on the expected distance R, without actually measuring a distance R with a distance measuring device or the like.

In this case, it is possible to prepare a plurality of distances R. That is, authentication can be executed by calculating the incident angle and the value a and further calculating the diffusive reflection light component Ik for each of the plurality of distances R. In the above example, the image processing device 10D can execute authentication for each of cases where the distance R is 20 cm and where the distance R is 30 cm, and may further execute authentication for a case where the distance R is 25 cm.

The following description will discuss the formula (6-1). Each of effective radiance values of pixels included in a pixel unit includes a diffusive reflection light component and a regular reflection light component. In Embodiment 6, the regular reflection light component includes a first regular reflection light component and a second regular reflection light component. Moreover, in Embodiment 6, each of the first regular reflection light component and the second regular reflection light component has a component which depends on a principal axis direction of a polarizing element. In this case, a first regular reflection light component Is and a second regular reflection light component Ip are respectively expressed by formulae (6-2) and (6-3) below.

$$Is=Is0+Is0\times\cos 2x \quad (6-2)$$

$$Ip=Ip0+Ip0\times\cos 2(x-\pi/2) \quad (6-3)$$

Here, Is0 and Ip0 are respectively components of the first regular reflection light component and the second regular reflection light component which components do not depend on a principal axis direction of a polarizing element. Moreover, a phase of the second regular reflection light component is delayed from a phase of the first regular reflection light component by 90°, and therefore $\pi/2$ is subtracted from x in the formula (6-3). Note that, in the formulae (6-2) and (6-3), the cosine function can be substituted by a sine function.

An effective radiance value Iout of each of pixels included in a pixel unit is expressed by a formula (6-4) below.

$$Iout=Ik+Is+Ip=Ik+Is0+Ip0+(Is0-Ip0)\cos 2x \quad (6-4)$$

Iout becomes a maximum value when cos 2x=1, and becomes a minimum value when cos 2x=−1. Therefore, Ioutmax and Ioutmin in the formula (6-1) are respectively expressed by formulae (6-5) and (6-6) below.

$$Ioutmax=Ik+2\times Is0 \quad (6-5)$$

$$Ioutmin=Ik+2\times Ip0 \quad (6-6)$$

Moreover, from Fresnel's law, a relation between Is0 and Ip0 is expressed by a formula (6-7) below.

$$Ip0 = a \times Is0 \quad (6\text{-}7)$$

Therefore, by substituting the formula (6-7) for the formula (6-6), a formula (6-8) below is obtained.

$$Ioutmin = Ik + 2 \times a \times Is0 \quad (6\text{-}8)$$

By solving simultaneous equations including the formulae (6-5) and (6-8) for Ik, the formula (6-1) is obtained.

FIG. 24 is a flowchart showing processes in the image processing device 10D. The processes in the image processing device 10D are substantially identical with the processes in the image processing device 10B, except that a step SC8 (image generating step) is executed instead of the step SC2. In the step SC8, the diffusive reflection light component calculating section 18 calculates a diffusive reflection light component Ik for each of pixel units by the formula (6-1), and determines the calculated value as a luminance value of a unit region corresponding to that pixel unit.

The above described recalculation by changing the value of a can be executed, for example, as follows. That is, a threshold (hereinafter, referred to as "branch threshold"), which is greater than a threshold (hereinafter, referred to as "authentication threshold") used in authentication, is set to a humming distance between (i) a code of a picture image of the eyeball from which picture image a reflected image has been removed and (ii) a registered code. In the step SC6 in FIG. 24, in a case where the humming distance is equal to or greater than the branch threshold, the diffusive reflection light component calculating section 18 executes the process of the step SC8 again. In this case, recalculation by changing the value of a which is described above is executed. On the other hand, in a case where the humming distance is equal to or greater than the authentication threshold and less than the branch threshold in the step SC6, the iris detecting section 11 executes the process of the step SC4 again. Note that, in a case where the humming distance is less than the authentication threshold, authentication succeeds.

As above described, the diffusive reflection light component calculating section 18 of Embodiment 6 identifies a maximum value and a minimum value of effective radiance values in each of pixel units based on effective radiance values of a plurality of pixels included in that pixel unit. The diffusive reflection light component calculating section 18 calculates a diffusive reflection light component Ik in that pixel unit, with use of the identified maximum value and minimum value and a ratio a of a reflectance of a P-polarized light component to a reflectance of an S-polarized light component on a surface of the eyeball E which surface corresponds to that pixel unit. Further, the diffusive reflection light component calculating section 18 determines the calculated diffusive reflection light component as a luminance value of a unit region corresponding to that pixel unit. Thus, the image processing device 10D can determine, as a luminance value of each of unit regions, a diffusive reflection light component from which a reflected light component has been at least partially removed.

FIG. 25 is graphs showing examples of effective radiance values of pixels included in a pixel unit, estimated values of possible effective radiance values of the pixels included in the pixel unit, and estimated values of a diffusion light component. (a) of FIG. 25 is a graph of a pixel unit which reflected light enters in a case where light has reached an eyeball E at an incident angle of 30° and has been reflected by the eyeball E. (b) of FIG. 25 is a graph of a pixel unit which reflected light enters in a case where light has reached an eyeball E at an incident angle of 20° and has been reflected by the eyeball E. (c) of FIG. 25 is a graph of a pixel unit which reflected light enters in a case where light has reached an eyeball E at an incident angle of 10° and has been reflected by the eyeball E. In each of the graphs shown in (a) through (c) of FIG. 25, a horizontal axis represents a principal axis direction of a polarizing element corresponding to each of pixels included in a pixel unit, and a vertical axis represents an effective radiance value of a pixel. Moreover, in the example shown in FIG. 25, a refractive index of air is 1.0, and a refractive index of a cornea of the eyeball E is 1.376.

First, the following description discusses the pixel unit corresponding to the reflected light obtained from light whose incident angle to the eyeball E is 30°, as shown in (a) of FIG. 25. Here, in a case where the effective radiance value is normalized as Ioutmax=1, Ioutmin is 0.60. Moreover, in the reflected light obtained from light whose incident angle is 30°, a is 0.40.

In this case, the diffusive reflection light component Ik is calculated as follows with use of the formula (6-1).

$$Ik = (Ioutmin - a \times Ioutmax)/(1 - a)$$
$$= (0.60 - 0.40 \times 1.0)/(1.0 - 0.40)$$
$$\approx 0.33$$

Next, the following description discusses the pixel unit corresponding to the reflected light obtained from light whose incident angle to the eyeball E is 20°, as shown in (b) of FIG. 25. Here, in a case where the effective radiance value is normalized as Ioutmax=1, Ioutmin is 0.79. Moreover, in the reflected light obtained from light whose incident angle is 20°, a is 0.688.

In this case, the diffusive reflection light component Ik is calculated as follows with use of the formula (6-1).

$$Ik = (Ioutmin - a \times Ioutmax)/(1 - a)$$
$$= (0.79 - 0.688 \times 1.0)/(1.0 - 0.688)$$
$$\approx 0.33$$

Next, the following description discusses the pixel unit corresponding to the reflected light obtained from light whose incident angle to the eyeball E is 10°, as shown in (c) of FIG. 25. Here, in a case where the effective radiance value is normalized as Ioutmax=1, Ioutmin is 0.94. Moreover, in the reflected light obtained from light whose incident angle is 10°, a is 0.91.

In this case, the diffusive reflection light component Ik is calculated as follows with use of the formula (6-1).

$$Ik = (Ioutmin - a \times Ioutmax)/(1 - a)$$
$$= (0.94 - 0.91 \times 1.0)/(1.0 - 0.91)$$
$$\approx 0.33$$

As such, in the example shown in FIG. 25, the diffusive reflection light component Ik is 0.33 in each of the cases where Ioutmax=1 and the incident angles of light to the eyeball E are 10°, 20°, and 30°. In any of the angles, the value of Ik is substantially constant, and therefore the above value of Ik seems to be correct.

[Embodiment 7]

The following description will discuss Embodiment 7 of the present invention. An image processing device of Embodiment 7 has a configuration similar to that of the image processing device 10D, except for contents of a process carried out by the diffusive reflection light component calculating section 18, and therefore a block diagram and a flowchart are not illustrated.

The diffusive reflection light component calculating section 18 of Embodiment 7 calculates a diffusive reflection light component Ik for each of pixel units by a formula (7-1) below.

$$Ik = I\text{outmin} - Ip \quad (7\text{-}1)$$

The following description will discuss the formula (7-1).

In Embodiment 7, a first regular reflection light component Is has a component depending on a principal axis direction of a polarizing element, whereas a second regular reflection light component Ip does not depend on the principal axis direction of the polarizing element. Specifically, in Embodiment 7, the diffusive reflection light component calculating section 18 calculates Is by a formula (7-2) below.

$$Is = I\text{outmax} - I\text{outmin} \quad (7\text{-}2)$$

Moreover, Ik is expressed by a formula (7-3) below.

$$Ik = I\text{outmax} - (Is + Ip) \quad (7\text{-}3)$$

By modifying the formula (7-3) with use of the formula (7-2), a formula (7-4) below is obtained.

$$Ik = I\text{outmin} - Ip \quad (7\text{-}4)$$

Ip is a value which can be calculated with use of the formula (6-7). Therefore, the diffusive reflection light component calculating section 18 can calculate the diffusive reflection light component Ik by the formulae (7-4) and (6-7).

As above described, the diffusive reflection light component calculating section 18 of Embodiment 7 calculates two kinds of regular reflection light components and determines, as a luminance value of a unit region corresponding to a pixel unit, a value obtained by subtracting the calculated regular reflection light component from a maximum value of effective radiance values of pixels included in the pixel unit. Even in a case where the diffusive reflection light component calculating section 18 executes such a process, the image processing device 10D can determine, as a luminance value of each of unit regions, a diffusive reflection light component from which the regular reflection light component has been at least partially removed.

[Embodiment 8]

The following description will discuss Embodiment 8 of the present invention with reference to FIG. 26 and FIG. 27.

FIG. 26 is a block diagram illustrating a configuration of an electronic information apparatus 3 including an image processing device 10E in accordance with Embodiment 8. As illustrated in FIG. 26, the electronic information apparatus 3 is different from the electronic information apparatus 2 of Embodiment 7 in that the electronic information apparatus 3 includes an image processing device 10E instead of the image processing device 10D, and includes a polarized light irradiating section 40.

The polarized light irradiating section 40 irradiates a subject with polarized light. For example, the polarized light irradiating section 40 includes a light source such as an LED and a polarized light filter which causes only polarized light in a particular direction to pass through.

The image processing device 10E is different from the image processing device 10D in that the image processing device 10E includes a reflected image presence/absence determining section 19. The reflected image presence/absence determining section 19 determines whether or not a regular reflection light component on a surface of the subject has an intensity that is equal to or less than a predetermined intensity. In other words, the reflected image presence/absence determining section 19 determines whether or not a reflected image occurs on the subject.

In a case where the reflected image presence/absence determining section 19 has determined that no reflected image occurs on the subject, the polarized light irradiating section 40 irradiates the subject with polarized light. Moreover, in this case, a luminance value information obtaining section 16 (luminance value information reobtaining section) obtains effective radiance values of the subject again while the polarized light irradiating section 40 is irradiating the subject with polarized light.

In Embodiment 8, the reflected image presence/absence determining section 19 calculates a ratio of a minimum value to a maximum value of effective radiance values for each of pixel units corresponding to the eyeball E. Further, the reflected image presence/absence determining section 19 calculates an average of the ratios in all the pixel units corresponding to the eyeball E and, (i) in a case where the average is equal to or more than a predetermined value, determines that no reflected image occurs and, (ii) in a case where the average is less than the predetermined value, determines that a reflected image occurs.

In a case where an incident angle of light to the subject is small, a ratio of a minimum value to a maximum value becomes large among effective radiance values of pixels included in a pixel unit corresponding to the incident angle. The predetermined value can be a ratio of a minimum value to a maximum value among effective radiance values for a possible smallest incident angle to the subject. Specifically, the predetermined value can be, for example, 0.94. This value is a ratio of a minimum value to a maximum value among effective radiance values calculated by use of Fresnel's law for reflected light obtained from light whose incident angle to the eyeball E is 10°.

FIG. 27 is a flowchart showing processes in the image processing device 10E. As shown in FIG. 27, in the image processing device 10E, the luminance value information obtaining section 16 obtains effective radiance values of the subject (SC1), and then the reflected image presence/absence determining section 19 determines whether or not a reflected image occurs (SD1, reflected image determining step). In a case where a reflected image occurs (Y in SD1), the image processing device 10E carries out processes of and subsequent to the step SC2, as with the image processing device 10B.

On the other hand, in a case where no reflected image occurs (N in SD1), the luminance value information obtaining section 16 obtains effective radiance values of the subject again while the polarized light irradiating section 40 is irradiating the subject with polarized light (SD2, luminance value information reobtaining step). In this case, the image processing device 10E carries out processes of and subsequent to the step SC2 with use of the effective radiance values of the subject obtained in the step SD2.

In the image processing device 10E, in a case where no reflected image occurs on the eyeball E, the luminance value information obtaining section 16 obtains effective radiance values of the subject including the eyeball E while the polarized light irradiating section 40 is causing a reflected image. The diffusive reflection light component calculating section 18 (i) removes a regular reflection light component with use of a ratio a calculated by Fresnel's law from effective radiance values obtained by the luminance value information obtaining section 16 and (ii) generates a picture image, and the authenticating section 15 carries out authentication. Therefore, in a case where the eyeball E is an imitation which is made of a substance different from that of a real eyeball, specifically, a substance having a refractive index that is different from the refractive index (n=1.376) of a cornea, authentication of a user is more likely to fail.

Note that the electronic information apparatus 3 does not necessarily need to include the polarized light irradiating section 40. For example, it is possible that another device, which is connected with the electronic information apparatus 3 via wireless communication or wireline communication, includes the polarized light irradiating section 40. Moreover, in the above described processes, the luminance value information obtaining section 16 obtains effective radiance values of the subject in both the steps SC1 and SD2. However, a functional block (luminance value information reobtaining section) for obtaining effective radiance values of the subject in the step SD2 can be different from the luminance value information obtaining section 16.

Moreover, as above described, the image processing device 10E is different from the image processing device 10D in that the image processing device 10E includes the reflected image presence/absence determining section 19. In other words, the image processing device 10E has a configuration in which the reflected image presence/absence determining section 19 is added to the image processing device 10D. Note, however, that the image processing device of Embodiment 8 can have a configuration in which the reflected image presence/absence determining section 19 is added to another image processing device using Fresnel's law, e.g., the image processing device 10 or 10A.

[Embodiment 9]

The image processing device in accordance with an aspect of the present invention can carry out two or more processes among the above described processes.

For example, an image processing device in accordance with an aspect of the present invention can execute one of the image processing described in Embodiments 1, 2, and 4 through 7 and, in a case where authentication fails, the image processing device can carry out authentication again by executing the executed image processing or another image processing other than the executed image processing. In a case where even the second authentication fails, the image processing device can obtain an effective radiance distribution of the subject again or take a picture image of the subject again and, if necessary, further measure a distance to the subject again. In a case where still another image processing is simultaneously or sequentially executed and authentication does not succeed even by obtaining an effective radiance distribution of the subject several times or taking a picture image of the subject several times, the image processing device can carry out authentication based on a picture image generated by that still another image processing.

In the above described embodiments, in a case where authentication has failed, authentication is carried out again by changing a range of an iris detected by the iris detecting section 11. However, an image processing device in accordance with an aspect of the present invention can be configured such that, in a case where authentication has failed once or more, the luminance value information obtaining section 16 obtains effective radiance values (takes a picture image) of the subject again. In a case where another image processing is simultaneously or sequentially executed and authentication does not succeed even by obtaining an effective radiance distribution of the subject several times, the image processing device can carry out authentication based on a picture image generated by that another image processing.

An image processing device in accordance with an aspect of the present invention can simultaneously execute image processing(s) of other embodiment(s) (of one or more of Embodiments 1, 2, 4, 5, and 7) with the image processing of Embodiment 6.

FIG. 29 is a flowchart showing a flow of processes in the image processing device which simultaneously executes the image processing of Embodiment 6 and another image processing. In the processes in FIG. 29, the processes of the steps SC1, SC5, and SC6 are identical with those described in the above embodiments, and are therefore not described here in detail.

In the processes shown in FIG. 29, the image processing device obtains luminance value information of the subject (SC1), and then simultaneously carries out (i) generation of a first post-removal picture image in which a luminance value of each of unit regions has been determined by the image processing of Embodiment 6 (SD1) and (ii) generation of a second post-removal picture image in which a luminance value of each of unit regions has been determined by the image processing of another embodiment (SD2). After that, the image processing device determines whether or not a luminance value is equal to or more than a predetermined threshold, for each of the unit regions in the first post-removal picture image (SD3). In a case where the luminance value is equal to or more than the threshold (Y in SD3), the luminance value of the unit region is not changed. On the other hand, in a case where the luminance value is not equal to or more than the threshold (N in SD3), the luminance value of the unit region is changed to a luminance value of a unit region at a corresponding position in the second post-removal picture image. The image processing device executes the determination of the step SD3 for all the unit regions, and executes the process of the step SD4 in accordance with the determination result, and then carries out authentication with use of the obtained picture image (SC5). Further, the image processing device determines whether or not authentication has succeeded (SC6). In a case where authentication has succeeded (Y in SC6), the image processing device ends the process. In a case where authentication has failed (N in SC6), the process returns to the step SD1 again, and a first post-removal picture image is generated again. Specifically, in a case of N in the step SC6, the image processing device executes processes of and subsequent to the step SC11 shown in FIG. 24. Note that, in a case of N in the step SC6, it is possible that a first post-removal picture image and a second post-removal picture image are both generated again by returning to both the steps SD1 and SD2, instead of generating only a first post-removal picture image again by returning to only the step SD1.

As above described, in the image processing of Embodiment 6, there is a possibility that a diffusive reflection light component disappears in a unit region in which an incident angle of light to the eyeball is small. In view of this, the image processing device determines a luminance value of each of unit regions by the image processing of Embodiment 6 and then determines whether or not the luminance value of each of unit regions is equal to or more than the predetermined threshold. In a unit region in which a luminance value is equal to or more than the threshold, the luminance value is directly employed. On the other hand, in a unit region where a luminance value is not equal to or more than the threshold, a luminance value obtained by the image processing of the another embodiment is employed as a luminance value of the unit region. With the configuration, the image processing device can prevent a diffusive reflection light component from disappearing.

[Additional Remarks]

Normally, the term "specular reflection light" is used only for visible light that is emitted in a direction toward a viewpoint (e.g., an eye of a user, an image pickup device, or the like). However, in this specification, the term "specular reflection light" is used as a term representing a concept including infrared light, in addition to visible light emitted in the direction toward a viewpoint.

In the above Embodiments 1 through 3, the image processing device 10 and the like are mounted on the personal digital assistant 1 and the like. However, each of the image processing device 10 and the like of those embodiments can be mounted on the electronic information apparatus 2 or the like instead of the personal digital assistant 1 or the like, as with the image processing device 10B and the like of other embodiments. Each of the electronic information apparatuses 2 and 3 can be an intercom or a door of an automobile, which intercom or door has a function to carry out authentication of a user, instead of the above described smart phone.

Moreover, in the above described Embodiments 1 through 3, the S-polarized light calculating section 12 identifies an incident angle of light to the eyeball E which angle corresponds to a pixel, with use of a distance from the lens of the camera 20 to the surface of the eyeball E measured by the distance measuring device 30. However, for example, it is possible that the S-polarized light calculating section 12 calculates the distance based on a size of a picture image of the eyeball E in a state in which the eyeball E is in focus, and identifies an incident angle of light to the eyeball E, which angle corresponds to a pixel, with use of the distance. Alternatively, for example, it is possible that the S-polarized light calculating section 12 assumes in advance a distance from the lens of the camera 20 to the surface of the eyeball E (e.g., in a case where the personal digital assistant 1 is a smart phone, 20 cm to 30 cm), and identifies an incident angle of light to the eyeball E, which angle corresponds to a pixel, with use of the assumed distance. In this case, it is possible that a plurality of distances are assumed, an incident angle of light to the eyeball E, which angle corresponds to a pixel, is identified with use of those distances, and a reflected image is removed. Moreover, in this case, the personal digital assistant 1 does not necessarily need to include the distance measuring device 30.

In the above descriptions with reference to FIG. 3, it is described that a reflected image is "removed". Further, FIG. 3 itself includes the phrase "S-wave/P-wave removal". However, in an aspect of the present invention, the image processing device does not necessarily need to completely remove a reflected image, as long as a regular reflection light component which forms the reflected image is at least partially removed, i.e., the reflected image is reduced.

FIG. 28 is a view showing an arrangement of pixel units in the camera 20. (a) of FIG. 28 is a view illustrating a state in which pixel units each of which is made up of nine pixels are arranged so as not to overlap with each other. (b) of FIG. 28 is a view illustrating a state in which pixel units each of which is made up of four pixels are arranged so as not to overlap with each other. (c) of FIG. 28 is a view illustrating a state in which pixel units each of which is made up of nine pixels are arranged so as to partially overlap with each other. (d) of FIG. 28 is a view illustrating a state in which pixel units each of which is made up of four pixels are arranged so as to partially overlap with each other. In (a) through (d) of FIG. 28, a region surrounded by dotted lines, a region surrounded by dashed lines, and a region surrounded by dashed dotted lines are separate pixel units.

In the above described embodiments, in the camera 20, one (1) pixel is included in only one (1) pixel unit. In other words, as illustrated in (a) and (b) of FIG. 28, pixel units are arranged so as not to overlap with each other. However, in an aspect of the present invention, it is possible that one (1) pixel is included in two or more pixel units. That is, as illustrated in (c) and (d) of FIG. 28, pixel units can be arranged so as to partially overlap with each other.

In a case where pixel units partially overlap with each other, the number of pixel units is larger than a case where pixel units do not overlap with each other. Therefore, in a case where pixel units partially overlap with each other, it is possible to expect that a regular reflection light component can be removed more.

As the number of principal axis directions of polarizing elements corresponding to pixels included in one (1) pixel unit increases, it is possible to remove a regular reflection light component more appropriately. However, at least one pixel corresponding to one (1) principal axis direction needs to be prepared and therefore, as the number of principal axis directions increases, the number of pixels included in one (1) pixel unit accordingly increases.

In a case where the number of pixels included in one (1) pixel unit increases and pixel units are arranged so as not to overlap with each other as illustrated in (a) and (b) of FIG. 28, there is a problem that a resolution of a picture image decreases. Practically, it is preferable that the number of principal axis directions of polarizing elements corresponding to pixels included in one (1) pixel unit is two or more and nine or less.

Moreover, in the above described embodiments, each of the image processing devices 10 and 10A through 10E includes the iris detecting section 11 which identifies an iris region. However, each of the image processing devices 10 and 10A through 10E can include a cornea/iris/pupil detecting section for identifying a cornea, iris, or pupil region of a user, instead of the iris detecting section 11. A process of identifying the cornea, iris, or pupil region by the cornea/iris/pupil detecting section is similar to the process of detecting an iris region by the iris detecting section 11, and is known in the field of iris authentication and the like. The cornea/iris/pupil detecting section transmits position information of pixels corresponding to the identified cornea, iris, or pupil region to the minimum luminance value selecting section 17, the minimum luminance value estimating section 17A, or the diffusive reflection light component calculating section 18, and to the authenticating section 15 and the like, depending on embodiments. Processes of other blocks included in each of the image processing devices 10 and 10A through 10E are similar to the processes described in the above embodiments.

The following description will briefly discuss an example of a process of detecting an iris region (or cornea, iris, or pupil region) by the iris detecting section 11 (or cornea/iris/pupil detecting section). First, the iris detecting section 11 (or cornea/iris/pupil detecting section) carries out sharpening, edge detection, and binarization with respect to effective radiance values obtained in pixels of the image pickup device. In the edge detection, for example, a sobel filter can be used. Moreover, in binarization, for example, it is possible to use a moving average method or a partial image dividing method. The iris detecting section 11 (or cornea/iris/pupil detecting section) carries out Hough transform with respect to the binarized effective radiance values, and detects a circular region as an iris (or cornea, iris, or pupil region).

Moreover, in the above described embodiments, the radius r is a radius of the eyeball E. However, the radius r can be a curvature radius of a cornea.

The following description will discuss a case where the subject in Embodiment 1 includes eyeballs E of both eyes. In this case, numerical values are defined as follows.

Rd: Distance between (i) intermediate point on line segment connecting centers of two eyeballs E and (ii) lens of camera 20

R1: Distance between center of one eyeball E and lens of camera 20

L: Distance between center of one eyeball E and the intermediate point

Here, Rd is a known value measured by the distance measuring device 30, and R1 cannot be directly measured by the distance measuring device 30. A method of calculating L will be described later. Note that Rd does not necessarily need to be measured by the distance measuring device 30, and can be calculated by a calculating method using only the camera 20, as with R described in Embodiment 6.

FIG. 30 is a view for explaining a case where the subject includes eyeballs E of both eyes. In this case, a value of R1 can be calculated by a formula (10-1) below.

$$R1 = \text{sqrt}(Rd^2 + (L/2)^2) \quad (10\text{-}1)$$

Here, sqrt($Rd^2+(L/2)^2$) represents a square root of $Rd^2+(L/2)^2$. By substituting R1 for R in the above described formulae (1-1) and (1-2) and calculating R1 by the formula (10-1), the image processing device 10 of Embodiment 1 can carry out a process in a case where the subject is eyeballs E of both eyes.

The following description will discuss a method for calculating L. For the calculation of L, numerical values are defined as follows.

α: Angle formed by center and end part of cornea with respect to center of eyeball E H1: Number of pixels over radius of cornea of one eyeball E in picture image H2: Number of pixels over distance between centers of corneas of both eyeballs E in picture image Among those values, a can be, for example, 35° in view of a general ratio of cornea accounting for a circle having a radius r. Note that a value of a can be another value, e.g., an arbitrary value falling within a range of 20° or more and 50° or less. Moreover, H1 and H2 can be obtained from a picture image.

In this case, a value of L can be calculated by a formula (10-2) below.

$$L = H2 \times (r \times \sin \alpha)/H1 \quad (10\text{-}2)$$

By substituting the value of L calculated by the formula (10-2) for the formula (10-1), it is possible to calculate a value of R1.

In the above described embodiments, a refractive index of a cornea is n=1.376. However, the refractive index of the cornea is not limited to the above described example and can be, for example, 1.335, 1.337, 1.3375, 1.37, or 1.38, or another value.

[Example Realized with Use of Software]

Each of the image processing devices 10 and 10A through 10E can be realized by a logic circuit (hardware) provided in an integrated circuit (IC chip) or the like or can be alternatively realized by software as executed by a central processing unit (CPU).

In the latter case, each of the image processing devices 10 and 10A through 10E includes: a CPU that executes instructions of a program that is software realizing the foregoing functions; read only memory (ROM) or a storage device (each referred to as "storage medium") storing the program and various kinds of data in such a form that they are readable by a computer (or a CPU); and random access memory (RAM) into which the program is loaded in executable form. An object of an aspect of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that an aspect of the present invention can also be achieved in the form of a computer data signal in which the program is embodied via electronic transmission and which is embedded in a carrier wave.

[Main Points]

The image processing method in accordance with an aspect 1 of the present invention includes the steps of: obtaining a picture image of a subject (eyeball E) taken by an image pickup device (light-receiving element 22) in which pixel units are two-dimensionally arranged, each of the pixel units including a plurality of pixels that are associated with respective of a plurality of polarizing elements (21a through 21o) whose principal axis directions are different from each other (S1); and calculating, with use of an output from the image pickup device, a luminance distribution of S-polarized light depending on an incident angle (θ) with respect to the subject, the incident angle (θ) being determined in accordance with a position on the subject which position corresponds to a two-dimensional position of the pixel units in the image pickup device (SA1, SA2, SB1).

According to the method, for example, in a case where the subject is an eyeball, an incident angle with respect to the eyeball when a picture image of the eyeball is taken is determined in accordance with a position on the eyeball. That is, assuming that there are a first virtual line (straight line L1 shown in FIG. 6) which connects a position on the eyeball with a center of the eyeball and a second virtual line (straight line L2 shown in FIG. 6) which connects the position on the eyeball with a center of a lens of a camera included in the image pickup device, an angle formed between the first virtual line and the second virtual line is an incident angle with respect to the eyeball.

Meanwhile, in the image pickup device, the pixel units each made up of a plurality of pixels associated with the respective plurality of polarizing elements whose principal axis directions are different from each other are two-dimensionally arranged. A position on the eyeball, an incident angle with respect to the eyeball at the position, and a two-dimensional position of a pixel unit in the image pickup device are associated with each other. Moreover, the pixel unit is associated with the plurality of polarizing elements whose principal axis directions are different from each other, and therefore outputs from the plurality of pixels constituting the pixel unit vary depending on a distribution state, on the eyeball, of polarized light included in reflected light from the eyeball. In particular, the outputs from the plurality of pixels associated with the respective plurality of polarizing elements whose principal axis directions are different from each other reflect a luminance of S-polarized light. That is, the output from the image pickup device reflects the distribution state, on the eyeball, of S-polarized light included in reflected light from the eyeball. Therefore, it is possible to calculate, with use of an output of the image pickup device, a luminance distribution of S-polarized light depending on an incident angle with respect to the eyeball.

The luminance distribution of S-polarized light thus obtained varies between an eyeball of a living body and an imitation of an eyeball. From this, for example, in a case where a picture image of an imitation of an eyeball is taken as a subject, a luminance distribution of S-polarized light of the imitation is different from a distribution of an eyeball, and it is therefore possible to determine that the subject is not an eyeball. As such, the image processing method in accordance with the aspect 1 can be used, for example, to determine whether the subject is an eyeball or not.

Moreover, the luminance distribution of S-polarized light calculated as above can be used, for example, to remove an image of an object reflected on an eyeball due to influence of outside light.

Therefore, according to the image processing method in accordance with the aspect 1, it is possible to improve accuracy in iris authentication.

The image processing method in accordance with an aspect 2 of the present invention preferably further includes, in the aspect 1, the step of subtracting the luminance distribution of S-polarized light from a luminance distribution of the picture image.

In a case where another object such as a landscape or a person is reflected on the eyeball in the method, a part of reflected light from the eyeball which part corresponds to the another object is mainly specular reflection light, and the specular reflection light includes the S-polarized light. Therefore, according to the method, it is possible to reduce an unnecessary noise image reflected on the eyeball, by subtracting the luminance distribution of S-polarized light from a luminance distribution of the picture image of the eyeball.

The image processing method in accordance with an aspect 3 of the present invention preferably further includes, in the aspect 1 or 2, the step of calculating, from the luminance distribution of S-polarized light, a luminance distribution of P-polarized light depending on an incident angle with respect to the subject based on Fresnel's law.

In the method, the specular reflection light from the eyeball in a case where another object is reflected on the eyeball often includes P-polarized light, as well as S-polarized light. A luminance distribution of P-polarized light also varies between an eyeball of a living body and an imitation of an eyeball. Therefore, according to the method, for example, it is possible to increase accuracy in determining whether the subject is an eyeball or not.

The image processing method in accordance with an aspect 4 of the present invention preferably further includes, in the aspect 3, the step of subtracting, from the luminance distribution of the picture image, the luminance distribution of S-polarized light and the luminance distribution of P-polarized light.

According to the method, it is possible to further reduce an unnecessary noise image reflected on the eyeball, by subtracting the luminance distribution of S-polarized light and the luminance distribution of P-polarized light from the luminance distribution of the picture image of the eyeball.

In the image processing method in accordance with an aspect 5 of the present invention, it is preferable in any of the aspects 1 through 4 that, in the step of calculating the luminance distribution of S-polarized light, in a case where the incident angle is a Brewster angle, a pixel unit corresponding to the Brewster angle is identified, a luminance value of S-polarized light with respect to the Brewster angle is calculated by subtracting a minimum value from a maximum value of luminance values of pixels included in the pixel unit which has been identified, and a luminance value of S-polarized light with respect to an incident angle other than the Brewster angle is calculated in accordance with Fresnel's law, on the basis of the luminance value of S-polarized light with respect to the Brewster angle.

In the method, the following is known: that is, with respect to the Brewster angle, specular reflection light hardly includes P-polarized light and mainly includes S-polarized light. Therefore, outputs (i.e., luminance values) from a plurality of pixels constituting the pixel unit corresponding to the Brewster angle reflect a change in transmittance of S-polarized light with respect to the plurality of polarizing elements whose principal axis directions are different from each other. From this, it is possible to calculate the luminance value of S-polarized light with respect to the Brewster angle by subtracting a minimum value from a maximum value of those luminance values.

In an eyeball, a function representing a luminance distribution of S-polarized light with respect to an incident angle accords with Fresnel's law and is known. Therefore, it is possible to calculate a luminance value of S-polarized light with respect to an incident angle other than the Brewster angle based on the theory, by calculating the luminance value of S-polarized light with respect to the Brewster angle.

In the image processing method in accordance with an aspect 6 of the present invention, it is preferable in any of the aspects 1 through 5 that the step of calculating a luminance value of S-polarized light by subtracting a minimum value from a maximum value of luminance values of pixels included in the pixel unit is repeated for each of the plurality of pixel units included in the image pickup device, and the luminance distribution of S-polarized light is calculated by associating calculated luminance values of S-polarized light with incident angles corresponding to the respective plurality of pixel units.

According to the method, as already described, it is possible to calculate a luminance value of S-polarized light by subtracting a minimum value from a maximum value of luminance values of pixels included in a pixel unit. By repeating the step for each of the plurality of pixel units included in the image pickup device and associating the calculated luminance values of S-polarized light with the respective incident angles corresponding to the plurality of pixel units, it is possible to calculate the luminance distribution of the S-polarized light based on actually measured values.

Note that the method in accordance with this aspect in which the luminance distribution of S-polarized light is calculated based on actually measured values can be carried out in a case where the method of the above described aspects in which the luminance distribution of S-polarized light is calculated based on the theory do not work well.

The image processing device (10) in accordance with an aspect 7 of the present invention includes: an S-polarized light calculating section (12) which calculates, with use of an output from an image pickup device (light-receiving element 22), a luminance distribution of S-polarized light depending on an incident angle with respect to a subject (eyeball E) in a picture image of the subject taken by the image pickup device in which pixel units are two-dimensionally arranged, each of the pixel units including a plurality of pixels that are associated with respective of a plurality of polarizing elements whose principal axis directions are different from each other, and the incident angle being determined in accordance with a position on the subject which position corresponds to a two-dimensional position of any of the pixel units.

According to the configuration, it is possible to bring about an effect similar to that of the aspect 1.

The image processing program in accordance with an aspect 8 of the present invention is an image processing program for causing a computer to function as the image processing device in accordance with the aspect 7, the image processing program causing the computer to function as the S-polarized light calculating section.

The image processing device in accordance with the aspects of the present invention may be realized by a computer. In this case, an image processing program which realizes the image processing device with use of a computer by causing the computer to function as sections (software elements) of the image processing device, and a computer-readable storage medium in which the image processing program is stored, are also encompassed in the aspects of the present invention.

The aspects of the present invention are not limited to the embodiments, but can be altered by a skilled person in the art within the scope of the claims. An embodiment derived from a proper combination of technical means each disclosed in a different embodiment is also encompassed in the technical scope of the aspects of the present invention. Further, it is possible to form a new technical feature by combining the technical means disclosed in the respective embodiments.

CROSS-REFERENCE TO RELATED APPLICATIONS

This Nonprovisional application claims priority on Patent Application No. 2016-091832 filed in Japan on Apr. 28, 2016 and on Patent Application No. 2017-074535 filed in Japan on Apr. 4, 2017, the entire contents of which are hereby incorporated by reference.

REFERENCE SIGNS LIST 10, 10A, 10B, 10C, 10D, 10E: Image processing device
15: Authenticating section
16: Luminance value information obtaining section
17: Minimum luminance value selecting section (image generating section)
17A: Minimum luminance value estimating section (image generating section)
18: Diffusive reflection light component calculating section (image generating section)
19: Reflected image presence/absence determining section
40: Polarized light irradiating section

The invention claimed is:

1. An image processing method comprising:
   a luminance value information obtaining step of obtaining effective radiance values of a subject by an image pickup device in which pixel units are two-dimensionally arranged, each of the pixel units including a plurality of pixels which are associated with respective of a plurality of polarizing elements whose principal axis directions are different from each other, and each of the effective radiance values being an effective radiance value in the image pickup device;
   an image generating step of generating a picture image including an image of the subject with use of the effective radiance values obtained from the subject,
   in the image generating step, a luminance value being obtained by at least partially removing a regular reflection light component on a surface of the subject from the effective radiance values of the plurality of pixels included in each of the pixel units corresponding to at least part of the subject, and the picture image being generated as a set of unit regions each of which has the luminance value; and
   wherein: in the image generating step, a minimum value of possible effective radiance values in each of the pixel units is estimated based on effective radiance values of the plurality of pixels included in that pixel unit, and a luminance value of each of the unit regions is determined based on the minimum value.

2. The image processing method as set forth in claim 1, wherein: in the image generating step, the minimum value is estimated by applying a trigonometric function or a polynomial expression, in which an angle of a principal axis direction of each of the plurality of polarizing elements is a variable, to the effective radiance values of the plurality of pixels included in each of the pixel units.

3. The image processing method as set forth in claim 1, wherein:
   in the image generating step,
   a maximum value and a minimum value of effective radiance values in each of the pixel units is identified based on effective radiance values of the plurality of pixels included in that pixel unit,
   a diffusive reflection light component in each of the pixel units is calculated by using the maximum value and the minimum value and a ratio of a reflectance of a P-polarized light component to a reflectance of an S-polarized light component, the ratio being a ratio on a surface of the subject which surface corresponds to the pixel units and being calculated based on Fresnel's law, and
   the diffusive reflection light component is determined as a luminance value of each of the unit regions.

4. The image processing method as set forth in claim 1, wherein:
   in the image generating step,
   a maximum value and a minimum value of effective radiance values in each of the pixel units is identified based on effective radiance values of the plurality of pixels included in that pixel unit,
   a first regular reflection light component is calculated by subtracting the minimum value from the maximum value,
   a second regular reflection light component is calculated by using the first regular reflection light component and a ratio of a reflectance of a P-polarized light component to a reflectance of an S-polarized light component, the ratio being a ratio on a surface of the subject which surface corresponds to the pixel units and being calculated based on Fresnel's law, and
   a value obtained by subtracting the first regular reflection light component and the second regular reflection light component from the maximum value is determined as a luminance value of each of the unit regions.

5. The image processing method as set forth in claim 1, further comprising:
- a reflected image determining step of determining whether or not a regular reflection light component on a surface of the subject, which component is included in the effective radiance values obtained in the luminance value information obtaining step, has an intensity equal to or less than a predetermined intensity; and
- a luminance value information reobtaining step of obtaining effective radiance values while the subject is being irradiated with polarized light in a case where, in the reflected image determining step, the intensity of the regular reflection light component on the surface of the subject has been determined to be equal to or less than the predetermined intensity,
- in a case where the luminance value information reobtaining step has been executed, a regular reflection light component, which is on the surface of the subject and is included in the effective radiance values obtained in the luminance value information reobtaining step, being at least partially removed in the image generating step.

6. An image processing device, comprising:
- an image pickup device in which pixel units are two-dimensionally arranged, each of the pixel units including a plurality of pixels which are associated with respective of a plurality of polarizing elements whose principal axis directions are different from each other;
- a luminance value information obtaining section which obtains effective radiance values of a subject by the image pickup device, each of the effective radiance values being an effective radiance value in the image pickup device;
- an image generating section which generates a picture image including an image of the subject with use of the effective radiance values obtained from the subject,
- the image generating section obtaining a luminance value by at least partially removing a regular reflection light component on a surface of the subject from effective radiance values of the plurality of pixels included in each of the pixel units corresponding to at least part of the subject, and generates the picture image as a set of unit regions each of which has the luminance value; and
- wherein: the image generating section estimates a minimum value of possible effective radiance values in each of the pixel units based on effective radiance values of the plurality of pixels included in that pixel unit; and the image generating section determines a luminance value of each of the unit regions based on the minimum value.

7. The image processing device as set forth in claim 6, wherein: the image generating section estimates the minimum value by applying a trigonometric function or a polynomial expression, in which an angle of a principal axis direction of each of the plurality of polarizing elements is a variable, to the effective radiance values of the plurality of pixels included in each of the pixel units.

8. The image processing device as set forth in claim 6, wherein:
- the image generating section identifies a maximum value and a minimum value of effective radiance values in each of the pixel units based on effective radiance values of the plurality of pixels included in that pixel unit;
- the image generating section calculates a diffusive reflection light component in each of the pixel units by using the maximum value and the minimum value and a ratio of a reflectance of a P-polarized light component to a reflectance of an S-polarized light component, the ratio being a ratio on a surface of the subject which surface corresponds to the pixel units and being calculated based on Fresnel's law; and
- the image generating section determines the diffusive reflection light component as a luminance value of each of the unit regions.

9. The image processing device as set forth in claim 6, wherein:
- the image generating section identifies a maximum value and a minimum value of effective radiance values in each of the pixel units based on effective radiance values of the plurality of pixels included in that pixel unit;
- the image generating section calculates a first regular reflection light component by subtracting the minimum value from the maximum value;
- the image generating section calculates a second regular reflection light component by using the first regular reflection light component and a ratio of a reflectance of a P-polarized light component to a reflectance of an S-polarized light component, the ratio being a ratio on a surface of the subject which surface corresponds to the pixel units and being calculated based on Fresnel's law; and
- the image generating section determines a value, which is obtained by subtracting the first regular reflection light component and the second regular reflection light component from the maximum value, as a luminance value of each of the unit regions.

10. The image processing device as set forth in claim 6, further comprising:
- a reflected image determining section which determines whether or not a regular reflection light component on a surface of the subject, which component is included in the effective radiance values obtained by the luminance value information obtaining section, has an intensity equal to or less than a predetermined intensity; and
- a luminance value information reobtaining section which obtains effective radiance values while the subject is being irradiated with polarized light in a case where the reflected image determining section has determined that the intensity of the regular reflection light component on the surface of the subject is equal to or less than the predetermined intensity,
- in a case where the luminance value information reobtaining section has obtained the effective radiance values of the subject, the image generating section at least partially removes a regular reflection light component which is on the surface of the subject and is included in the effective radiance values obtained by the luminance value information reobtaining section.

11. The image processing device as set forth in claim 6, wherein:
- a part of the subject is an iris; and
- said image processing device further comprises an authenticating section which carries out authentication of a user based on the picture image generated by the image generating section.

* * * * *